(12) United States Patent
Schon et al.

(10) Patent No.: US 11,742,152 B2
(45) Date of Patent: Aug. 29, 2023

(54) ORGANIC TRIPTYCENE-BASED MOLECULES HAVING ONE OR MORE ARYLENE DIIMIDE GROUPS ATTACHED FORMING A CROSSLINKED FRAMEWORK USEFUL FOR LITHIUM ION BATTERY ELECTRODES

(71) Applicant: THE GOVERNING COUNCIL OF THE UNIVERSITY OF TORONTO, Toronto (CA)

(72) Inventors: Tyler Brian Schon, Toronto (CA); Dwight Seferos, Mississauga (CA); Andrew J. Tilley, Pascoe Vale South (AU); Soyoung An, Toronto (CA)

(73) Assignee: THE GOVERNING COUNCIL OF THE UNIVERSITY OF TORONTO, Toronto (CA)

( * ) Notice: Subject to any disclaimer, the term of this patent is extended or adjusted under 35 U.S.C. 154(b) by 395 days.

(21) Appl. No.: 16/772,955

(22) PCT Filed: Dec. 14, 2018

(86) PCT No.: PCT/CA2018/051601
§ 371 (c)(1),
(2) Date: Jun. 15, 2020

(87) PCT Pub. No.: WO2019/113707
PCT Pub. Date: Jun. 20, 2019

(65) Prior Publication Data
US 2021/0167388 A1 Jun. 3, 2021

Related U.S. Application Data

(60) Provisional application No. 62/599,461, filed on Dec. 15, 2017.

(30) Foreign Application Priority Data

Apr. 18, 2018 (CA) .............................. CA 3002010

(51) Int. Cl.
*C08G 73/10* (2006.01)
*H01G 11/48* (2013.01)
(Continued)

(52) U.S. Cl.
CPC ......... *H01G 11/02* (2013.01); *C08G 73/1067* (2013.01); *H01G 11/48* (2013.01);
(Continued)

(58) Field of Classification Search
CPC ............... C08G 73/1067; H01G 11/48; H01M 4/137; H01M 4/608
See application file for complete search history.

(56) References Cited

U.S. PATENT DOCUMENTS

2015/0361345 A1* 12/2015 Chiou .................... C09K 19/32
524/544
2016/0185909 A1* 6/2016 Bara ...................... B01D 71/64
95/44

FOREIGN PATENT DOCUMENTS

WO 2017060863 A1 4/2017

OTHER PUBLICATIONS

Zhang, C.; Chen, C.-F. Synthesis and Structure of 2,6,14- and 2,7,14-Trisubstituted Triptycene Derivatives. J. Org. Chem. 2006, 71, 6626-6629.
(Continued)

*Primary Examiner* — Stewart A Fraser
(74) *Attorney, Agent, or Firm* — Hill & Schumacher

(57) ABSTRACT

The present disclosure relates to electroactive materials that are useful for secondary battery electrode materials and the secondary battery device including thereof. Further, the
(Continued)

disclosure relates to cathode and anode materials obtained via the polymerization of triptycene-based organic molecules having one or more arylene diimide groups attached forming a crosslinked network.

26 Claims, 10 Drawing Sheets

(51) Int. Cl.
    *H01M 4/137*     (2010.01)
    *H01M 4/60*     (2006.01)
    *H01M 10/0525*     (2010.01)
    *H01G 11/02*     (2013.01)
    *H01M 10/054*     (2010.01)

(52) U.S. Cl.
    CPC ........... *H01M 4/137* (2013.01); *H01M 4/608* (2013.01); *H01M 10/054* (2013.01); *H01M 10/0525* (2013.01)

(56) References Cited

OTHER PUBLICATIONS

Li, P.-F.; Schon, T. B.; Seferos, D. S. Thiophene, Selenophene, and Tellurophene-Based Three-Dimensional Organic Frameworks. Angew. Chem., Int. Ed. 2015, 54, 9361-9366.
Zhang, C.; Zhai, T.-L.; Wang, J.-J.; Wang, Z.; Liu, J.-M.; Tan, B.; Yang, X.-L.; Xu, H.-B. Triptycene-Based Microporous Polyimides: Synthesis and Their High Selectivity for CO2 Capture. Polymer 2014, 55,3642-3647.
Ghanem, B. S.; Swaidan, R.; Litwiller, E.; Pinnau, I. Ultra-Microporous Triptycene-Based Polyimide Membranes for High-Performance Gas Separation. Adv. Mater. 2014, 26, 3688-3692.
He, Y.; Zhu, X.; Li, Y.; Peng, C.; Hu, J.; Liu, H. Efficient CO2 Capture by Triptycene-Based Microporous Organic Polymer with Functionalized Modification. Microporous Mesoporous Mater. 2015, 214, 181-187.
Sydlik, S. A.; Chen, Z.; Swager, T. M. Triptycene Polyimides: Soluble Polymers with High Thermal Stability and Low Refractive Indices. Macromolecules 2011, 44, 976-980.
Spitler, E. L.; Dichtel, W. R. Lewis Acid-Catalysed Formation of Two-Dimensional Phthalocyanine Covalent Organic Frameworks. Nat. Chern. 2010, 2,672-677.
Sheng-Huei Hsiao et al., Synthesis of soluble and thermally stable triptycene-based poly(amide-imide)s, J. Polym. Res. (2014) 21:391.
Zhang, Chun et al.; Triptycene-based microporous polyimides: Synthesis and their high selectivity for CO2 capture, Polymer, 55(16), 2014, 3642-3647.
Schon, Tyler B. et L.; Three-Dimensional Arylene Diimide Frameworks for Highly Stable Lithium Ion Batteries, ACS Applied Materials & Interfaces, 9(18), 2017,15631-15637.
Shuangjiang Luo, Qinnan et al., Triptycene-containing poly(benzoxazole-co-imide) membranes with enhanced mechanical strength for high-performance gas separation, J. Mem. Sci. 551 (2018) 305-314, available online Jan. 31, 2018.
Schon, Unusual Capacity Increases with Cycling for Ladder-Type Microporous Polymers,ACS Appl. Mater. Interfaces, Jan. 7, 2019.
Larcher, D.; Tarascon, J.-M. Towards Greener and More Sustainable Batteries for Electrical Energy Storage. Nat. Chem. 2015, 7, 19-29.
Melot, B. C.; Tarascon, J.-M. Design and Preparation of Materials for Advanced Electrochemical Storage. Acc. Chem. Res. 2013, 46, 1226-1238.
Choi, J. W.; Aurbach, D. Promise and Reality of Post-Lithium-ion Batteries with High Energy Densities. Nat. Rev. Water. 2016, 1, 16013.
Schon, T. B.; McAllister, B. T.; Li, P.-F.; Seferos, D. S. The Rise of Organic Electrode Materials for Energy Storage. Chem. Soc. Rev. 2016, 45, 6345-6404.

Haupler, B.; Wild, A.; Schubert, U. S. Carbonyls: Powerful Organic Materials for Secondary Batteries. Adv. Energy Water. 2015, 5, 1402034.
Sun, T.; Li, Z.-J.; Wang, H.-G.; Bao, D.; Meng, F.; Zhang, X.-B. A Biodegradable Polydopamine-Derived Electrode Waterial for High-Capacity and Long-Life Lithium-Ion and Sodium-lon Batteries. Angew. Chem., Int. Ed. 2016, 55, 10662-10666.
Song, Z.; Qian, Y.; Zhang, T.; Otani, M.; Zhou, H. Poly(Benzoquinonyl Sulfide) as a High-Energy Organic Cathode for Rechargeable Li and Na Batteries Adv. ScL 2015, 2, 1500124.
Hu, P.; Wang, H.; Yang, Y.; Yang, J.; Lin, J.; Guo, L. Renewable-Biomolecule-Based Full Lithium-Ion Batteries. Adv. Mater. 2016, 28,3486-3492.
Luo, C.; Huang, R.; Kevorkyants, R.; Pavanello, M.; He, H.; Wang, C. Self-Assembled Organic Nanowires for High Power Density Lithium Ion Batteries. Nano Lett. 2014, 14, 1596-1602.
Ding, Y.; Li, Y.; Yu, G. Exploring Bio-Inspired Quinone-Based Organic Redox Flow Batteries: A Combined Experimental and Computational Study. Chem 2016, 1, 790-801.
Lin, K.; GOrnez-Bombarelli, R.; Beh, E. S.; Tong, L.; Chen, Q.; Valle, A.; Aspuru-Guzik, A.; Aziz, M. J.; Gordon, R. G. A Redox-Flow Battery with an Alloxazine-Based Organic Electrolyte. Nat. Energy 2016, 1, 16102.
Lin, K.; Chen, Q.; Gerhardt, M. R.; Tong, L.; Kim, S. B.; Eisenach, L.; Valle, A. W.; Hardee, D.; Gordon, R. G.; Aziz, M. J.; Marshak, M. P. Alkaline Quinone Flow Battery. Science 2015, 349, 1529-1532.
Janoschka, T.; Martin, N.; Martin, U.; Friebe, C.; Morgenstern, S.; Hiller, H.; Hager, M. D.; Schubert, U. S. An Aqueous, Polymer-Based Redox-Flow Battery Using Non-Corrosive, Safe, and Low-Cost Materials Nature 2015, 527, 78-81.
Schon, T. B.; DiCarmine, P. M.; Seferos, D. S. Polyfullerene Electrodes for High Power Supercapacitors. Adv. Energy Mater. 2014, 4, 1301509.
Mulzer, C. R.; Shen, L.; Bisbey, R. P.; McKone, J. R.; Zhang, N.; Abrutia, H. D.; Dichtel, W. R. Superior Charge Storage and Power Density of a Conducting Polymer-Modified Covalent Organic Framework. ACS Cent. Sci. 2016, 2, 367-673.
Fang, Y.; Wang, H.; Hao, R.; Guo, L. Transition-Metal-Free Biomolecule-Based Flexible Asymmetric Supercapacitors. Small 2016, 12, 4683-4689.
Shimizu, A.; Kuramoto, H.; Tsujii, Y.; Nokami, T.; Inatomi, Y.; Hojo, N.; Suzuki, H.; Yoshida, J.-i. Introduction of Two Lithiooxycarbonyl Groups Enhances Cyclability of Lithium Batteries with Organic Cathode Materials. J. Power Sources 2014, 260, 211-217.
Kim, H.; Kwon, J. E.; Lee, B.; Hong, J.; Lee, M.; Park, S. Y.; Kang, K. High Energy Organic Cathode for Sodium Rechargeable Batteries Chem Mater 2015, 27, 7258-7264.
Lee, M.; Hong, J.; Seo, D.-H.; Nam, D. H.; Nam, K. T.; Kang, K.; Park, C. B. Redox Cofactor From Biological Energy Transduction as Molecularly Tunable Energy-Storage Compound. Angew. Chem., Int. Ed. 2013, 52, 8322-8328.
Haupler, B.; Hagemann, T.; Friebe, C.; Wild, A.; Schubert, U. S. Dithiophenedione-Containing Polymers for Battery Application ACS Appl Mater Interfaces 2015, 7, 3473-3479.
Schon, T. B.; Tilley, A. J.; Bridges, C. R.; Seferos, D. S. Bio-Derived Polymers for Sustainable Lithium-Ion Batteries. Adv. Fund. Mater. 2016, 26, 6896-6903.
Bhosale, S. V.; Jani, C. H.; Langford, S. J. Chemistry of Naphthalene Diimides. Chem. Soc. Rev. 2008, 37, 331-342.
Vadehra, G. S.; Maloney, R. P.; Garcia-Garibay, M. A.; Dunn, B. Naphthalene Diimide Based Materials with Adjustable Redox Potentials: Evaluation for Organic Lithium-Ion Batteries. Chem. Mater. 2014, 26, 7151-7157.
Kim, D. J.; Je, S. H.; Sampath, S.; Choi, J. W.; Coskun, A. Effect of N-Substitution in Naphthalenediimides on the Electrochemical Performance of Organic Rechargeable Batteries. RSC Adv. 2012, 2, 7968-7970.
Chen, D.; Avestro, A.-J.; Chen, Z.; Sun, J.; Wang, S.; Xiao, M.; Erno, Z.; Algaradah, M. M.; Nassar, M. S.; Amine, K. Meng, Y.;

(56) References Cited

OTHER PUBLICATIONS

Stoddart, J. F. A Rigid Naphthalenediimide Triangle for Organic Rechargeable Lithium-Ion Batteries. Adv. Mater. 2015, 27, 2907-2912.

Nang, Y.; Ding, Y.; Pan, L.; Shi, Y.; Yue, Z.; Shi, Y.; Yu, G. Understanding the Size-Dependent Sodium Storage Properties of Na2C6O6-Based Organic Electrodes for Sodium-Ion Batteries. Nano Lett. 2016, 16, 3329-3334.

Shi, Y.; Peng, L.; Ding, Y.; Zhao, Y.; Yu, G. Nanostructured Conductive Polymers for Advanced Energy Storage. Chem. Soc. Rev. 2015, 44, 6684-6696.

Liang, Y.; Chen, Z.; Jing, Y.; Rong, Y.; Facchetti, A.; Yao, Y. Heavily n-Dopable -rr-Conjugated Redox Polymers with Ultrafast Energy Storage Capability. J. Am. Chem. Soc. 2015, 137, 4956-4959.

Xu, F.; Xia, J.; Shi, W. Anthraquinone-Based Polyimide Cathodes for Sodium Secondary Batteries. Electrochem. Commun. 2015, 60, 117-120.

Sharma, P.; Damien, D.; Nagarajan, K.; Shaijumon, M. M.; Hariharan, M. Perylene-Polyimide-Based Organic Electrode Materials for Rechargeable Lithium Batteries. J. Phys. Chem. Lett. 2013, 4, 3192-3197.

Song, Z.; Zhan, H.; Zhou, Y. Polyimides: Promising Energy-Storage Materials. Angew. Chem., Int. Ed. 2010, 49, 8444-8448.

Wang, H.-G.; Yuan, S.; Ma, D.-L.; Huang, X-L.; Meng, F.-L.; Zhang, X.-B. Tailored Aromatic Carbonyl Derivative Polyimides for High-Power and Long-Cycle Sodium-Organic Batteries Adv. Energy Mater. 2014, 4, 1301651.

Wu, H.; Shevlin, S. A.; Meng, Q.; Guo, W.; Meng, Y.; Lu, K.; Wei, Z.; Guo, Z. Flexible and Binder-Free Organic Cathode for High-Performance Lithium-Ion Batteries. Adv. Mater. 2014, 26, 3338-3343.

DeBlase, C. R.; Hernandez-Burgos, K.; Rotter, J. M.; Fortman, D. J.; S Abreu, dos, D.; Timm, R. A.; DiOgenes, I. C. N.; Kubota, L. T.; Abrulia, H. D.; Dichtel, W. R. Cation-Dependent Stabilization of Electrogenerated Naphthalene Diimide Dianions in Porous Polymer Thin Films and Their Application to Electrical Energy Storage. Angew. Chem., Int. Ed. 2015, 54, 13225-13229.

Xu, F.; Jin, S.; Zhong, H.; Wu, D.; Yang, X.; Chen, X.; Wei, H.; Fu, R.; Jiang, D. Electrochemically Active, Crystalline, Mesoporous Covalent Organic Frameworks on Carbon Nanotubes for Synergistic Lithium-Ion Battery Energy Storage. Sci. Rep. 2015, 5,8225.

Tian, D.; Zhang, H.-Z.; Zhang, D.-S.; Chang, Z.; Han, J.; Gao, X.-P.; Bu, X.-H. Li-Ion Storage and Gas Adsorption Properties of Porous Polyimides (Pis) RSC Adv 2014, 4, 7506-7510.

Zeigler, D. F.; Candelaria, S. L.; Mazzio, K. A.; Martin, T. R.; Uchaker, E.; Suraru, S.-L.; Kang, L. J.; Cao, G. Luscombe, C. K. N-Type Hyperbranched Polymers for Supercapacitor Cathodes with Variable Porosity and Excellent Electrochemical Stability. Macromolecules 2015, 48, 5196-5203.

Zhu, Y.; Cui, H.; Meng, X.; Zheng, J.; Yang, P.; Li, L.; Wang, Z.; Jia, S.; Zhu, Z. Chlorine-Induced in Situ Regulation to Synthesize Graphene Frameworks with Large Specific Area for Excellent Supercapacitor Performance. ACS Appl. Mater. Interfaces 2016, 8,6481-6487.

Zhang, S.; Huang, W.; Hu, P.; Huang, C.; Shang, C.; Zhang, C.; Yang, R.; Cui, G. Conjugated Microporous Polymers with Excellent Electrochemical Performance for Lithium and Sodium Storage. J. Mater. Chem. A 2015, 3,1896-1901.

Sakaushi, K.; Hosono, E.; Nicker!, G.; Zhou, H.; Kaskel, S.; Eckert, J. Bipolar Porous Polymeric Frameworks for Low-Dost, High-Power, Long-Life All-Organic Energy Storage Devices. J. Power Sources 2014, 245, 553-556.

Hao, L.; Ning, J.; Luo, B.; Wang, B.; Zhang, Y.; Tang, Z.; Yang, J.; Thomas, A.; Zhi, L. Structural Evolution of 2D Microporous Covalent Triazine-Based Framework Toward the Study of High-Performance Supercapacitors. J. Am. Chem. Soc. 2015, 137, 219-225.

Sun, Y.; Sun, Y.; Pan, Q.; Li, G.; Han, B.; Zeng, D.; Zhang, Y.; Cheng, H. A Hyperbranched Conjugated Schiff Base Polymer Network: a Potential Negative Electrode for Flexible Thin Film Batteries. Chem. Commun. 2016, 52, 3000-3002.

Bhosale, M. E.; Krishnamoorthy, K. Chemically Reduced Organic Small-Molecule-Based Lithium Battery with Improved Efficiency Chem. Mater. 2015, 27, 2121-2126.

Wu, H.; Wang, K.; Meng, Y.; Lu, K.; Wei, Z. An Organic Cathode Material Based on a Polyimide/CNT Nanocomposite tor Lithium Ion Batteries. J. Mater. Chem. A 2013, 1, 6366-6367.

Iordache, A.; Delhorbe, V.; Bardet, M.; Dubois, L.; Gutel, T.; Picard, L. Perylene-Based All-Organic Redox Battery with Excellent Cycling Stability. ACS Appl. Mater. Interfaces 2016, 8, 22762-22767.

\* cited by examiner

ORGANIC TRIPTYCENE-BASED MOLECULES HAVING ONE OR MORE ARYLENE DIIMIDE GROUPS ATTACHED FORMING A CROSSLINKED FRAMEWORK USEFUL FOR LITHIUM ION BATTERY ELECTRODES

FIELD

The present disclosure relates to electroactive materials that are useful for secondary battery electrode materials and the secondary battery device including thereof. Particularly, the present disclosure relates to cathode and anode materials obtained via the polymerization of triptycene-based organic molecules.

BACKGROUND

Inexpensive, environmentally friendly, and high performance energy storage is important due to the widespread use of portable electronics, the advent of electric vehicles, and the implementation of grid-scale energy storage for renewable power generation. In the current state of electrochemical energy storage, lithium ion batteries are viewed as the best technology to satisfy the energy requirements of these applications due to their high energy density compared to other battery technologies.

When a lithium ion battery is assembled using redox-active cathode materials such as perylene diimide triptycene framework material, a capacity of 75.9 mAh g$^{-1}$ (78.7% of the theoretical value) may be obtained. Importantly, the battery may retain a near perfect coulombic efficiency, and >80% of its capacity after cycling 500 times.

However, redox-active cathode materials in commercial lithium ion batteries are made from heavy transition metals, cobalt being the most widely used. This is a significant concern for their cost, sustainability, and the environment during both the manufacturing and disposal streams of lithium ion batteries. Additionally, the raw materials for cobalt-based cathodes are sourced primarily from politically unstable regions of the world, creating potential supply-chain issues that could further inflate the production cost of these key battery components.

Anode materials for batteries are in high demand for many applications in energy storage including grid energy storage, portable electronics, electric vehicles and emerging applications such as wearable and printed electronics. The graphite electrodes that are used in commercial rechargeable lithium ion batteries have a relatively low capacity of approximately 300 mAh g$^{-1}$ compared to that of lithium metal (3842 mAh g$^{-1}$) and the formation of dendrites upon repeated cycling of lithium and sodium metal anodes poses serious safety concerns. New materials for anodes such as silicon, germanium, and phosphorus, are examples of materials that have been investigated having theoretical capacities greater than 1000 mAh g$^{-1}$ and voltages lower than 0.5 V vs Li/Li$^+$. However, these materials have challenges associated with the large volume expansion upon lithiation, sometimes greater than 300%, leading to low cycling stability.

When triptycene-based frameworks are synthesized in a way that incorporates benzimidazole linkers, these compounds are shown to undergo an energy storage mechanism at low potentials, providing a high capacity of 557 mAh g$^{-1}$. This capacity is obtained at room temperature and the framework is stable for over 500 cycles. No perylene diimide-containing material has ever been shown to be stable for this large amount of cycling for lithium-ion batteries.

SUMMARY

According to an embodiment, the present disclosure provides a compound comprising a triptycene having one or more arylene diimide groups attached forming a crosslinked network.

The present disclosure provides an electroactive material comprising the molecular structure according to formula ST1:

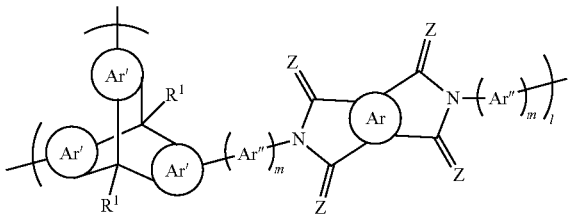

ST1

Wherein, m is a number of repeat units ranging from 0 to 5, alternatively m may be a number of repeat units ranging from 1 to 5;

l is a number of repeat units for the extension of the crosslinking network that range independently from each of the vertex triptycene units from 1 to 5000;

R$^1$ is, independently, a hydrogen atom, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, or an ionically conductive chain such as (poly)ethylene glycol;

Z is, independently, an oxygen atom, a sulfur atom, a selenium atom, an imine group substituted with a hydrogen, alkyl chain such as, but not limited to, methyl, ethyl, propyl, isopropyl, butyl, isobutyl, tert-butyl or pentyl, an aromatic group, or a crosslinking agent;

Ar is, independently, an aromatic group with an arrangement of aromatic rings numbering between 1 and 6, a substituted aromatic group with substitutions including, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, an ionically conductive chain such as (poly)ethylene glycol, an amino group, a cyano group, a nitro group, a hydroxyl group, a perfluoro alkyl group, or a halogen, or a heteroaromatic group containing hydrogen atoms, carbon atoms, nitrogen atoms, silicon atoms, germanium atoms, or phosphorus atoms in any substitution pattern or in any number ranging, independently, between 0 and 26, or a substituted heteroaromatic group with substitutions including, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, an ionically conductive chain such as (poly)ethylene glycol, an amino group, a cyano group, a nitro group, a hydroxyl group, a perfluoro alkyl group, or a halogen;

Ar' is, independently, a phenyl group, a quinone, a hydroxyquinone, or a heteroaromatic group such as, but not limited to, pyridine, thiophene, pyrrole, or a substituted aromatic group with cyano groups, carboxyl groups, nitro groups, or amine groups attached;

Ar" is a linking group that be, independently, a phenyl group, a quinone, a hydroxyquinone, a heteroaromatic group such as, but not limited to, pyridine, thiophene, pyrrole, or a substituted aromatic group with cyano groups, carboxyl groups, nitro groups, or amine groups attached, and contain an oxygen atom, a sulfur atom, a selenium atom, a nitrogen atom substituted with any of the combinations of a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent, bonded adjacent to the groups mentioned above.

In this aspect the electroactive material comprises the molecular structure according to Formula (1):

Formula (1)

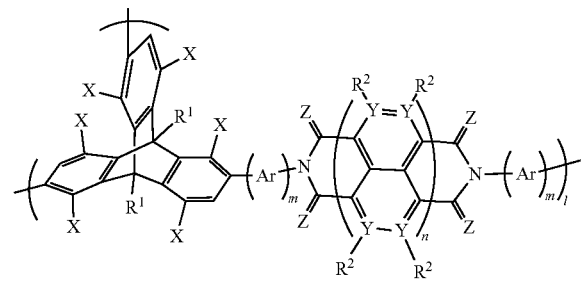

Wherein, n is a number of repeat units ranging from 1 to 3;

m is a number of repeat units ranging from 0 to 5, alternatively m may be a number of repeat units ranging from 1 to 5;

l is a number of repeat units for the extension of the crosslinking network that ranges independently from each of the vertex triptycene units from 1 to 5000;

$R^1$ is, independently, a hydrogen atom, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, or an ionically conductive chain such as (poly)ethylene glycol;

$R^2$ is, independently, a hydrogen atom, a lone pair of electrons, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, an ionically conductive chain such as (poly)ethylene glycol, an amino group, a cyano group, a nitro group, a hydroxyl group, a perfluoro alkyl group, or a halogen;

Y is, independently, a carbon atom, a nitrogen atom, a silicon atom, a germanium atom or a phosphorus atom;

Z is, independently, an oxygen atom, a sulfur atom, a selenium atom, an imine group substituted with a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent;

X is, independently, a hydroxyl group, a thiol group, an amine substituted with any of the combinations of a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent.

Ar is, independently, a phenyl group, a quinone, a hydroxyquinone, a heteroaromatic group such as, but not limited to, pyridine, thiophene, pyrrole, or a substituted aromatic group with cyano groups, carboxyl groups, nitro groups, or amine groups attached.

$R^1$, $R^2$ and X may be hydrogens, n may equal to 2, m may equal to 0, Y may be a carbon atom, Z may be an oxygen atom, and l may be equal to an integer between 0 and 5000. The electroactive material may have a capacity retention of over 80% after 500 cycles The present disclosure provides an electroactive material comprising the molecular structure according to Formula (2):

Formula (2)

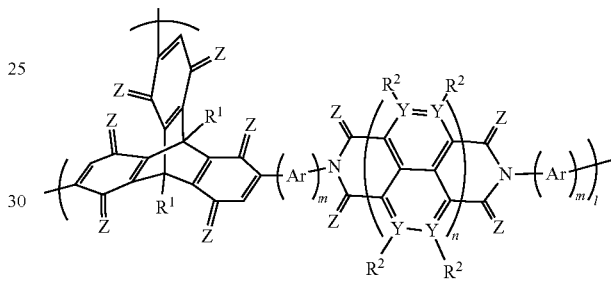

Wherein, n is a number of repeat units ranging from 1 to 3;

m is a number of repeat units ranging from 0 to 5, alternatively m may be a number of repeat units ranging from 1 to 5;

l is a number of repeat units for the extension of the crosslinking network that range independently from each of the vertex triptycene units from 1 to 5000;

$R^1$ is, independently, a hydrogen atom, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, or an ionically conductive chain such as (poly)ethylene glycol;

$R^2$ is, independently, a hydrogen atom, a lone pair of electrons, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, an ionically conductive chain such as (poly)ethylene glycol, an amino group, a cyano group, a nitro group, a hydroxyl group, a perfluoro alkyl group, or a halogen;

Y is, independently, a carbon atom, a nitrogen atom, a silicon atom, a germanium atom or a phosphorus atom;

is, independently, an oxygen atom, a sulfur atom, a selenium atom, an imine group substituted with a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent.

Ar is, independently, a phenyl group, a quinone, a hydroxyquinone, a heteroaromatic group such as, but not limited to, pyridine, thiophene, pyrrole, or a substituted aromatic group with cyano groups, carboxyl groups, nitro groups, or amine groups attached.

The present disclosure provides an electroactive material comprising the molecular structure according to Formula (3);

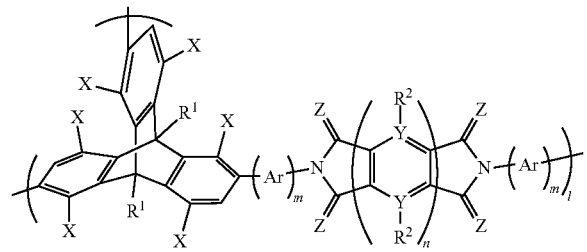

Formula (3)

Wherein, n is a number of repeat units ranging from 1 to 3;

m is a number of repeat units ranging from 0 to 5, alternatively m may be a number of repeat units ranging from 1 to 5;

l is a number of repeat units for the extension of the crosslinking network that range independently from each of the vertex triptycene units from 1 to 5000;

$R^1$ is, independently, a hydrogen atom, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, or an ionically conductive chain such as (poly)ethylene glycol;

$R^2$ is, independently, a hydrogen atom, a lone pair of electrons, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, an ionically conductive chain such as (poly)ethylene glycol, an amino group, a cyano group, a nitro group, a hydroxyl group, a perfluoro alkyl group, or a halogen;

Y is, independently, a carbon atom, a nitrogen atom, a silicon atom, a germanium atom or a phosphorus atom;

Z is, independently, an oxygen atom, a sulfur atom, a selenium atom, an imine group substituted with a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent.

Ar is, independently, a phenyl group, a quinone, a hydroxyquinone, a heteroaromatic group such as, but not limited to, pyridine, thiophene, pyrrole, or a substituted aromatic group with cyano groups, carboxyl groups, nitro groups, or amine groups attached.

X is, independently, a hydroxyl group, a thiol group, an amine substituted with any of the combinations of a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent.

The present disclosure provides an electroactive material comprising the molecular structure according to Formula (4)

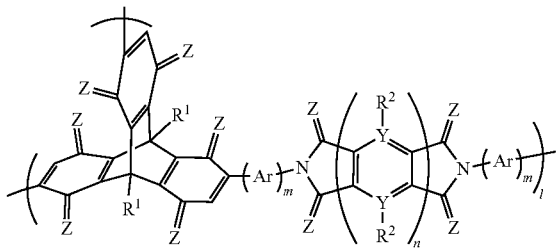

Formula (4)

wherein, n is a number of repeat units ranging from 1 to 3;

m is a number of repeat units ranging from 0 to 5, alternatively m may be a number of repeat units ranging from 1 to 5;

l is a number of repeat units for the extension of the crosslinking network that range independently from each of the vertex triptycene units from 1 to 5000;

$R^1$ is, independently, a hydrogen atom, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, or an ionically conductive chain such as (poly)ethylene glycol;

$R^2$ is, independently, a hydrogen atom, a lone pair of electrons, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, an ionically conductive chain such as (poly)ethylene glycol, an amino group, a cyano group, a nitro group, a hydroxyl group, a perfluoro alkyl group, or a halogen;

Y is, independently, a carbon atom, a nitrogen atom, a silicon atom, a germanium atom or a phosphorus atom;

Z is, independently, an oxygen atom, a sulfur atom, a selenium atom, an imine group substituted with a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent.

Ar is, independently, a phenyl group, a quinone, a hydroxyquinone, a heteroaromatic group such as, but not limited to, pyridine, thiophene, pyrrole, or a substituted aromatic group with cyano groups, carboxyl groups, nitro groups, or amine groups attached.

The present disclosure provides an electroactive material comprising the molecular structure according to Formula (5);

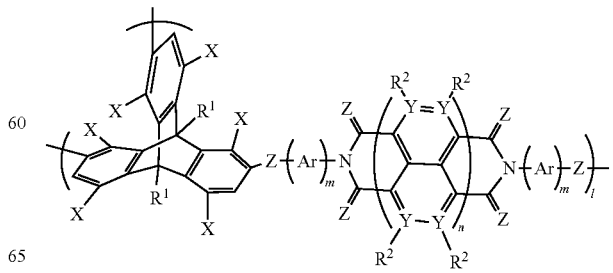

Formula (5)

wherein, n is a number of repeat units ranging from 1 to 3;

m is a number of repeat units ranging from 0 to 5, alternatively m may be a number of repeat units ranging from 1 to 5;

l is a number of repeat units for the extension of the crosslinking network that range independently from each of the vertex triptycene units from 1 to 5000;

$R^1$ is, independently, a hydrogen atom, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, or an ionically conductive chain such as (poly)ethylene glycol;

$R^2$ is, independently, a hydrogen atom, a lone pair of electrons, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, an ionically conductive chain such as (poly)ethylene glycol, an amino group, a cyano group, a nitro group, a hydroxyl group, a perfluoro alkyl group, or a halogen;

Y is, independently, a carbon atom, a nitrogen atom, a silicon atom, a germanium atom or a phosphorus atom;

Z is, independently, an oxygen atom, a sulfur atom, a selenium atom, a nitrogen atom substituted with any of the combinations of a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent.

Ar is, independently, a phenyl group, a quinone, a hydroxyquinone, a heteroaromatic group such as, but not limited to, pyridine, thiophene, pyrrole, or a substituted aromatic group with cyano groups, carboxyl groups, nitro groups, or amine groups attached.

X is, independently, a hydroxyl group, a thiol group, an amine substituted with any of the combinations of a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent.

The present disclosure provides an electroactive material comprising the molecular structure according to Formula (6):

The present disclosure provides an electroactive material comprising the molecular structure according to Formula (7):

Formula (6)

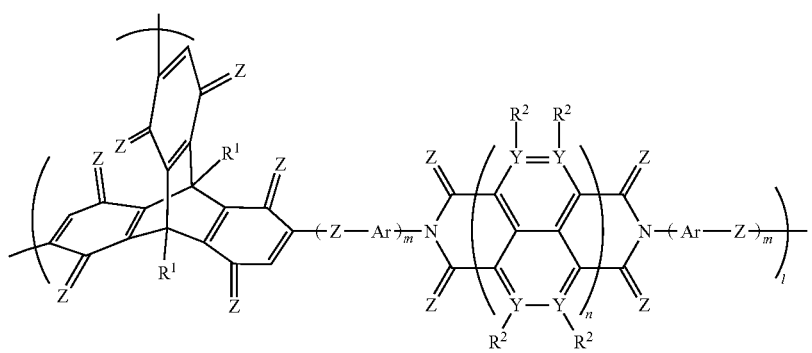

Formula (7)

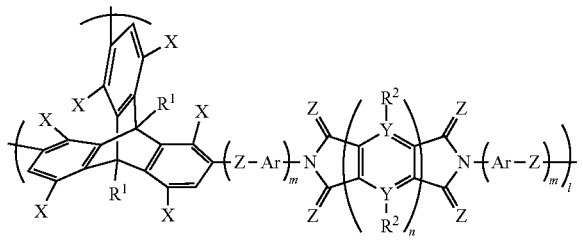

wherein, n is a number of repeat units ranging from 1 to 3;

m is a number of repeat units ranging from 0 to 5, alternatively m may be a number of repeat units ranging from 1 to 5;

l is a number of repeat units for the extension of the crosslinking network that range independently from each of the vertex triptycene units from 1 to 5000;

$R^1$ is, independently, a hydrogen atom, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, or an ionically conductive chain such as (poly)ethylene glycol;

$R^2$ is, independently, a hydrogen atom, a lone pair of electrons, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, an ionically conductive chain such as (poly)ethylene glycol, an amino group, a cyano group, a nitro group, a hydroxyl group, a perfluoro alkyl group, or a halogen;

Y is, independently, a carbon atom, a nitrogen atom, a silicon atom, a germanium atom or a phosphorus atom;

Z is, independently, an oxygen atom, a sulfur atom, a selenium atom, a nitrogen atom substituted with any of the combinations of a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent.

Ar is, independently, a phenyl group, a quinone, a hydroxyquinone, a heteroaromatic group such as, but not limited to, pyridine, thiophene, pyrrole, or a substituted aromatic group with cyano groups, carboxyl groups, nitro groups, or amine groups attached.

X is, independently, a hydroxyl group, a thiol group, an amine substituted with any of the combinations of a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent.

The present disclosure provides an electroactive material comprising the molecular structure according to Formula (8):

Formula (8)

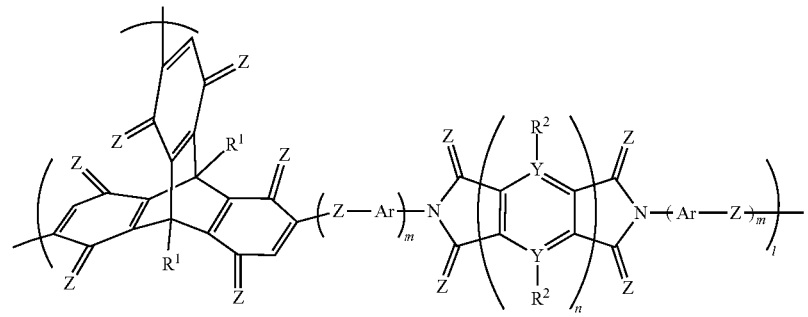

wherein, n is a number of repeat units ranging from 1 to 3;

m is a number of repeat units ranging from 0 to 5, alternatively m may be a number of repeat units ranging from 1 to 5;

l is a number of repeat units for the extension of the crosslinking network that range independently from each of the vertex triptycene units from 1 to 5000;

$R^1$ is, independently, a hydrogen atom, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, or an ionically conductive chain such as (poly)ethylene glycol;

$R^2$ is, independently, a hydrogen atom, a lone pair of electrons, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, an ionically conductive chain such as (poly)ethylene glycol, an amino group, a cyano group, a nitro group, a hydroxyl group, a perfluoro alkyl group, or a halogen;

Y is, independently, a carbon atom, a nitrogen atom, a silicon atom, a germanium atom or a phosphorus atom;

Z is, independently, an oxygen atom, a sulfur atom, a selenium atom, a nitrogen atom substituted with any of the combinations of a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent.

Ar is, independently, a phenyl group, a quinone, a hydroxyquinone, a heteroaromatic group such as, but not limited to, pyridine, thiophene, pyrrole, or a substituted aromatic group with cyano groups, carboxyl groups, nitro groups, or amine groups attached.

The present disclosure provides an energy storage device comprising electrodes made of at least one electroactive material of any one of formulas 1 to 8. This energy storage device may be used as a lithium ion battery, sodium ion battery, magnesium ion battery, aluminium ion battery, potassium ion battery, a supercapacitor, a capacitor, a solid-state battery, an aqueous battery, or a hybrid device.

There is provided a process for producing an electroactive material comprising the molecular structure according to formula ST1, comprising the steps:

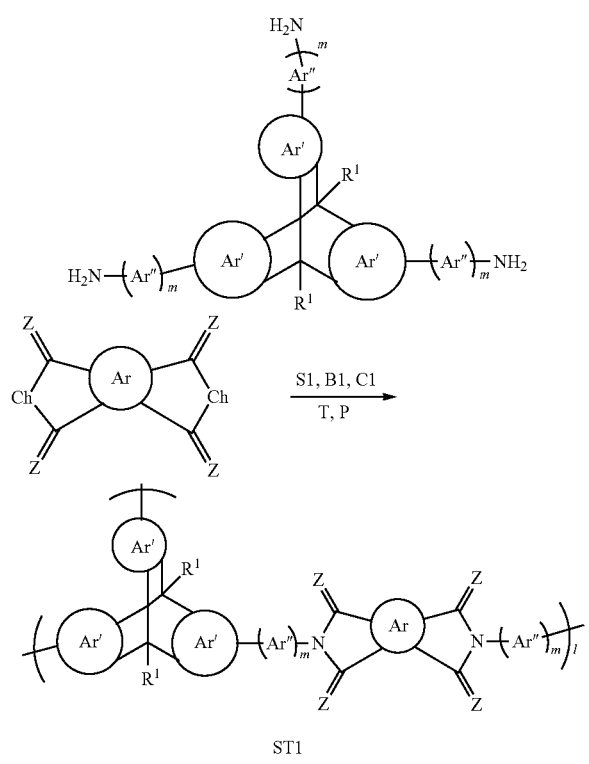

ST1

Wherein, m is a number of repeat units ranging from 0 to 5, alternatively m may be a number of repeat units ranging from 1 to 5;

l is a number of repeat units for the extension of the crosslinking network that range independently from each of the vertex triptycene units from 1 to 5000;

$R^1$ is, independently, a hydrogen atom, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, or an ionically conductive chain such as (poly)ethylene glycol;

Z is, independently, an oxygen atom, a sulfur atom, a selenium atom, an imine group substituted with a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent;

Ar is, independently, an aromatic group with an arrangement of aromatic rings numbering between 1 and 6, a substituted aromatic group with substitutions including, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, an ionically conductive chain such as (poly)ethylene glycol, an amino group, a cyano group, a nitro group, a hydroxyl group, a perfluoro alkyl group, or a halogen, or a heteroaromatic group containing hydrogen atoms, carbon atoms, nitrogen atoms, silicon atoms, germanium atoms, or phosphorus atoms in any substitution pattern or in any number ranging, independently, between 0 and 26, or a substituted heteroaromatic group with substitutions including, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, an ionically conductive chain such as (poly)ethylene glycol, an amino group, a cyano group, a nitro group, a hydroxyl group, a perfluoro alkyl group, or a halogen;

Ar' is, independently, a phenyl group, a quinone, a hydroxyquinone, a heteroaromatic group such as, but not limited to, pyridine, thiophene, pyrrole, or a substituted aromatic group with cyano groups, carboxyl groups, nitro groups, or amine groups attached;

Ar'' is a linking group that be, independently, a phenyl group, a quinone, a hydroxyquinone, a heteroaromatic group such as, but not limited to, pyridine, thiophene, pyrrole, or a substituted aromatic group with cyano groups, carboxyl groups, nitro groups, or amine groups attached, and contain an oxygen atom, a sulfur atom, a selenium atom, a nitrogen atom substituted with any of the combinations of a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent, bonded adjacent to the groups mentioned above.

Ch is an atom such as sulfur or oxygen that is removed from the product via a condensation reaction to form $ChH_2$;

S1 is a solvent;
B1 is a base;
C1 is a catalyst;

The temperature, T, is between −20 and 220 degrees Celsius and the pressure, P, is between 0.01 and 10 atmospheres.

S1 is any one or a combination of quinoline, triethylamine, imidazole, pyridine, piperidine, pyrimidine, pyrrolidine, water, dimethylacetimide, toluene, xylene, benzene, glyme, dimethyl formamide, acetonitrile, and dimethylsulfoxide.

B1 is any one or a combination of quinoline, triethylamine, imidazole, pyridine, piperidine, pyrimidine, and pyrrolidine.

C1 is a Lewis acid such as zinc (II) acetate, aluminium (III) chloride, trimethyl aluminium, tributyl aluminium, and titanium chloride.

B1 may be selected from a group of quinoline, triethylamine, imidazole, pyridine, piperidine, pyrimidine, and pyrrolidine. S1 may be selected from a group of quinoline, triethylamine, imidazole, pyridine, piperidine, pyrimidine, pyrrolidine, water, dimethylacetimide, toluene, xylene, benzene, glyme, dimethyl formamide, acetonitrile, and dimethylsulfoxide. C1 may be selected form a group of zinc (II) acetate, aluminium (III) chloride, trimethyl aluminium, tributyl aluminium, and titanium chloride and m may be equal to 0, l is in a range between 1 and 5000, $R^1$, is a hydrogen atom, Ar is a perylene group, Ar' is a phenyl group, Z and Ch are an oxygen atom, S1 and B1 are imidazole, and C1 is zinc (II) acetate.

The present disclosure provides a compound comprising a triptycene having one or more arylene diimide groups attached forming a crosslinked network.

The present disclosure provides an electroactive material comprising the molecular structure according to formula ST2A/B:

ST2A/B

ST2A

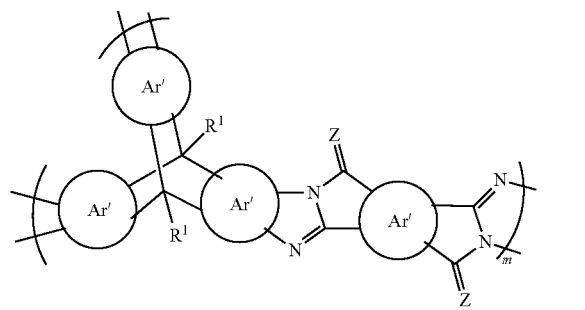

ST2B

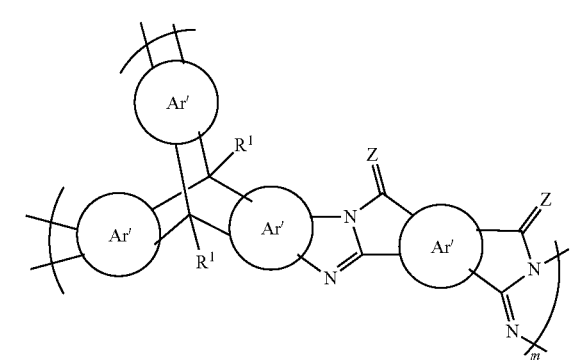

wherein, m is a number of repeat units for the extension of the crosslinking network that range independently from each of the vertex triptycene units from 1 to 5000;

$R^1$ is, independently, a hydrogen atom, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, or an ionically conductive chain such as (poly)ethylene glycol;

Z is, independently, an oxygen atom, a sulfur atom, a selenium atom, an imine group substituted with a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent;

Ar is, independently, an aromatic group with an arrangement of aromatic rings numbering between 1 and 6, a substituted aromatic group with substitutions including, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, an ionically conductive chain such as (poly)ethylene glycol, an amino group, a cyano group, a nitro group, a hydroxyl group, a perfluoro alkyl group, or a halogen, or a heteroaromatic group containing hydrogen atoms, carbon atoms, nitrogen atoms, silicon atoms, germanium atoms, or phosphorus atoms in any substitution pattern or in any number ranging, independently, between 0 and 26, or a substituted heteroaromatic group with substitutions including, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, an ionically conductive chain such as (poly)ethylene glycol, an amino group, a cyano group, a nitro group, a hydroxyl group, a perfluoro alkyl group, or a halogen; and Ar' is, independently, a phenyl group, a quinone, a hydroxyquinone, a heteroaromatic group such as, but not limited to, pyridine, thiophene, pyrrole, or a substituted aromatic group with cyano groups, carboxyl groups, nitro groups, or amine groups attached.

The present disclosure provides an electroactive material comprising the molecular structure according to Formula (9A/B):

Formula (9A/B)

Formula 9A

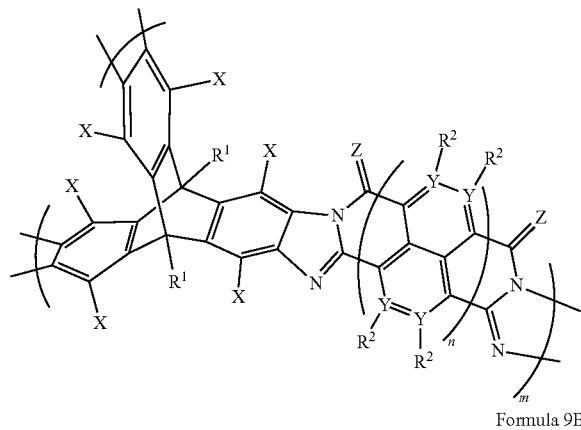

Formula 9B

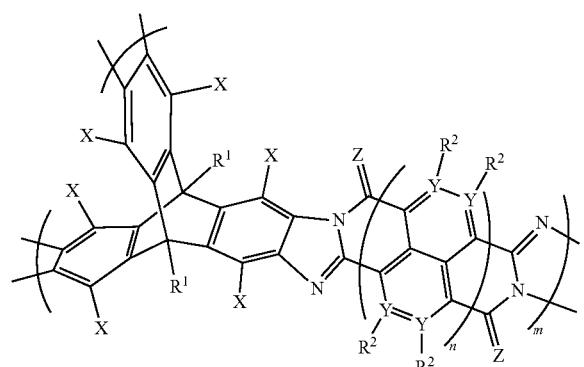

Wherein, n is a number of repeat units ranging from 1 to 3;

m is a number of repeat units for the extension of the crosslinking network that range independently from each of the vertex triptycene units from 1 to 5000;

$R^1$ is, independently, a hydrogen atom, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, or an ionically conductive chain such as (poly)ethylene glycol;

$R^2$ is, independently, a hydrogen atom, a lone pair of electrons, an an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, an ionically conductive chain such as (poly)ethylene glycol, an amino group, a cyano group, a nitro group, a hydroxyl group, a perfluoro alkyl group, or a halogen;

Y is, independently, a carbon atom, a nitrogen atom, a silicon atom, a germanium atom or a phosphorus atom;

Z is, independently, an oxygen atom, a sulfur atom, a selenium atom, a nitrogen atom substituted with any of the combinations of a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent.

X is, independently, a hydroxyl group, a thiol group, an amine substituted with any of the combinations of a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent.

$R^1$, $R^2$ and X are hydrogens, n is equal to 2, Y is a carbon atom, Z is an oxygen atom, and m is equal to an integer between 1 and 5000, and this compound has a capacity of about 557 mAh g$^{-1}$.

The present disclosure provides an electroactive material comprising the molecular structure according to Formula (10A/B):

Wherein, n is a number of repeat units ranging from 1 to 3;

m is a number of repeat units for the extension of the crosslinking network that range independently from each of the vertex triptycene units from 1 to 5000;

$R^1$ is, independently, a hydrogen atom, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, or an ionically conductive chain such as (poly)ethylene glycol;

$R^2$ is, independently, a hydrogen atom, a lone pair of electrons, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, an ionically conductive chain such as (poly)ethylene glycol, an amino group, a cyano group, a nitro group, a hydroxyl group, a perfluoro alkyl group, or a halogen;

Y is, independently, a carbon atom, a nitrogen atom, a silicon atom, a germanium atom or a phosphorus atom;

Z is, independently, an oxygen atom, a sulfur atom, a selenium atom, a nitrogen atom substituted with any of the combinations of a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent.

In this aspect the electroactive material may have the structure according to Formula (11A/B):

Formula (10A/B)

Formula 10A

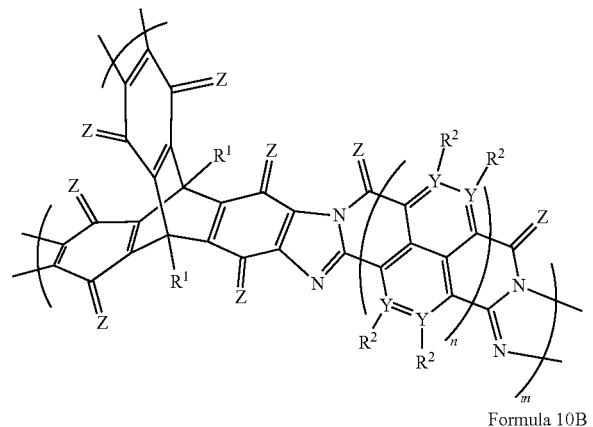

Formula (11A/B)

Formula 11A

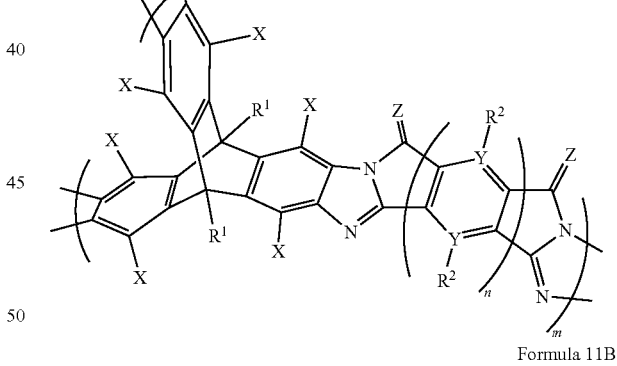

Formula 10B

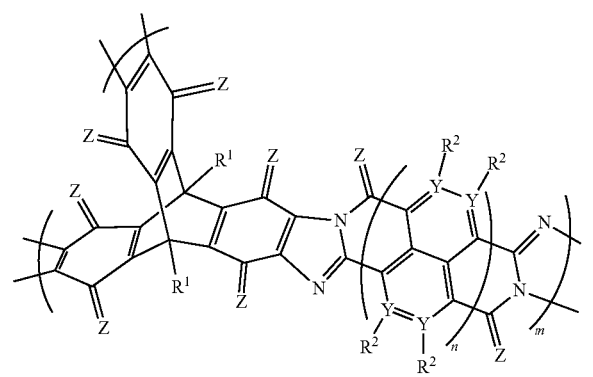

Formula 11B

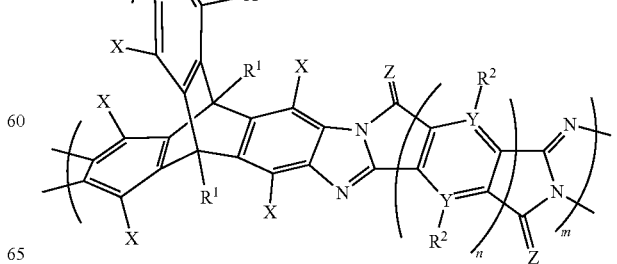

wherein, n is a number of repeat units ranging from 1 to 3;

m is a number of repeat units for the extension of the crosslinking network that range independently from each of the vertex triptycene units from 1 to 5000;

$R^1$ is, independently, a hydrogen atom, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, or an ionically conductive chain such as (poly)ethylene glycol;

$R^2$ is, independently, a hydrogen atom, a lone pair of electrons, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, an ionically conductive chain such as (poly)ethylene glycol, an amino group, a cyano group, a nitro group, a hydroxyl group, a perfluoro alkyl group, or a halogen;

Y is, independently, a carbon atom, a nitrogen atom, a silicon atom, a germanium atom or a phosphorus atom;

Z is, independently, an oxygen atom, a sulfur atom, a selenium atom, a nitrogen atom substituted with any of the combinations of a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent.

X is, independently, a hydroxyl group, a thiol group, an amine substituted with any of the combinations of a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent.

$R^1$, $R^2$ and X are hydrogens, n is equal to 1, Y is a carbon atom, Z is an oxygen atom, and m is equal to an integer between 1 and 5000.

There is provides an electroactive material comprising the molecular structure according to Formula (12A/B):

Formula (12A/B)

Formula 12A

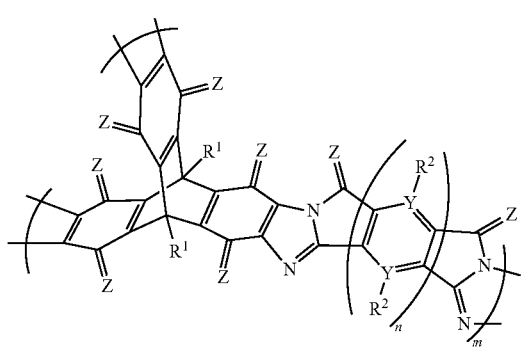

-continued

Formula 12B

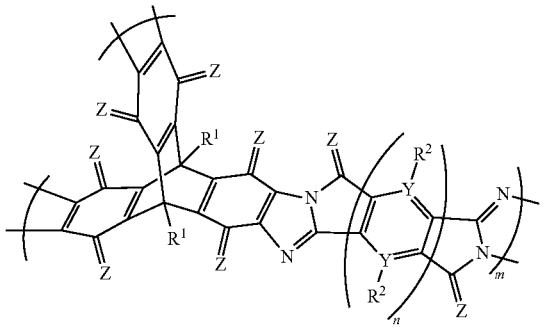

wherein, n is a number of repeat units ranging from 1 to 3;

m is a number of repeat units for the extension of the crosslinking network that range independently from each of the vertex triptycene units from 1 to 5000;

$R^1$ is, independently, a hydrogen atom, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, or an ionically conductive chain such as (poly)ethylene glycol;

$R^2$ is, independently, a hydrogen atom, a lone pair of electrons, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, an ionically conductive chain such as (poly)ethylene glycol, an amino group, a cyano group, a nitro group, a hydroxyl group, a perfluoro alkyl group, or a halogen;

Y is, independently, a carbon atom, a nitrogen atom, a silicon atom, a germanium atom or a phosphorus atom;

Z is, independently, an oxygen atom, a sulfur atom, a selenium atom, a nitrogen atom substituted with any of the combinations of a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent.

There is disclosed herein a process for producing an electroactive material comprising the molecular structure according to formula ST2A/B, comprising the steps:

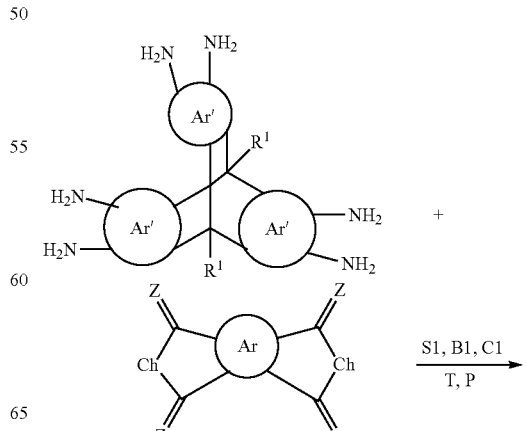

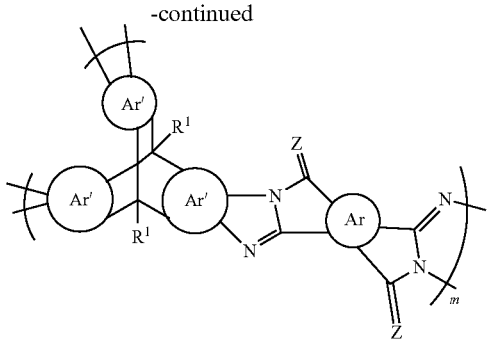

ST2A

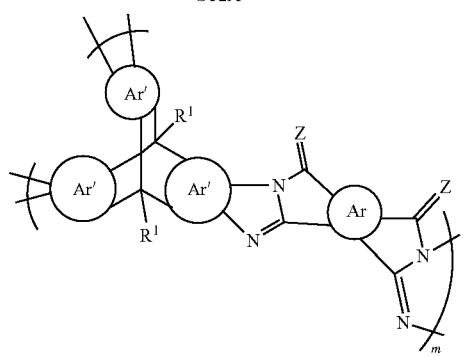

ST2B wherein, m is a number of repeat units for the extension of the crosslinking network that range independently from each of the vertex triptycene units from 1 to 5000;

$R^1$ is, independently, a hydrogen atom, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, or an ionically conductive chain such as (poly)ethylene glycol;

Z is, independently, an oxygen atom, a sulfur atom, a selenium atom, an imine group substituted with a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent;

Ar is, independently, an aromatic group with an arrangement of aromatic rings numbering between 1 and 6, a substituted aromatic group with substitutions including, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, an ionically conductive chain such as (poly)ethylene glycol, an amino group, a cyano group, a nitro group, a hydroxyl group, a perfluoro alkyl group, or a halogen, or a heteroaromatic group containing hydrogen atoms, carbon atoms, nitrogen atoms, silicon atoms, germanium atoms, or phosphorus atoms in any substitution pattern or in any number ranging, independently, between 0 and 26, or a substituted heteroaromatic group with substitutions including, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, an ionically conductive chain such as (poly)ethylene glycol, an amino group, a cyano group, a nitro group, a hydroxyl group, a perfluoro alkyl group, or a halogen;

Ar' is, independently, a phenyl group, a quinone, a hydroxyquinone, a heteroaromatic group such as, but not limited to, pyridine, thiophene, pyrrole, or a substituted aromatic group with cyano groups, carboxyl groups, nitro groups, or amine groups attached.

Ch is an atom such as sulfur or oxygen that is removed from the product via a condensation reaction to form $ChH_2$;

S1 is a solvent;

B1 is a base;

C1 is a catalyst;

the temperature, T, is between −20 and 220 degrees Celsius and the pressure, P, is between 0.01 and 10 atmospheres.

S1 is any one or a combination of quinoline, triethylamine, imidazole, pyridine, piperidine, pyrimidine, pyrrolidine, water, dimethylacetimide, toluene, xylene, benzene, glyme, dimethyl formamide, acetonitrile, and dimethylsulfoxide.

B1 is any one or a combination of quinoline, triethylamine, imidazole, pyridine, piperidine, pyrimidine, and pyrrolidine.

C1 is a Lewis acid such as zinc (II) acetate, aluminium (III) chloride, trimethyl aluminium, tributyl aluminium, and titanium chloride.

B1 is selected from a group of quinoline, triethylamine, imidazole, pyridine, piperidine, pyrimidine, and pyrrolidine.

S1 is selected from a group of quinoline, triethylamine, imidazole, pyridine, piperidine, pyrimidine, pyrrolidine, water, dimethylacetimide, toluene, xylene, benzene, glyme, dimethyl formamide, acetonitrile, and dimethylsulfoxide.

C1 is selected form a group of zinc (II) acetate, aluminium (III) chloride, trimethyl aluminium, tributyl aluminium, and titanium chloride.

The integer m is in a range between 1 and 5000, $R^1$ is a hydrogen atom, Ar is a perylene group, Ar' is a phenyl group, Z and Ch are an oxygen atom, S1 and B1 are imidazole, and C1 is zinc (II) acetate.

There is provided a process for producing an electroactive material comprising the molecular structure according to formula ST2A/B, comprising the steps

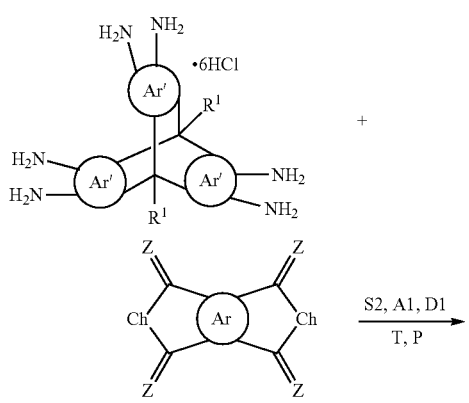

-continued

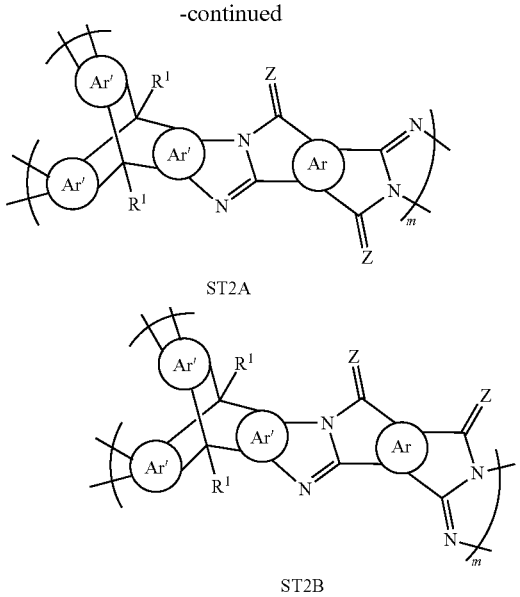

ST2A

ST2B wherein, m is a number of repeat units for the extension of the crosslinking network that range independently from each of the vertex triptycene units from 1 to 5000;

$R^1$ is, independently, a hydrogen atom, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, or an ionically conductive chain such as (poly)ethylene glycol;

Z is, independently, an oxygen atom, a sulfur atom, a selenium atom, an imine group substituted with a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent;

Ar is, independently, an aromatic group with an arrangement of aromatic rings numbering between 1 and 6, a substituted aromatic group with substitutions including, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, an ionically conductive chain such as (poly)ethylene glycol, an amino group, a cyano group, a nitro group, a hydroxyl group, a perfluoro alkyl group, or a halogen, or a heteroaromatic group containing hydrogen atoms, carbon atoms, nitrogen atoms, silicon atoms, germanium atoms, or phosphorus atoms in any substitution pattern or in any number ranging, independently, between 0 and 26, or a substituted heteroaromatic group with substitutions including, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, an ionically conductive chain such as (poly)ethylene glycol, an amino group, a cyano group, a nitro group, a hydroxyl group, a perfluoro alkyl group, or a halogen;

Ar' is, independently, a phenyl group, a quinone, a hydroxyquinone, a heteroaromatic group such as, but not limited to, pyridine, thiophene, pyrrole, or a substituted aromatic group with cyano groups, carboxyl groups, nitro groups, or amine groups attached.

Ch is an atom such as sulfur or oxygen that is removed from the product via a condensation reaction to form $ChH_2$;

S2 is a solvent;

A1 is an acid;

D1 is a dehydrating reagent;

The temperature, T, is between −20 and 220 degrees Celsius and the pressure, P, is between 0.01 and 10 atmospheres.

S2 is any one or a combination of phosphoric acid, acetic acid, polyphosphoric acid, sulfuric acid, acetic acid, hydrochloric acid, methanesulfonic acid, and para-toluene sulfonic acid, polyphosphoric acid, phosphorus pentoxide, molecular sieves, calcium chloride, concentrated sulfuric acid, water, dimethylacetimide, toluene, xylene, benzene, glyme, dimethyl formamide, acetonitrile, and dimethylsulfoxide.

A1 is an acid catalyst that drives the reaction to completion and is any one or a combination of phosphoric acid, acetic acid, polyphosphoric acid, sulfuric acid, acetic acid, hydrochloric acid, methanesulfonic acid, and para-toluene sulfonic acid.

D1 is a dehydrating reagent that is used to remove water from the reaction to drive it to completion and is one of polyphosphoric acid, phosphorus pentoxide, molecular sieves, calcium chloride, and concentrated sulfuric acid.

The acid catalyst A1 is any one, or combination of, phosphoric acid, acetic acid, polyphosphoric acid, sulfuric acid, acetic acid, hydrochloric acid, methanesulfonic acid, and para-toluene sulfonic acid.

The dehydrating reagent D1 is any one of polyphosphoric acid, phosphorus pentoxide, molecular sieves, calcium chloride, and concentrated sulfuric acid.

S2 is any one, or combination of phosphoric acid, acetic acid, polyphosphoric acid, sulfuric acid, acetic acid, hydrochloric acid, methanesulfonic acid, and para-toluene sulfonic acid, polyphosphoric acid, phosphorus pentoxide, molecular sieves, calcium chloride, concentrated sulfuric acid, water, dimethylacetimide, toluene, xylene, benzene, glyme, dimethyl formamide, acetonitrile, and dimethylsulfoxide.

The integer m is in a range between 1 and 5000, $R^1$ is a hydrogen atom, Ar and Ar' are a phenyl group, Z and Ch are an oxygen atom, and S2, A1, and D1 are polyphosphoric acid.

According to an embodiment, an electroactive material comprising the molecular structure according to formula ST1'. ST1' is closely related to ST1 previously described.

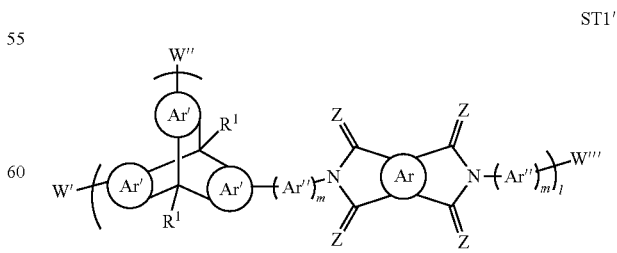

ST1'

According to an embodiment, when Ar, Ar', Ar" $R^1$, Z and m are as previously defined and I=1 then W' and W" is H and W''' is

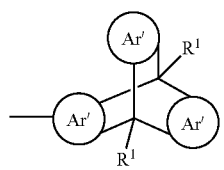

Under such selected criteria, the electroactive material may comprise the molecular structure according to formula ST1″:

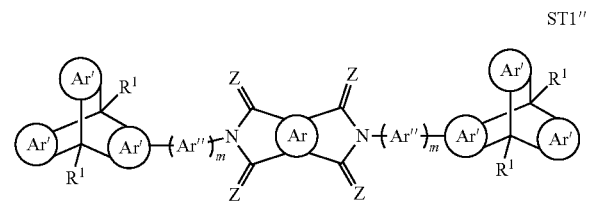

ST1″

Wherein, m is a number of repeat units ranging from 0 to 5, alternatively m may be a number of repeat units ranging from 1 to 5;

R¹ is, independently, a hydrogen atom, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, or an ionically conductive chain such as (poly)ethylene glycol;

Z is, independently, an oxygen atom, a sulfur atom, a selenium atom, an imine group substituted with a hydrogen, alkyl chain such as, but not limited to, methyl, ethyl, propyl, isopropyl, butyl, isobutyl, tert-butyl or pentyl, an aromatic group, or a crosslinking agent;

Ar is, independently, an aromatic group with an arrangement of aromatic rings numbering between 1 and 6, a substituted aromatic group with substitutions including, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, an ionically conductive chain such as (poly)ethylene glycol, an amino group, a cyano group, a nitro group, a hydroxyl group, a perfluoro alkyl group, or a halogen, or a heteroaromatic group containing hydrogen atoms, carbon atoms, nitrogen atoms, silicon atoms, germanium atoms, or phosphorus atoms in any substitution pattern or in any number ranging, independently, between 0 and 26, or a substituted heteroaromatic group with substitutions including, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, an ionically conductive chain such as (poly)ethylene glycol, an amino group, a cyano group, a nitro group, a hydroxyl group, a perfluoro alkyl group, or a halogen;

Ar' is, independently, a phenyl group, a quinone, a hydroxyquinone, or a heteroaromatic group such as, but not limited to, pyridine, thiophene, pyrrole, or a substituted aromatic group with cyano groups, carboxyl groups, nitro groups, or amine groups attached;

Ar″ is a linking group that be, independently, a phenyl group, a quinone, a hydroxyquinone, a heteroaromatic group such as, but not limited to, pyridine, thiophene, pyrrole, or a substituted aromatic group with cyano groups, carboxyl groups, nitro groups, or amine groups attached, and contain an oxygen atom, a sulfur atom, a selenium atom, a nitrogen atom substituted with any of the combinations of a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent, bonded adjacent to the groups mentioned above.

In this aspect the electroactive material comprises the molecular structure according to Formula (1)':

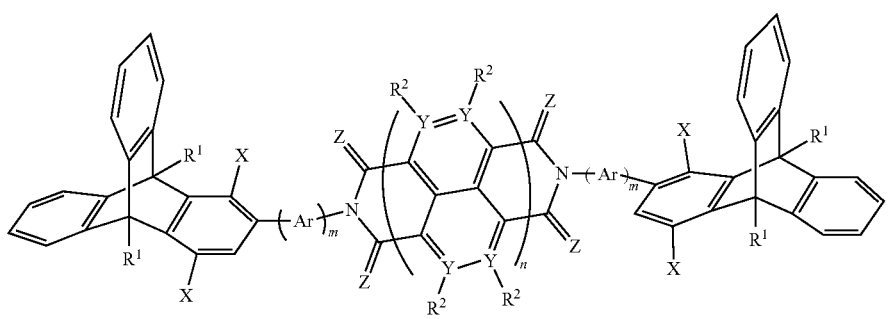

Formula (1)'

Wherein, n is a number of repeat units ranging from 1 to 3;

m is a number of repeat units ranging from 0 to 5, alternatively m may be a number of repeat units ranging from 1 to 5;

R¹ is, independently, a hydrogen atom, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, or an ionically conductive chain such as (poly)ethylene glycol;

$R^2$ is, independently, a hydrogen atom, a lone pair of electrons, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, an ionically conductive chain such as (poly)ethylene glycol, an amino group, a cyano group, a nitro group, a hydroxyl group, a perfluoro alkyl group, or a halogen;

Y is, independently, a carbon atom, a nitrogen atom, a silicon atom, a germanium atom or a phosphorus atom;

Z is, independently, an oxygen atom, a sulfur atom, a selenium atom, an imine group substituted with a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent;

X is, independently, a hydroxyl group, a thiol group, an amine substituted with any of the combinations of a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent.

Ar is, independently, a phenyl group, a quinone, a hydroxyquinone, a heteroaromatic group such as, but not limited to, pyridine, thiophene, pyrrole, or a substituted aromatic group with cyano groups, carboxyl groups, nitro groups, or amine groups attached.

$R^1$, $R^2$ and X may be hydrogens, n may equal to 2, m may equal to 0, Y may be a carbon atom, and Z may be an oxygen atom. The electroactive material may have a capacity retention of over 80% after 500 cycles The present disclosure provides an electroactive material comprising the molecular structure according to Formula (2)':

Wherein, n is a number of repeat units ranging from 1 to 3;

m is a number of repeat units ranging from 0 to 5, alternatively m may be a number of repeat units ranging from 1 to 5;

$R^1$ is, independently, a hydrogen atom, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, or an ionically conductive chain such as (poly)ethylene glycol;

$R^2$ is, independently, a hydrogen atom, a lone pair of electrons, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, an ionically conductive chain such as (poly)ethylene glycol, an amino group, a cyano group, a nitro group, a hydroxyl group, a perfluoro alkyl group, or a halogen;

Y is, independently, a carbon atom, a nitrogen atom, a silicon atom, a germanium atom or a phosphorus atom;

Z is, independently, an oxygen atom, a sulfur atom, a selenium atom, an imine group substituted with a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent.

Ar is, independently, a phenyl group, a quinone, a hydroxyquinone, a heteroaromatic group such as, but not limited to, pyridine, thiophene, pyrrole, or a substituted aromatic group with cyano groups, carboxyl groups, nitro groups, or amine groups attached.

The present disclosure provides an electroactive material comprising the molecular structure according to Formula (3)';

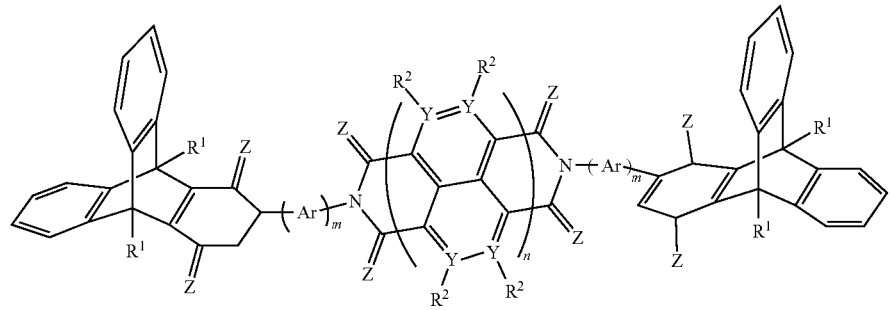

Formula (2)'

Formula (3)'

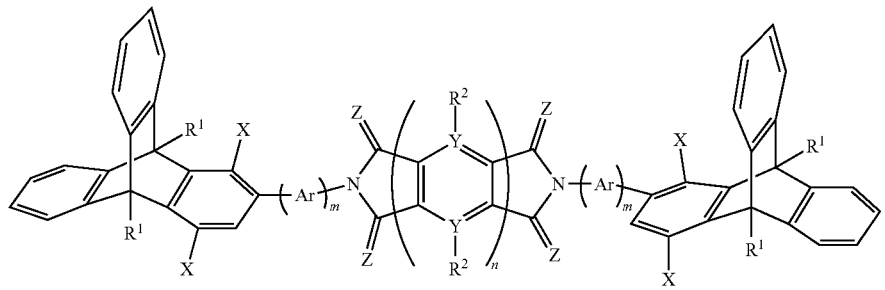

Wherein, n is a number of repeat units ranging from 1 to 3;

m is a number of repeat units ranging from 0 to 5, alternatively m may be a number of repeat units ranging from 1 to 5;

$R^1$ is, independently, a hydrogen atom, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, or an ionically conductive chain such as (poly)ethylene glycol;

$R^2$ is, independently, a hydrogen atom, a lone pair of electrons, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, an ionically conductive chain such as (poly)ethylene glycol, an amino group, a cyano group, a nitro group, a hydroxyl group, a perfluoro alkyl group, or a halogen;

Y is, independently, a carbon atom, a nitrogen atom, a silicon atom, a germanium atom or a phosphorus atom;

Z is, independently, an oxygen atom, a sulfur atom, a selenium atom, an imine group substituted with a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent.

Ar is, independently, a phenyl group, a quinone, a hydroxyquinone, a heteroaromatic group such as, but not limited to, pyridine, thiophene, pyrrole, or a substituted aromatic group with cyano groups, carboxyl groups, nitro groups, or amine groups attached.

X is, independently, a hydroxyl group, a thiol group, an amine substituted with any of the combinations of a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent.

The present disclosure provides an electroactive material comprising the molecular structure according to Formula (4)'

Formula (4)'

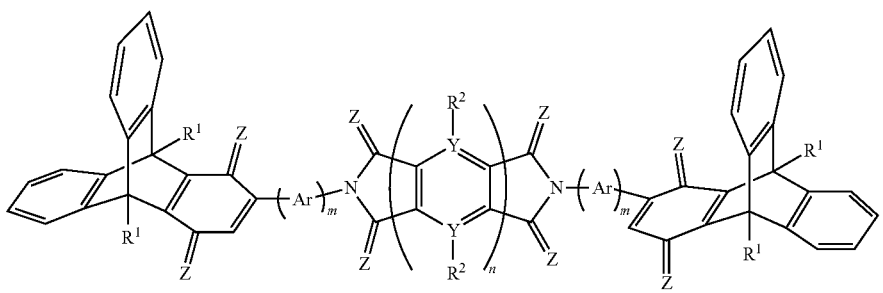

wherein, n is a number of repeat units ranging from 1 to 3;

m is a number of repeat units ranging from 0 to 5, alternatively m may be a number of repeat units ranging from 1 to 5;

$R^1$ is, independently, a hydrogen atom, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, or an ionically conductive chain such as (poly)ethylene glycol;

$R^2$ is, independently, a hydrogen atom, a lone pair of electrons, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, an ionically conductive chain such as (poly)ethylene glycol, an amino group, a cyano group, a nitro group, a hydroxyl group, a perfluoro alkyl group, or a halogen;

Y is, independently, a carbon atom, a nitrogen atom, a silicon atom, a germanium atom or a phosphorus atom;

Z is, independently, an oxygen atom, a sulfur atom, a selenium atom, an imine group substituted with a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent.

Ar is, independently, a phenyl group, a quinone, a hydroxyquinone, a heteroaromatic group such as, but not limited to, pyridine, thiophene, pyrrole, or a substituted aromatic group with cyano groups, carboxyl groups, nitro groups, or amine groups attached.

The present disclosure provides an electroactive material comprising the molecular structure according to Formula (5)′;

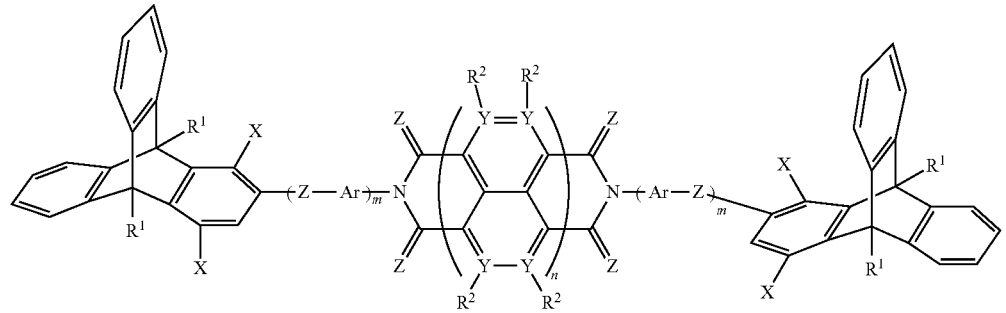

Formula (5)′ wherein, n is a number of repeat units ranging from 1 to 3;

m is a number of repeat units ranging from 0 to 5, alternatively m may be a number of repeat units ranging from 1 to 5;

$R^1$ is, independently, a hydrogen atom, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, or an ionically conductive chain such as (poly)ethylene glycol;

$R^2$ is, independently, a hydrogen atom, a lone pair of electrons, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, an ionically conductive chain such as (poly)ethylene glycol, an amino group, a cyano group, a nitro group, a hydroxyl group, a perfluoro alkyl group, or a halogen;

Y is, independently, a carbon atom, a nitrogen atom, a silicon atom, a germanium atom or a phosphorus atom;

Z is, independently, an oxygen atom, a sulfur atom, a selenium atom, a nitrogen atom substituted with any of the combinations of a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent.

Ar is, independently, a phenyl group, a quinone, a hydroxyquinone, a heteroaromatic group such as, but not limited to, pyridine, thiophene, pyrrole, or a substituted aromatic group with cyano groups, carboxyl groups, nitro groups, or amine groups attached.

X is, independently, a hydroxyl group, a thiol group, an amine substituted with any of the combinations of a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent.

The present disclosure provides an electroactive material comprising the molecular structure according to Formula (6)′:

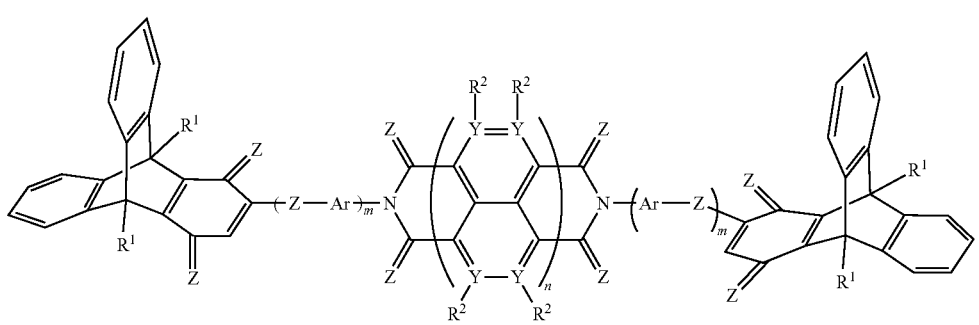

Formula (6)′

Wherein, n is a number of repeat units ranging from 1 to 3;

m is a number of repeat units ranging from 0 to 5, alternatively m may be a number of repeat units ranging from 1 to 5;

$R^1$ is, independently, a hydrogen atom, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, or an ionically conductive chain such as (poly)ethylene glycol;

$R^2$ is, independently, a hydrogen atom, a lone pair of electrons, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, an ionically conductive chain such as (poly)ethylene glycol, an amino group, a cyano group, a nitro group, a hydroxyl group, a perfluoro alkyl group, or a halogen;

Y is, independently, a carbon atom, a nitrogen atom, a silicon atom, a germanium atom or a phosphorus atom;

Z is, independently, an oxygen atom, a sulfur atom, a selenium atom, a nitrogen atom substituted with any of the combinations of a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent.

Ar is, independently, a phenyl group, a quinone, a hydroxyquinone, a heteroaromatic group such as, but not limited to, pyridine, thiophene, pyrrole, or a substituted aromatic group with cyano groups, carboxyl groups, nitro groups, or amine groups attached.

The present disclosure provides an electroactive material comprising the molecular structure according to Formula (7)':

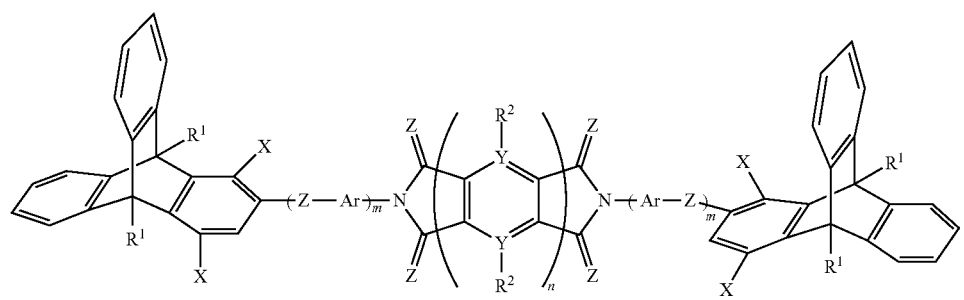

Formula (7)' wherein, n is a number of repeat units ranging from 1 to 3;

m is a number of repeat units ranging from 0 to 5, alternatively m may be a number of repeat units ranging from 1 to 5;

$R^1$ is, independently, a hydrogen atom, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, or an ionically conductive chain such as (poly)ethylene glycol;

$R^2$ is, independently, a hydrogen atom, a lone pair of electrons, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, an ionically conductive chain such as (poly)ethylene glycol, an amino group, a cyano group, a nitro group, a hydroxyl group, a perfluoro alkyl group, or a halogen;

Y is, independently, a carbon atom, a nitrogen atom, a silicon atom, a germanium atom or a phosphorus atom;

Z is, independently, an oxygen atom, a sulfur atom, a selenium atom, a nitrogen atom substituted with any of the combinations of a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent.

Ar is, independently, a phenyl group, a quinone, a hydroxyquinone, a heteroaromatic group such as, but not limited to, pyridine, thiophene, pyrrole, or a substituted aromatic group with cyano groups, carboxyl groups, nitro groups, or amine groups attached.

X is, independently, a hydroxyl group, a thiol group, an amine substituted with any of the combinations of a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent.

The present disclosure provides an electroactive material comprising the molecular structure according to Formula (8)':

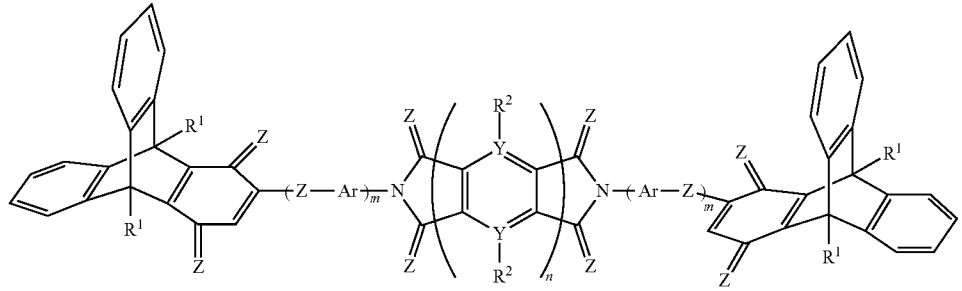

Formula (8)' wherein, n is a number of repeat units ranging from 1 to 3;

m is a number of repeat units ranging from 0 to 5, alternatively m may be a number of repeat units ranging from 1 to 5;

$R^1$ is, independently, a hydrogen atom, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, or an ionically conductive chain such as (poly)ethylene glycol;

$R^2$ is, independently, a hydrogen atom, a lone pair of electrons, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, an ionically conductive chain such as (poly)ethylene glycol, an amino group, a cyano group, a nitro group, a hydroxyl group, a perfluoro alkyl group, or a halogen;

Y is, independently, a carbon atom, a nitrogen atom, a silicon atom, a germanium atom or a phosphorus atom;

Z is, independently, an oxygen atom, a sulfur atom, a selenium atom, a nitrogen atom substituted with any of the combinations of a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent.

Ar is, independently, a phenyl group, a quinone, a hydroxyquinone, a heteroaromatic group such as, but not limited to, pyridine, thiophene, pyrrole, or a substituted aromatic group with cyano groups, carboxyl groups, nitro groups, or amine groups attached.

The present disclosure provides an energy storage device comprising electrodes made of at least one electroactive material of any one of formulas 1 to 8. This energy storage device may be used as a lithium ion battery, sodium ion battery, magnesium ion battery, aluminium ion battery, potassium ion battery, a supercapacitor, a capacitor, a solid-state battery, an aqueous battery, or a hybrid device.

According to an embodiment, an electroactive material comprising the molecular structure according to formula ST2'. ST2' is closely related to ST2 previously described.

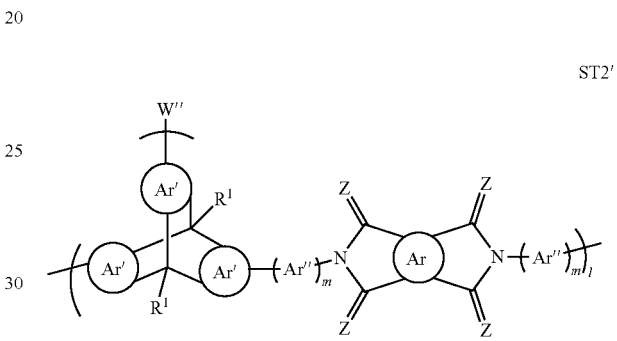

ST2'

According to an embodiment, when Ar, Ar', Ar'' $R^1$, Z and m are as previously defined and W'' is H. Under such selected criteria, the electroactive material may comprise the molecular structure according to formula ST2'':

The present disclosure provides an electroactive material comprising the molecular structure according to formula ST2'':

ST2''

Wherein, m is a number of repeat units ranging from 0 to 5, alternatively m may be a number of repeat units ranging from 1 to 5;

l is a number of repeat units that range independently from each of the vertex triptycene units from 1 to 5000;

$R^1$ is, independently, a hydrogen atom, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, or an ionically conductive chain such as (poly)ethylene glycol;

Z is, independently, an oxygen atom, a sulfur atom, a selenium atom, an imine group substituted with a hydrogen, alkyl chain such as, but not limited to, methyl, ethyl, propyl, isopropyl, butyl, isobutyl, tert-butyl or pentyl, an aromatic group, or a crosslinking agent;

Ar is, independently, an aromatic group with an arrangement of aromatic rings numbering between 1 and 6, a substituted aromatic group with substitutions including, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, an ionically conductive chain such as (poly)ethylene glycol, an amino group, a cyano group, a nitro group, a hydroxyl group, a perfluoro alkyl group, or a halogen, or a heteroaromatic group containing hydrogen atoms, carbon atoms, nitrogen atoms, silicon atoms, germanium atoms, or phosphorus atoms in any substitution pattern or in any number ranging, independently, between 0 and 26, or a substituted heteroaromatic group with substitutions including, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, an ionically conductive chain such as (poly)ethylene glycol, an amino group, a cyano group, a nitro group, a hydroxyl group, a perfluoro alkyl group, or a halogen;

Ar' is, independently, a phenyl group, a quinone, a hydroxyquinone, or a heteroaromatic group such as, but not limited to, pyridine, thiophene, pyrrole, or a substituted aromatic group with cyano groups, carboxyl groups, nitro groups, or amine groups attached;

Ar'' is a linking group that be, independently, a phenyl group, a quinone, a hydroxyquinone, a heteroaromatic group such as, but not limited to, pyridine, thiophene, pyrrole, or a substituted aromatic group with cyano groups, carboxyl groups, nitro groups, or amine groups attached, and contain an oxygen atom, a sulfur atom, a selenium atom, a nitrogen atom substituted with any of the combinations of a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent, bonded adjacent to the groups mentioned above.

In this aspect the electroactive material comprises the molecular structure according to Formula (1)'':

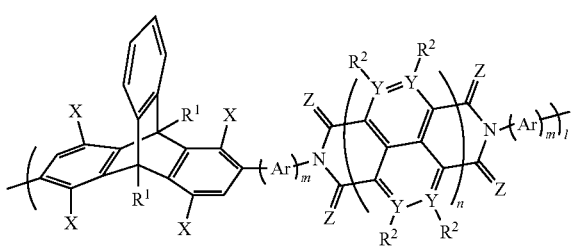

Formula (1)''

Wherein, n is a number of repeat units ranging from 1 to 3;

m is a number of repeat units ranging from 0 to 5, alternatively m may be a number of repeat units ranging from 1 to 5;

l is a number of repeat units that ranges independently from each of the vertex triptycene units from 1 to 5000;

$R^1$ is, independently, a hydrogen atom, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, or an ionically conductive chain such as (poly)ethylene glycol;

$R^2$ is, independently, a hydrogen atom, a lone pair of electrons, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, an ionically conductive chain such as (poly)ethylene glycol, an amino group, a cyano group, a nitro group, a hydroxyl group, a perfluoro alkyl group, or a halogen;

Y is, independently, a carbon atom, a nitrogen atom, a silicon atom, a germanium atom or a phosphorus atom;

Z is, independently, an oxygen atom, a sulfur atom, a selenium atom, an imine group substituted with a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent;

X is, independently, a hydroxyl group, a thiol group, an amine substituted with any of the combinations of a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent.

Ar is, independently, a phenyl group, a quinone, a hydroxyquinone, a heteroaromatic group such as, but not limited to, pyridine, thiophene, pyrrole, or a substituted aromatic group with cyano groups, carboxyl groups, nitro groups, or amine groups attached.

$R^1$, $R^2$ and X may be hydrogens, n may equal to 2, m may equal to 0, Y may be a carbon atom, Z may be an oxygen atom, and l may be equal to an integer between 1 and 5000. The electroactive material may have a capacity retention of over 80% after 500 cycles The present disclosure provides an electroactive material comprising the molecular structure according to Formula (2)'':

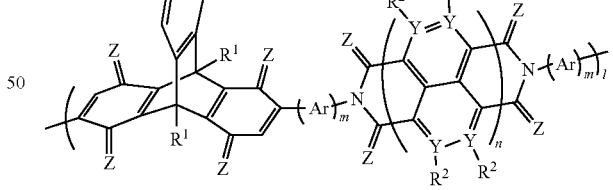

Formula (2)''

Wherein, n is a number of repeat units ranging from 1 to 3;

m is a number of repeat units ranging from 0 to 5, alternatively m may be a number of repeat units ranging from 1 to 5;

l is a number of repeat units that ranges independently from each of the vertex triptycene units from 1 to 5000;

$R^1$ is, independently, a hydrogen atom, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, or an ionically conductive chain such as (poly)ethylene glycol;

$R^2$ is, independently, a hydrogen atom, a lone pair of electrons, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, an ionically conductive chain such as (poly)ethylene glycol, an amino group, a cyano group, a nitro group, a hydroxyl group, a perfluoro alkyl group, or a halogen;

Y is, independently, a carbon atom, a nitrogen atom, a silicon atom, a germanium atom or a phosphorus atom;

Z is, independently, an oxygen atom, a sulfur atom, a selenium atom, an imine group substituted with a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent.

Ar is, independently, a phenyl group, a quinone, a hydroxyquinone, a heteroaromatic group such as, but not limited to, pyridine, thiophene, pyrrole, or a substituted aromatic group with cyano groups, carboxyl groups, nitro groups, or amine groups attached.

The present disclosure provides an electroactive material comprising the molecular structure according to Formula (3)″;

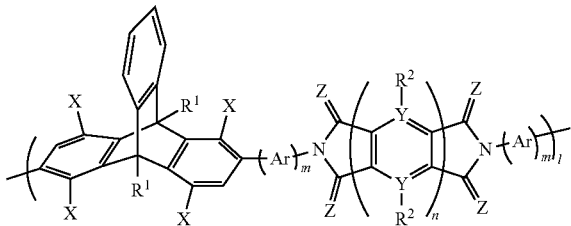

Formula (3)″

Wherein, n is a number of repeat units ranging from 1 to 3;

m is a number of repeat units ranging from 0 to 5, alternatively m may be a number of repeat units ranging from 1 to 5;

l is a number of repeat units that ranges independently from each of the vertex triptycene units from 1 to 5000;

$R^1$ is, independently, a hydrogen atom, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, or an ionically conductive chain such as (poly)ethylene glycol;

$R^2$ is, independently, a hydrogen atom, a lone pair of electrons, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, an ionically conductive chain such as (poly)ethylene glycol, an amino group, a cyano group, a nitro group, a hydroxyl group, a perfluoro alkyl group, or a halogen;

Y is, independently, a carbon atom, a nitrogen atom, a silicon atom, a germanium atom or a phosphorus atom;

Z is, independently, an oxygen atom, a sulfur atom, a selenium atom, an imine group substituted with a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent.

Ar is, independently, a phenyl group, a quinone, a hydroxyquinone, a heteroaromatic group such as, but not limited to, pyridine, thiophene, pyrrole, or a substituted aromatic group with cyano groups, carboxyl groups, nitro groups, or amine groups attached.

X is, independently, a hydroxyl group, a thiol group, an amine substituted with any of the combinations of a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent.

The present disclosure provides an electroactive material comprising the molecular structure according to Formula (4)″

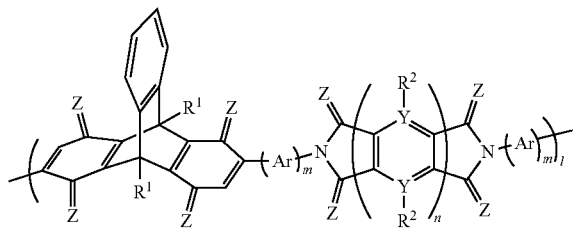

Formula (4)″ wherein, n is a number of repeat units ranging from 1 to 3;

m is a number of repeat units ranging from 0 to 5, alternatively m may be a number of repeat units ranging from 1 to 5;

l is a number of repeat units that ranges independently from each of the vertex triptycene units from 1 to 5000;

$R^1$ is, independently, a hydrogen atom, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, or an ionically conductive chain such as (poly)ethylene glycol;

$R^2$ is, independently, a hydrogen atom, a lone pair of electrons, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, an ionically conductive chain such as (poly)ethylene glycol, an amino group, a cyano group, a nitro group, a hydroxyl group, a perfluoro alkyl group, or a halogen;

Y is, independently, a carbon atom, a nitrogen atom, a silicon atom, a germanium atom or a phosphorus atom;

Z is, independently, an oxygen atom, a sulfur atom, a selenium atom, an imine group substituted with a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent.

Ar is, independently, a phenyl group, a quinone, a hydroxyquinone, a heteroaromatic group such as, but not limited to, pyridine, thiophene, pyrrole, or a substituted aromatic group with cyano groups, carboxyl groups, nitro groups, or amine groups attached.

The present disclosure provides an electroactive material comprising the molecular structure according to Formula (5)";

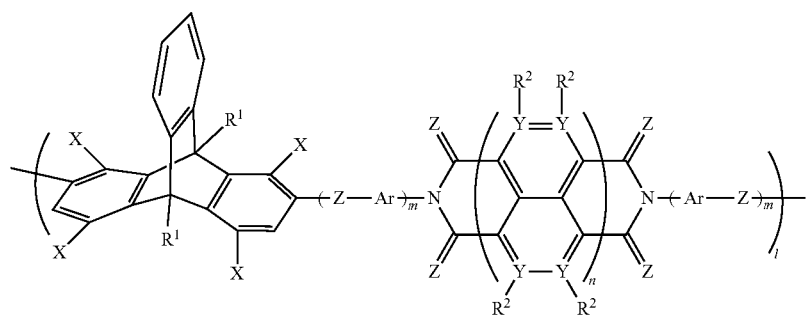

Formula (5)"

wherein, n is a number of repeat units ranging from 1 to 3;

m is a number of repeat units ranging from 0 to 5, alternatively m may be a number of repeat units ranging from 1 to 5;

l is a number of repeat units that ranges independently from each of the vertex triptycene units from 1 to 5000;

$R^1$ is, independently, a hydrogen atom, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, or an ionically conductive chain such as (poly)ethylene glycol;

$R^2$ is, independently, a hydrogen atom, a lone pair of electrons, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, an ionically conductive chain such as (poly)ethylene glycol, an amino group, a cyano group, a nitro group, a hydroxyl group, a perfluoro alkyl group, or a halogen;

Y is, independently, a carbon atom, a nitrogen atom, a silicon atom, a germanium atom or a phosphorus atom;

Z is, independently, an oxygen atom, a sulfur atom, a selenium atom, a nitrogen atom substituted with any of the combinations of a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent.

Ar is, independently, a phenyl group, a quinone, a hydroxyquinone, a heteroaromatic group such as, but not limited to, pyridine, thiophene, pyrrole, or a substituted aromatic group with cyano groups, carboxyl groups, nitro groups, or amine groups attached.

X is, independently, a hydroxyl group, a thiol group, an amine substituted with any of the combinations of a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent.

The present disclosure provides an electroactive material comprising the molecular structure according to Formula (6)":

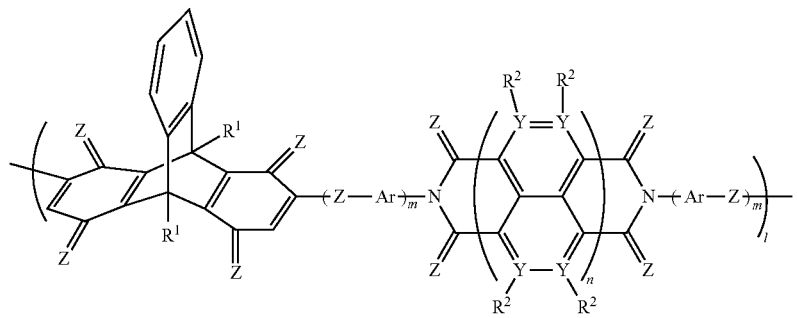

Formula (6)"

Wherein, n is a number of repeat units ranging from 1 to 3;

m is a number of repeat units ranging from 0 to 5, alternatively m may be a number of repeat units ranging from 1 to 5;

l is a number of repeat units that ranges independently from each of the vertex triptycene units from 1 to 5000;

$R^1$ is, independently, a hydrogen atom, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, or an ionically conductive chain such as (poly)ethylene glycol;

$R^2$ is, independently, a hydrogen atom, a lone pair of electrons, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, an ionically conductive chain such as (poly)ethylene glycol, an amino group, a cyano group, a nitro group, a hydroxyl group, a perfluoro alkyl group, or a halogen;

Y is, independently, a carbon atom, a nitrogen atom, a silicon atom, a germanium atom or a phosphorus atom;

Z is, independently, an oxygen atom, a sulfur atom, a selenium atom, a nitrogen atom substituted with any of the combinations of a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent.

Ar is, independently, a phenyl group, a quinone, a hydroxyquinone, a heteroaromatic group such as, but not limited to, pyridine, thiophene, pyrrole, or a substituted aromatic group with cyano groups, carboxyl groups, nitro groups, or amine groups attached.

The present disclosure provides an electroactive material comprising the molecular structure according to Formula (7)":

Formula (7)"

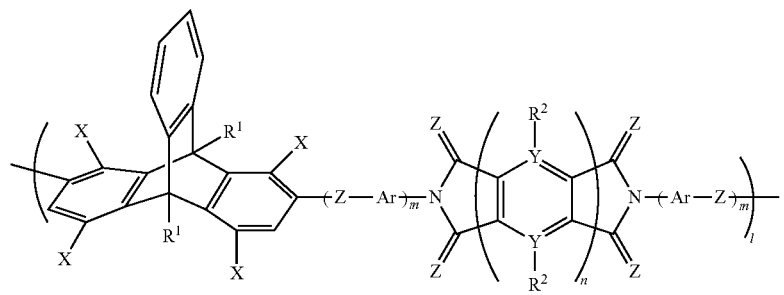

wherein, n is a number of repeat units ranging from 1 to 3;

m is a number of repeat units ranging from 0 to 5, alternatively m may be a number of repeat units ranging from 1 to 5;

l is a number of repeat units that ranges independently from each of the vertex triptycene units from 1 to 5000;

$R^1$ is, independently, a hydrogen atom, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, or an ionically conductive chain such as (poly)ethylene glycol;

$R^2$ is, independently, a hydrogen atom, a lone pair of electrons, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, an ionically conductive chain such as (poly)ethylene glycol, an amino group, a cyano group, a nitro group, a hydroxyl group, a perfluoro alkyl group, or a halogen;

Y is, independently, a carbon atom, a nitrogen atom, a silicon atom, a germanium atom or a phosphorus atom;

Z is, independently, an oxygen atom, a sulfur atom, a selenium atom, a nitrogen atom substituted with any of the combinations of a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent.

Ar is, independently, a phenyl group, a quinone, a hydroxyquinone, a heteroaromatic group such as, but not limited to, pyridine, thiophene, pyrrole, or a substituted aromatic group with cyano groups, carboxyl groups, nitro groups, or amine groups attached.

X is, independently, a hydroxyl group, a thiol group, an amine substituted with any of the combinations of a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent.

The present disclosure provides an electroactive material comprising the molecular structure according to Formula (8)":

Formula (8)"

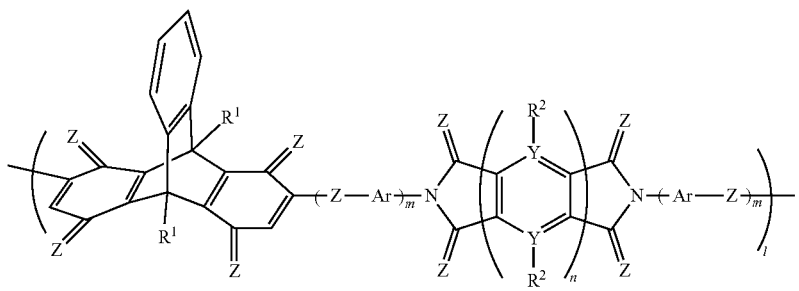

wherein, n is a number of repeat units ranging from 1 to 3;

m is a number of repeat units ranging from 0 to 5, alternatively m may be a number of repeat units ranging from 1 to 5;

I is a number of repeat units that ranges independently from each of the vertex triptycene units from 1 to 5000;

$R^1$ is, independently, a hydrogen atom, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, or an ionically conductive chain such as (poly)ethylene glycol;

$R^2$ is, independently, a hydrogen atom, a lone pair of electrons, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, an ionically conductive chain such as (poly)ethylene glycol, an amino group, a cyano group, a nitro group, a hydroxyl group, a perfluoro alkyl group, or a halogen;

Y is, independently, a carbon atom, a nitrogen atom, a silicon atom, a germanium atom or a phosphorus atom;

Z is, independently, an oxygen atom, a sulfur atom, a selenium atom, a nitrogen atom substituted with any of the combinations of a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent.

Ar is, independently, a phenyl group, a quinone, a hydroxyquinone, a heteroaromatic group such as, but not limited to, pyridine, thiophene, pyrrole, or a substituted aromatic group with cyano groups, carboxyl groups, nitro groups, or amine groups attached.

DETAILED DESCRIPTION

Figure 1:
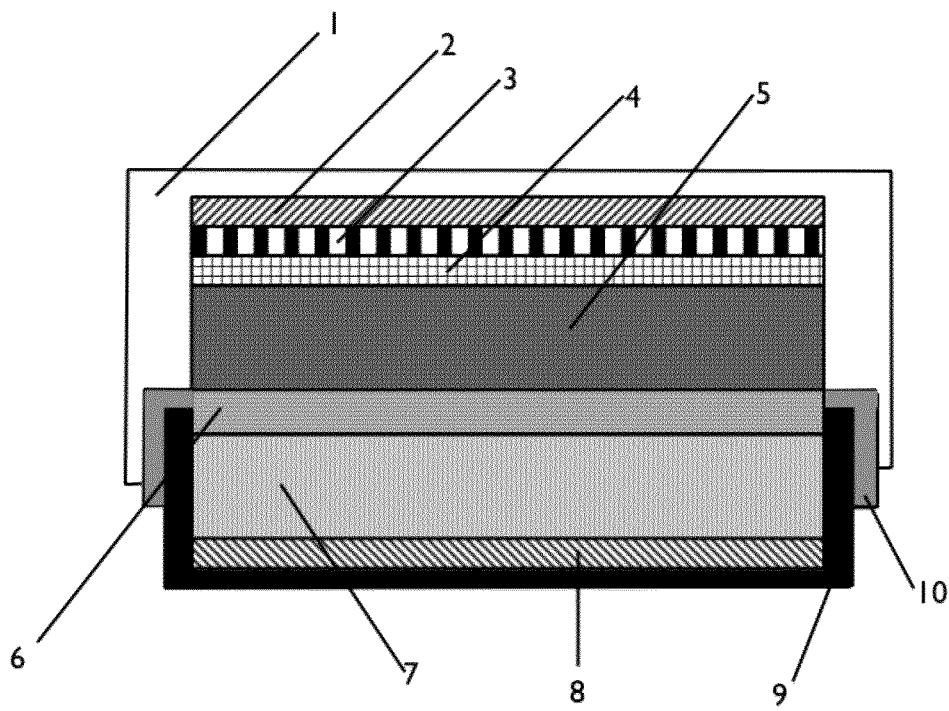
FIG. 1. Scheme representing the battery architecture and incorporation of the electroactive frameworks into the device.

Without limitation, the majority of the systems described herein are directed to chemical compounds, their method of synthesis, and the framework electrode materials produced from the above mentioned compounds for use in energy storage devices. A surprising property of these materials is that they exhibit significant efficacy as highly stable energy storage media in energy storage devices. As required, embodiments of the present disclosure are disclosed herein. However, the disclosed embodiments are merely exemplary, and it should be understood that the embodiments of the present disclosure may be embodied in many various and alternative forms.

The figures are not to scale and some features may be exaggerated or minimized to show details of particular elements while related elements may have been eliminated to prevent obscuring novel aspects. Therefore, specific structural and functional details disclosed herein are not to be interpreted as limiting but merely as a basis for the claims and as a representative basis for teaching one skilled in the art to variously employ the present disclosure. For purposes of teaching and not limitation, the illustrated embodiments are directed towards the compounds, their method of synthesis, and electrode materials produced from these compounds for use in energy storage devices.

As used herein, the term "about", when used in conjunction with ranges of dimensions, velocities, temperatures or other physical properties or characteristics is meant to cover slight variations that may exist in the upper and lower limits of the ranges of dimensions as to not exclude embodiments where on average most of the dimensions are satisfied but where statistically dimensions may exist outside this region.

As used herein, the phrase "crosslinking" is meant to describe the sequence of repeating structure extending from the triptycene vertex in all directions with each repeating structure independent from the other.

As used herein, the letter S1, S2, S3, and S4 refers to a solvent

As used herein, the letter A1 refers to an acid catalyst.

As used herein, the letter D1 refers to a dehydrating reagent.

As used herein, the letter C1 refers to a Lewis or Bronsted acid catalyst.

As used herein, the letter Ox1 refers to an oxidant

As used herein, the letter Red1 refers to a reductant.

As used herein, the letter T refers to a temperature.

As used herein, the letter P refers to a pressure.

Broadly speaking, the present disclosure provides a compound comprising a triptycene-based vertex having arylene diimide linker units. The compound is made by covalently connecting arylene diimide derivatives to a triptycene-based vertex. This can be accomplished using a variety of synthetic routes. Briefly, the triptycene-based vertex unit contains nucleophilic centre(s) which then proceed through a condensation reaction with electrophilic centre(s) arylene units to form an arylene diimide-linked group. Appropriate choice of triptycene-based functionalities controls the formation of arylene-diimide units. The advantages of these compounds are their insolubility, ease of synthesis, derivation from highly available feedstocks, and their high electrochemical activity.

The materials disclosed herein have been designed keeping in mind the problems with the existing prior art as described above. The present disclosure described the use of a triptycene-based framework with arylene diimide linker units or with benzimidazole linker units as an electroactive material for secondary batteries. Due to the ability of these materials to reversibly accept charges over a specific voltage range defined by their lowest unoccupied molecular orbitals, they are well suited for energy storage applications.

Electroactive Materials of ST1 Molecular Structure Formula:

The present disclosure relates to an electroactive material in an energy storage device having the molecular structure described in ST1 given here below:

[ST1]

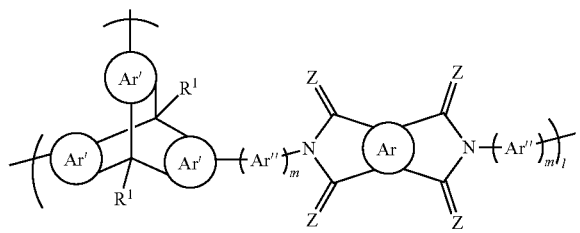

Wherein, m is a number of repeat units ranging from 0 to 5, alternatively m may be a number of repeat units ranging from 1 to 5;

l is a number of repeat units for the extension of the crosslinking network that may range independently from each of the vertex triptycene units from 1 to 5000;

$R^1$ is, independently, a hydrogen atom, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, or an ionically conductive chain such as (poly)ethylene glycol;

Z is, independently, an oxygen atom, a sulfur atom, a selenium atom, an imine group substituted with a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent;

Ar is, independently, an aromatic group with an arrangement of aromatic rings numbering between 1 and 6, a substituted aromatic group with substitutions including, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, an ionically conductive chain such as (poly)ethylene glycol, an amino group, a cyano group, a nitro group, a hydroxyl group, a perfluoro alkyl group, or a halogen, or a heteroaromatic group containing hydrogen atoms, carbon atoms, nitrogen atoms, silicon atoms, germanium atoms, or phosphorus atoms in any substitution pattern or in any number ranging, independently, between 0 and 26, or a substituted heteroaromatic group with substitutions including, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, an ionically conductive chain such as (poly)ethylene glycol, an amino group, a cyano group, a nitro group, a hydroxyl group, a perfluoro alkyl group, or a halogen;

Ar' is, independently, a phenyl group, a quinone, a hydroxyquinone, a heteroaromatic group such as, but not limited to, pyridine, thiophene, pyrrole, or a substituted aromatic group with cyano groups, carboxyl groups, nitro groups, or amine groups attached;

Ar'' is a linking group that may be, independently, a phenyl group, a quinone, a hydroxyquinone, a heteroaromatic group such as, but not limited to, pyridine, thiophene, pyrrole, or a substituted aromatic group with cyano groups, carboxyl groups, nitro groups, or amine groups attached, and may contain an oxygen atom, a sulfur atom, a selenium atom, a nitrogen atom substituted with any of the combinations of a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent, bonded adjacent to the groups mentioned above.

ST1 may be synthesized through a condensation reaction between a functionalized nucleophilic triptycene and a bifunctional electrophilic arylene derivative as described in Method 1:

[METHOD 1]

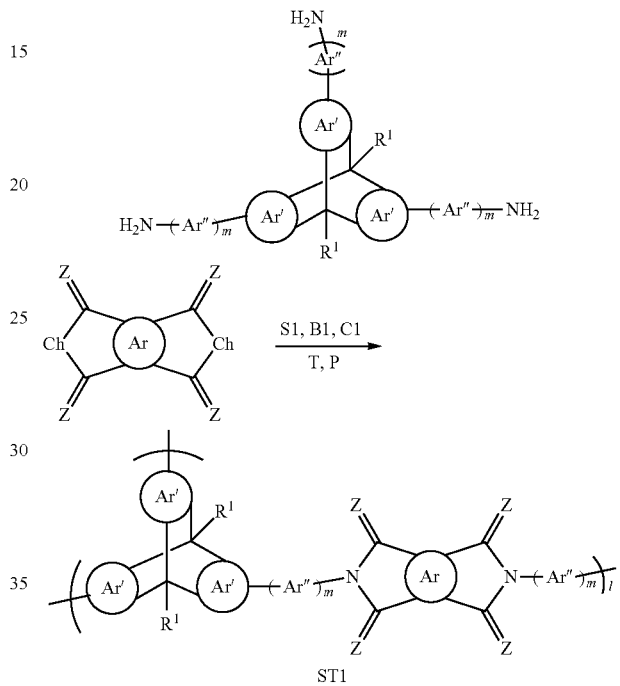

Wherein, m is a number of repeat units ranging from 0 to 5, alternatively m may be a number of repeat units ranging from 1 to 5;

l is a number of repeat units for the extension of the crosslinking network that may range independently from each of the vertex triptycene units from 1 to 5000;

$R^1$ is, independently, a hydrogen atom, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, or an ionically conductive chain such as (poly)ethylene glycol;

Z is, independently, an oxygen atom, a sulfur atom, a selenium atom, an imine group substituted with a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent;

Ar is, independently, an aromatic group with an arrangement of aromatic rings numbering between 1 and 6, a substituted aromatic group with substitutions including, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, an ionically conductive chain such as (poly)ethylene glycol, an amino group, a cyano group, a nitro group, a hydroxyl group, a perfluoro alkyl group, or a halogen, or a heteroaromatic group containing hydrogen atoms, carbon atoms, nitrogen atoms, silicon atoms, germanium atoms, or phosphorus atoms in any substitution pattern or in any number ranging, independently, between 0 and 26, or a substituted heteroaromatic group with substitutions including, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, an ionically conductive chain such as (poly)ethylene glycol, an amino group, a cyano group, a nitro group, a hydroxyl group, a perfluoro alkyl group, or a halogen;

Ar' is, independently, a phenyl group, a quinone, a hydroxyquinone, a heteroaromatic group such as, but not limited to, pyridine, thiophene, pyrrole, or a substituted aromatic group with cyano groups, carboxyl groups, nitro groups, or amine groups attached;

Ar'' is a linking group that may be, independently, a phenyl group, a quinone, a hydroxyquinone, a heteroaromatic group such as, but not limited to, pyridine, thiophene, pyrrole, or a substituted aromatic group with cyano groups, carboxyl groups, nitro groups, or amine groups attached, and may contain an oxygen atom, a sulfur atom, a selenium atom, a nitrogen atom substituted with any of the combinations of a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent, bonded adjacent to the groups mentioned above.

Ch is an atom such as sulfur or oxygen that is removed from the product via a condensation reaction to form $ChH_2$;

S1 is a solvent;
B1 is a base;
C1 is a catalyst;

The temperature, T, is between −20 and 220 degrees Celsius and the pressure, P, is between 0.01 and 10 atmospheres.

S1 may be any one or a combination of B1, water, dimethylacetimide, toluene, xylene, benzene, glyme, dimethyl formamide, acetonitrile, and dimethylsulfoxide.

B1 may be any one or a combination of quinoline, triethylamine, imidazole, pyridine, piperidine, pyrimidine, and pyrrolidine.

C1 may be a Lewis acid such as zinc (II) acetate, aluminium (III) chloride, trimethyl aluminium, tributyl aluminium, and titanium chloride.

The present disclosure relates to a subset of ST1 as an electroactive material in an energy storage device having the molecular structure described in Formula 1 given here below:

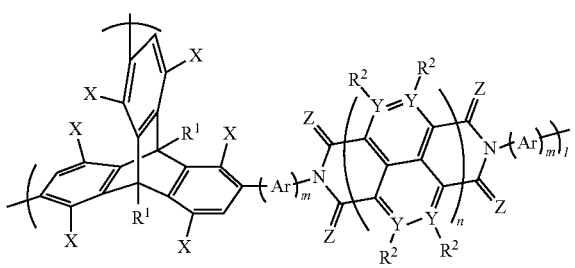

[FORMULA 1]

Wherein, n is a number of repeat units ranging from 1 to 3;
m is a number of repeat units ranging from 0 to 5, alternatively m may be a number of repeat units ranging from 1 to 5;
l is a number of repeat units for the extension of the crosslinking network that may range independently from each of the vertex triptycene units from 1 to 5000;

$R^1$ is, independently, a hydrogen atom, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, or an ionically conductive chain such as (poly)ethylene glycol;

$R^2$ is, independently, a hydrogen atom, a lone pair of electrons, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, an ionically conductive chain such as (poly)ethylene glycol, an amino group, a cyano group, a nitro group, a hydroxyl group, a perfluoro alkyl group, or a halogen;

Y is, independently, a carbon atom, a nitrogen atom, a silicon atom, a germanium atom or a phosphorus atom;

Z is, independently, an oxygen atom, a sulfur atom, a selenium atom, an imine group substituted with a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent;

X is, independently, a hydroxyl group, a thiol group, an amine substituted with any of the combinations of a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent.

Ar is, independently, a phenyl group, a quinone, a hydroxyquinone, a heteroaromatic group such as, but not limited to, pyridine, thiophene, pyrrole, or a substituted aromatic group with cyano groups, carboxyl groups, nitro groups, or amine groups attached.

The present disclosure relates to a subset of ST1 as an electroactive material in an energy storage device having the molecular structure described in Formula 2 given here below:

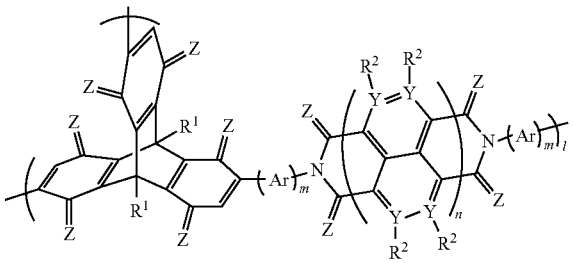

[FORMULA 2]

Wherein, n is a number of repeat units ranging from 1 to 3;
m is a number of repeat units ranging from 0 to 5, alternatively m may be a number of repeat units ranging from 1 to 5;

l is a number of repeat units for the extension of the crosslinking network that may range independently from each of the vertex triptycene units from 1 to 5000;

$R^1$ is, independently, a hydrogen atom, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, or an ionically conductive chain such as (poly)ethylene glycol;

$R^2$ is, independently, a hydrogen atom, a lone pair of electrons, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, an ionically conductive chain such as (poly)ethylene glycol, an amino group, a cyano group, a nitro group, a hydroxyl group, a perfluoro alkyl group, or a halogen;

Y is, independently, a carbon atom, a nitrogen atom, a silicon atom, a germanium atom or a phosphorus atom;

Z is, independently, an oxygen atom, a sulfur atom, a selenium atom, an imine group substituted with a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent;

Ar is, independently, a phenyl group, a quinone, a hydroxyquinone, a heteroaromatic group such as, but not limited to, pyridine, thiophene, pyrrole, or a substituted aromatic group with cyano groups, carboxyl groups, nitro groups, or amine groups attached.

Formula 1 and Formula 2 may also be synthesized from each other by an oxidation or reduction reaction described by Method 2:

an aromatic group such as, but not limited to, phenyl, thiophene, ethylene-dioxythiophene, pyrrole, or pyridinic, a crosslinking agent, an ionically conductive chain such as (poly)ethylene glycol, an amino group, a cyano group, a nitro group, a hydroxyl group, a perfluoro alkyl group, or a halogen;

Y is, independently, a carbon atom, a nitrogen atom, a silicon atom, a germanium atom or a phosphorus atom;

Z is, independently, an oxygen atom, a sulfur atom, a selenium atom, an imine group substituted with a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent;

Ar is, independently, a phenyl group, a quinone, a hydroxyquinone, a heteroaromatic group such as, but not limited to, pyridine, thiophene, pyrrole, or a substituted aromatic group with cyano groups, carboxyl groups, nitro groups, or amine groups attached;

X is, independently, a hydroxyl group, a thiol group, an amine substituted with any of the combinations of a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent;

S3 and S4 are a solvent;

Ox1 is an oxidant;

Red1 is a reductant;

S3 and S4 may be any one or a combination, water, dimethylacetimide, toluene, xylene, benzene, glyme, dimethyl formamide, acetonitrile, diethyl carbonate, dimethyl carbonate, ethylene carbonate, propylene carbonate, ethylmethyl carbonate, vinylene carbonate and dimethylsulfox-

[METHOD 2]

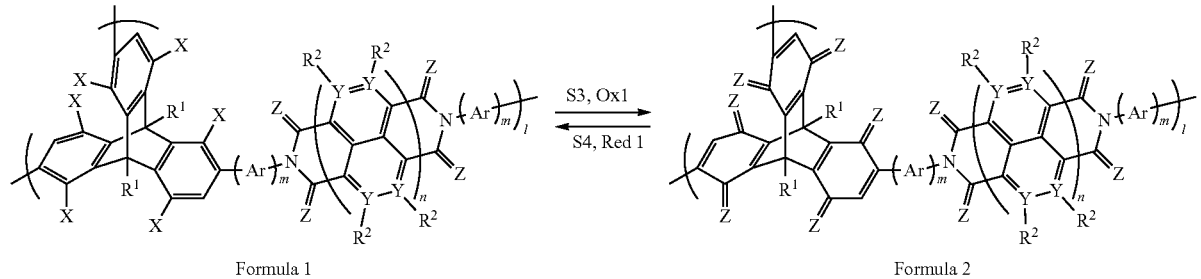

Formula 1          Formula 2

Wherein, n is a number of repeat units ranging from 1 to 3;

m is a number of repeat units ranging from 0 to 5, alternatively m may be a number of repeat units ranging from 1 to 5;

l is a number of repeat units for the extension of the crosslinking network that may range independently from each of the vertex triptycene units from 1 to 5000;

$R^1$ is, independently, a hydrogen atom, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, or an ionically conductive chain such as (poly)ethylene glycol;

$R^2$ is, independently, a hydrogen atom, a lone pair of electrons, an alkyl chain such as, but not limited to, methyl, ethyl, propyl, isopropyl, butyl, isobutyl, tert-butyl or pentyl, ide. S3 and S4 may also contain an ionically conductive salt such as, but not limited to, lithium hexafluorophosphate, lithium perchorate, lithium trifluoromethanesulfonimide, sodium hexafluorophosphate, magnesium perchlorate, tetrabutylammonium hexafluorophosphate, and tetrabutylammonium bromide.

Ox1 may be any one of oxygen, an electrochemical oxidation, sodium hypochlorite, hydrogen peroxide, sulfuric acid, nitric acid, iron (III) chloride, and potassium nitrate.

Red1 may be any one of hydrogen, sodium borohydride, an electrochemical reduction, sodium dithionate, and hydrazine.

The present disclosure relates to a subset of ST1 as an electroactive material in an energy storage device having the molecular structure described in Formula 3 given here below:

[FORMULA 3]

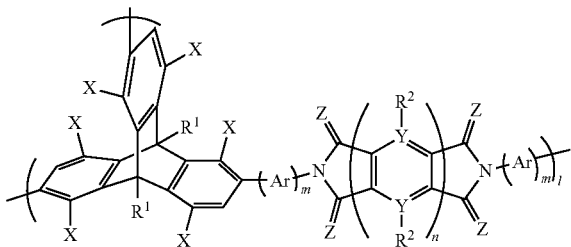

[FORMULA 4]

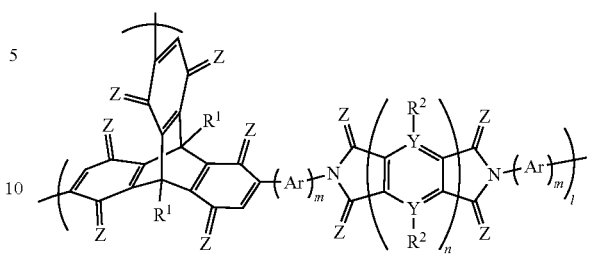

Wherein, n is a number of repeat units ranging from 1 to 3;

m is a number of repeat units ranging from 0 to 5, alternatively m may be a number of repeat units ranging from 1 to 5;

l is a number of repeat units for the extension of the crosslinking network that may range independently from each of the vertex triptycene units from 1 to 5000;

$R^1$ is, independently, a hydrogen atom, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, or an ionically conductive chain such as (poly)ethylene glycol;

$R^2$ is, independently, a hydrogen atom, a lone pair of electrons, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, an ionically conductive chain such as (poly)ethylene glycol, an amino group, a cyano group, a nitro group, a hydroxyl group, a perfluoro alkyl group, or a halogen;

Y is, independently, a carbon atom, a nitrogen atom, a silicon atom, a germanium atom or a phosphorus atom;

Z is, independently, an oxygen atom, a sulfur atom, a selenium atom, an imine group substituted with a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent;

X is, independently, a hydroxyl group, a thiol group, an amine substituted with any of the combinations of a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent.

Ar is, independently, a phenyl group, a quinone, a hydroxyquinone, a heteroaromatic group such as, but not limited to, pyridine, thiophene, pyrrole, or a substituted aromatic group with cyano groups, carboxyl groups, nitro groups, or amine groups attached.

The present disclosure relates to a subset of ST1 as an electroactive material in an energy storage device having the molecular structure described in Formula 4 given here below:

Wherein, n is a number of repeat units ranging from 1 to 3;

m is a number of repeat units ranging from 0 to 5, alternatively m may be a number of repeat units ranging from 1 to 5;

l is a number of repeat units for the extension of the crosslinking network that may range independently from each of the vertex triptycene units from 1 to 5000;

$R^1$ is, independently, a hydrogen atom, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, or an ionically conductive chain such as (poly)ethylene glycol;

$R^2$ is, independently, a hydrogen atom, a lone pair of electrons, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, an ionically conductive chain such as (poly)ethylene glycol, an amino group, a cyano group, a nitro group, a hydroxyl group, a perfluoro alkyl group, or a halogen;

Y is, independently, a carbon atom, a nitrogen atom, a silicon atom, a germanium atom or a phosphorus atom;

Z is, independently, an oxygen atom, a sulfur atom, a selenium atom, an imine group substituted with a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent;

Ar is, independently, a phenyl group, a quinone, a hydroxyquinone, a heteroaromatic group such as, but not limited to, pyridine, thiophene, pyrrole, or a substituted aromatic group with cyano groups, carboxyl groups, nitro groups, or amine groups attached.

Formula 3 and Formula 4 may also be synthesized from each other by an oxidation or reduction reaction described by Method 3:

[METHOD 3]

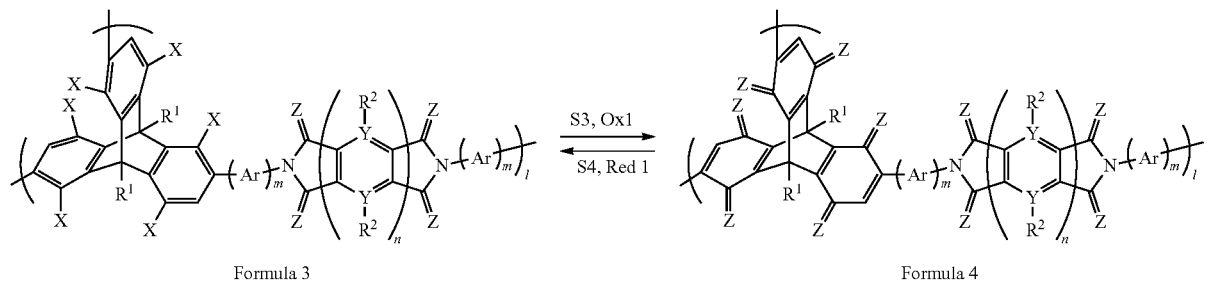

Formula 3 ⇌ Formula 4
S3, Ox1 / S4, Red 1

Wherein, n is a number of repeat units ranging from 1 to 3;

m is a number of repeat units ranging from 0 to 5, alternatively m may be a number of repeat units ranging from 1 to 5;

l is a number of repeat units for the extension of the crosslinking network that may range independently from each of the vertex triptycene units from 1 to 5000;

$R^1$ is, independently, a hydrogen atom, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, or an ionically conductive chain such as (poly)ethylene glycol;

$R^2$ is, independently, a hydrogen atom, a lone pair of electrons, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, an ionically conductive chain such as (poly)ethylene glycol, an amino group, a cyano group, a nitro group, a hydroxyl group, a perfluoro alkyl group, or a halogen;

Y is, independently, a carbon atom, a nitrogen atom, a silicon atom, a germanium atom or a phosphorus atom;

Z is, independently, an oxygen atom, a sulfur atom, a selenium atom, an imine group substituted with a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent;

Ar is, independently, a phenyl group, a quinone, a hydroxyquinone, a heteroaromatic group such as, but not limited to, pyridine, thiophene, pyrrole, or a substituted aromatic group with cyano groups, carboxyl groups, nitro groups, or amine groups attached;

X is, independently, a hydroxyl group, a thiol group, an amine substituted with any of the combinations of a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent;

S3 and S4 are a solvent;

Ox1 is an oxidant;

Red1 is a reductant;

S3 and S4 may be any one or a combination, water, dimethylacetimide, toluene, xylene, benzene, glyme, dimethyl formamide, acetonitrile, diethyl carbonate, dimethyl carbonate, ethylene carbonate, propylene carbonate, ethylmethyl carbonate, vinylene carbonate and dimethylsulfoxide. S3 and S4 may also contain an ionically conductive salt such as, but not limited to, lithium hexafluorophosphate, lithium perchorate, lithium trifluoromethanesulfonimide, sodium hexafluorophosphate, magnesium perchlorate, tetrabutylammonium hexafluorophosphate, and tetrabutylammonium bromide.

Ox1 may be any one of oxygen, an electrochemical oxidation, sodium hypochlorite, hydrogen peroxide, sulfuric acid, nitric acid, iron (III) chloride, and potassium nitrate.

Red1 may be any one of hydrogen, sodium borohydride, an electrochemical reduction, sodium dithionate, and hydrazine.

The present disclosure relates to a subset of ST1 as an electroactive material in an energy storage device having the molecular structure described in Formula 5 given here below:

[FORMULA 5]

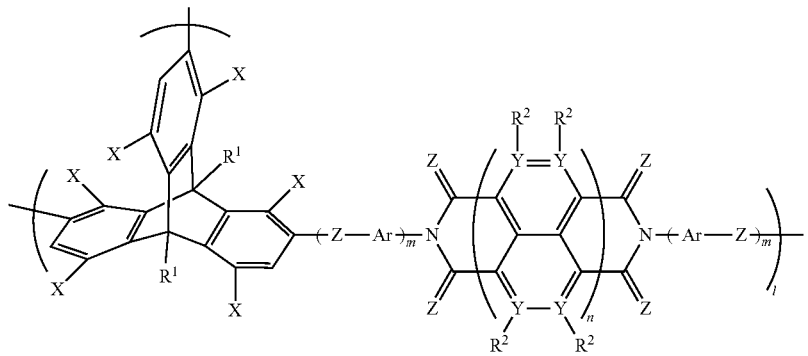

Wherein, n is a number of repeat units ranging from 1 to 3;

m is a number of repeat units ranging from 0 to 5, alternatively m may be a number of repeat units ranging from 1 to 5;

l is a number of repeat units for the extension of the crosslinking network that may range independently from each of the vertex triptycene units from 1 to 5000;

$R^1$ is, independently, a hydrogen atom, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, or an ionically conductive chain such as (poly)ethylene glycol;

$R^2$ is, independently, a hydrogen atom, a lone pair of electrons, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, an ionically conductive chain such as (poly)ethylene glycol, an amino group, a cyano group, a nitro group, a hydroxyl group, a perfluoro alkyl group, or a halogen;

Y is, independently, a carbon atom, a nitrogen atom, a silicon atom, a germanium atom or a phosphorus atom;

Z is, independently, an oxygen atom, a sulfur atom, a selenium atom, an imine group substituted with a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent;

X is, independently, a hydroxyl group, a thiol group, an amine substituted with any of the combinations of a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent.

Ar is, independently, a phenyl group, a quinone, a hydroxyquinone, a heteroaromatic group such as, but not limited to, pyridine, thiophene, pyrrole, or a substituted aromatic group with cyano groups, carboxyl groups, nitro groups, or amine groups attached.

The present disclosure relates to a subset of ST1 as an electroactive material in an energy storage device having the molecular structure described in Formula 6 given here below:

[FORMULA 6]

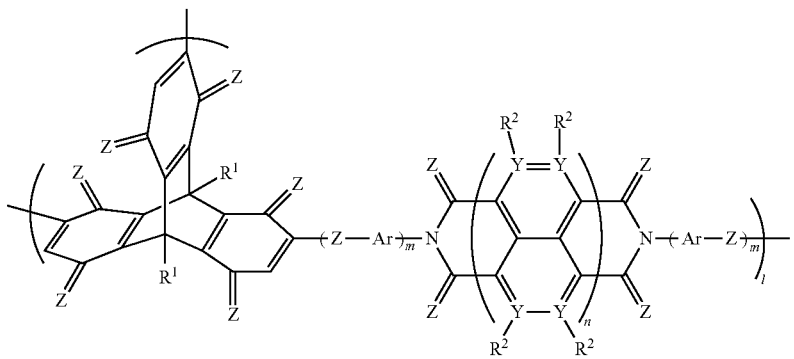

Wherein, n is a number of repeat units ranging from 1 to 3;

m is a number of repeat units ranging from 0 to 5, alternatively m may be a number of repeat units ranging from 1 to 5;

l is a number of repeat units for the extension of the crosslinking network that may range independently from each of the vertex triptycene units from 1 to 5000;

$R^1$ is, independently, a hydrogen atom, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, or an ionically conductive chain such as (poly)ethylene glycol;

$R^2$ is, independently, a hydrogen atom, a lone pair of electrons, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, an ionically conductive chain such as (poly)ethylene glycol, an amino group, a cyano group, a nitro group, a hydroxyl group, a perfluoro alkyl group, or a halogen;

Y is, independently, a carbon atom, a nitrogen atom, a silicon atom, a germanium atom or a phosphorus atom;

Z is, independently, an oxygen atom, a sulfur atom, a selenium atom, an imine group substituted with a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent;

Ar is, independently, a phenyl group, a quinone, a hydroxyquinone, a heteroaromatic group such as, but not limited to, pyridine, thiophene, pyrrole, or a substituted aromatic group with cyano groups, carboxyl groups, nitro groups, or amine groups attached.

Formula 5 and Formula 6 may also be synthesized from each other by an oxidation or reduction reaction described by Method 4:

Y is, independently, a carbon atom, a nitrogen atom, a silicon atom, a germanium atom or a phosphorus atom;

Z is, independently, an oxygen atom, a sulfur atom, a selenium atom, an imine group substituted with a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent;

Ar is, independently, a phenyl group, a quinone, a hydroxyquinone, a heteroaromatic group such as, but not limited to, pyridine, thiophene, pyrrole, or a substituted aromatic group with cyano groups, carboxyl groups, nitro groups, or amine groups attached;

X is, independently, a hydroxyl group, a thiol group, an amine substituted with any of the combinations of a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent;

S3 and S4 are a solvent;

Ox1 is an oxidant;

Red1 is a reductant;

[METHOD 4]

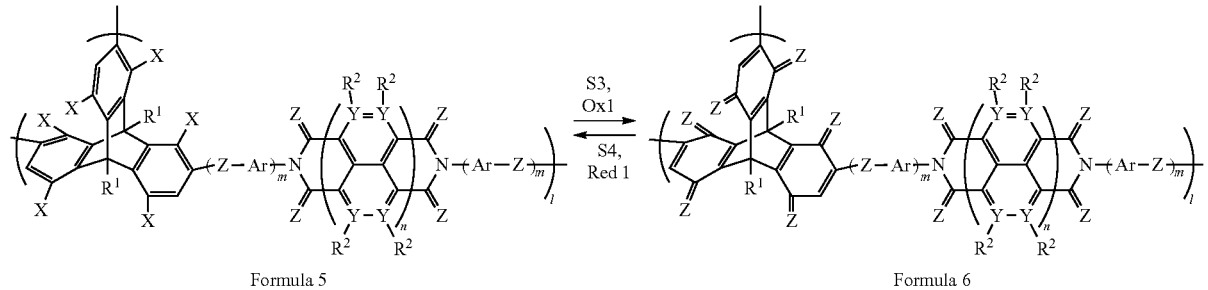

Formula 5                                                                 Formula 6

Wherein, n is a number of repeat units ranging from 1 to 3;

m is a number of repeat units ranging from 0 to 5, alternatively m may be a number of repeat units ranging from 1 to 5;

l is a number of repeat units for the extension of the crosslinking network that may range independently from each of the vertex triptycene units from 1 to 5000;

$R^1$ is, independently, a hydrogen atom, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, or an ionically conductive chain such as (poly)ethylene glycol;

$R^2$ is, independently, a hydrogen atom, a lone pair of electrons, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, an ionically conductive chain such as (poly)ethylene glycol, an amino group, a cyano group, a nitro group, a hydroxyl group, a perfluoro alkyl group, or a halogen;

S3 and S4 may be any one or a combination, water, dimethylacetimide, toluene, xylene, benzene, glyme, dimethyl formamide, acetonitrile, diethyl carbonate, dimethyl carbonate, ethylene carbonate, propylene carbonate, ethylmethyl carbonate, vinylene carbonate and dimethylsulfoxide. S3 and S4 may also contain an ionically conductive salt such as, but not limited to, lithium hexafluorophosphate, lithium perchlorate, lithium trifluoromethanesulfonimide, sodium hexafluorophosphate, magnesium perchlorate, tetrabutylammonium hexafluorophosphate, and tetrabutylammonium bromide.

Ox1 may be any one of oxygen, an electrochemical oxidation, sodium hypochlorite, hydrogen peroxide, sulfuric acid, nitric acid, iron (III) chloride, and potassium nitrate.

Red1 may be any one of hydrogen, sodium borohydride, an electrochemical reduction, sodium dithionate, and hydrazine.

The present disclosure relates to a subset of ST1 as an electroactive material in an energy storage device having the molecular structure described in Formula 7 given here below:

[FORMULA 7]

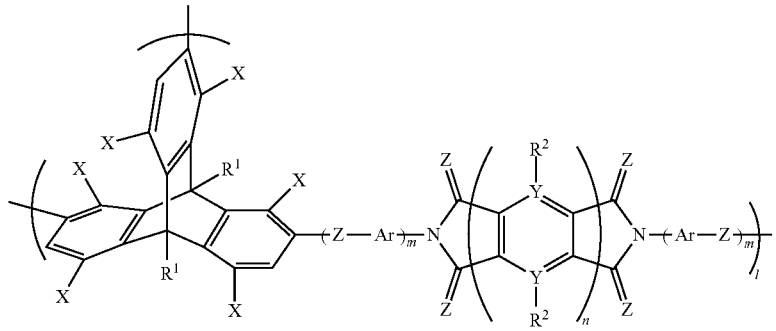

Wherein, n is a number of repeat units ranging from 1 to 3;

m is a number of repeat units ranging from 0 to 5, alternatively m may be a number of repeat units ranging from 1 to 5;

l is a number of repeat units for the extension of the crosslinking network that may range independently from each of the vertex triptycene units from 1 to 5000;

$R^1$ is, independently, a hydrogen atom, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, or an ionically conductive chain such as (poly)ethylene glycol;

$R^2$ is, independently, a hydrogen atom, a lone pair of electrons, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent.

Ar is, independently, a phenyl group, a quinone, a hydroxyquinone, a heteroaromatic group such as, but not limited to, pyridine, thiophene, pyrrole, or a substituted aromatic group with cyano groups, carboxyl groups, nitro groups, or amine groups attached.

The present disclosure relates to a subset of ST1 as an electroactive material in an energy storage device having the molecular structure described in Formula 8 given here below:

[FORMULA 8]

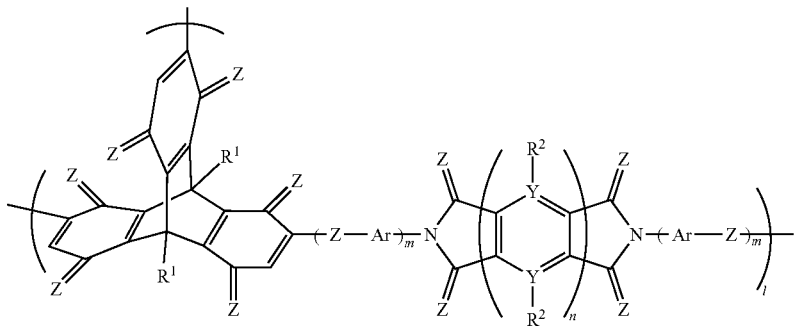

an aromatic group such as, but not limited to, phenyl, thiophene, ethylene-dioxythiophene, pyrrole, or pyridinic, a crosslinking agent, an ionically conductive chain such as (poly)ethylene glycol, an amino group, a cyano group, a nitro group, a hydroxyl group, a perfluoro alkyl group, or a halogen;

Y is, independently, a carbon atom, a nitrogen atom, a silicon atom, a germanium atom or a phosphorus atom;

Z is, independently, an oxygen atom, a sulfur atom, a selenium atom, an imine group substituted with a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent;

X is, independently, a hydroxyl group, a thiol group, an amine substituted with any of the combinations of a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent.

Wherein, n is a number of repeat units ranging from 1 to 3;

m is a number of repeat units ranging from 0 to 5, alternatively m may be a number of repeat units ranging from 1 to 5;

l is a number of repeat units for the extension of the crosslinking network that may range independently from each of the vertex triptycene units from 1 to 5000;

$R^1$ is, independently, a hydrogen atom, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, or an ionically conductive chain such as (poly)ethylene glycol;

$R^2$ is, independently, a hydrogen atom, a lone pair of electrons, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, an ionically conductive chain such as (poly)ethylene glycol, an amino group, a cyano group, a nitro group, a hydroxyl group, a perfluoro alkyl group, or a halogen;

Y is, independently, a carbon atom, a nitrogen atom, a silicon atom, a germanium atom or a phosphorus atom;

Z is, independently, an oxygen atom, a sulfur atom, a selenium atom, an imine group substituted with a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent;

Ar is, independently, a phenyl group, a quinone, a hydroxyquinone, a heteroaromatic group such as, but not limited to, pyridine, thiophene, pyrrole, or a substituted aromatic group with cyano groups, carboxyl groups, nitro groups, or amine groups attached.

Formula 7 and Formula 8 may also be synthesized from each other by an oxidation or reduction reaction described by Method 5:

group such as, but not limited to, phenyl, thiophene, ethylene-dioxythiophene, pyrrole, or pyridinic, or a crosslinking agent;

Ar is, independently, a phenyl group, a quinone, a hydroxyquinone, a heteroaromatic group such as, but not limited to, pyridine, thiophene, pyrrole, or a substituted aromatic group with cyano groups, carboxyl groups, nitro groups, or amine groups attached;

X is, independently, a hydroxyl group, a thiol group, an amine substituted with any of the combinations of a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent;

S3 and S4 are a solvent;

Ox1 is an oxidant;

Red1 is a reductant;

S3 and S4 may be any one or a combination, water, dimethylacetimide, toluene, xylene, benzene, glyme, dimethyl formamide, acetonitrile, diethyl carbonate, dimethyl carbonate, ethylene carbonate, propylene carbonate, ethyl-

[METHOD 5]

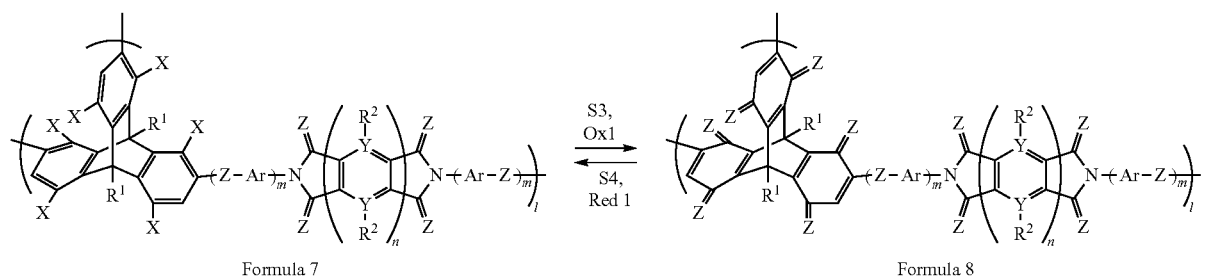

Formula 7           Formula 8

Wherein, n is a number of repeat units ranging from 1 to 3;

m is a number of repeat units ranging from 0 to 5, alternatively m may be a number of repeat units ranging from 1 to 5;

l is a number of repeat units for the extension of the crosslinking network that may range independently from each of the vertex triptycene units from 1 to 5000;

$R^1$ is, independently, a hydrogen atom, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, or an ionically conductive chain such as (poly)ethylene glycol;

$R^2$ is, independently, a hydrogen atom, a lone pair of electrons, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, an ionically conductive chain such as (poly)ethylene glycol, an amino group, a cyano group, a nitro group, a hydroxyl group, a perfluoro alkyl group, or a halogen;

Y is, independently, a carbon atom, a nitrogen atom, a silicon atom, a germanium atom or a phosphorus atom;

Z is, independently, an oxygen atom, a sulfur atom, a selenium atom, an imine group substituted with a hydrogen, alkyl chain such as, but not limited to, methyl, ethyl, propyl, isopropyl, butyl, isobutyl, tert-butyl or pentyl, an aromatic methyl carbonate, vinylene carbonate and dimethylsulfoxide. S3 and S4 may also contain an ionically conductive salt such as, but not limited to, lithium hexafluorophosphate, lithium perchorate, lithium trifluoromethanesulfonimide, sodium hexafluorophosphate, magnesium perchlorate, tetrabutylammonium hexafluorophosphate, and tetrabutylammonium bromide.

Ox1 may be any one of oxygen, an electrochemical oxidation, sodium hypochlorite, hydrogen peroxide, sulfuric acid, nitric acid, iron (III) chloride, and potassium nitrate.

Red1 may be any one of hydrogen, sodium borohydride, an electrochemical reduction, sodium dithionate, and hydrazine.

Example 1

Confirmation of Chemical Structure

The chemical structure of specific examples of ST1 were characterized by the following methods. Fourier transform infrared spectroscopy (FTIR) was carried out using a Perkin Elmer Spectrum 100 FT-IR spectrometer equipped with a 10-bounce diamond/ZnSe ATR accessory. $^{13}$C cross-polarization/magic angle spinning (CP/MAS) nuclear magnetic resonance (NMR) spectra were recorded using an Agilent DD2-700 spectrometer with a recycling delay of 30 seconds and an 18 kHz spinning rate. Electron spin resonance (ESR) measurements were obtained on a refurbished Bruker EMX X-Band spectrometer equipped with a high sensitivity cylindrical cavity (0101) at a microwave frequency of 9357.967 MHz, a modulation frequency of 100 kHz, and a modulation amplitude of 1 Gauss.

X-ray photoelectron spectroscopy (XPS) was carried out using a Thermo Scientific k-Alpha spectrometer with a monochromated Al $K_\alpha$ source. X-ray diffraction (XRD) was measured using a Rigaku MiniFlex 600 X-ray Diffractometer. Carbon dioxide adsorption isotherms were performed by Quantachrome's Material Characterization Laboratory with an Autosorb iQ Station 2. Prior to analysis, the frameworks were activated at 180° C. for 24 hours. Geometry optimizations and NMR calculations were performed using the Gaussian 09 software suite at the B3LYP level of theory and the 6-31G basis set. The NMR output from Gaussian 09 was converted into chemical shifts in ppm by a previously reported method. See [Chong, J. H.; MacLachlan, M. J. Inorg. Chem. 2006, 45 (4), 1442-1444.] for details on computational modelling of NMR chemical shifts.

Example 2

Electrode Characterization

The morphology of the electrode films of specific examples of ST1 were characterized by the following methods. The morphology of the films was examined using scanning electron microscopy (SEM) (Hitachi S-5200 SEM) and atomic force microscopy (AFM) was carried out using a Bruker Dimension Icon Atomic Force Microscope in tapping mode. Profilometry was performed using a KLA-Tencore P16+ profilometer with a 0.5 mg force setting and a scanning length of 2.5 microns. Transmission electron microscopy (TEM) was performed on a Hitachi HT-7700 C-TEM at an accelerating voltage of 80 kV. Selected area diffraction patterns and the corresponding TEM images were imaged using a Zeiss Leo 912 CTEM-EFTEM at an accelerating voltage of 120 kV.

Example 3

Electrochemical Measurements

Electrochemical measurements were performed on specific examples of ST1 to determine the applicability towards lithium ion batteries. All electrochemical measurements were recorded in an argon filled glovebox (mBraun) and performed using a Biologic SP-200 Potentiostat/Galvanostat/frequency response analyzer (FRA). Electrodes containing the frameworks was prepared by mixing the purified framework, carbon Super P, and polyvinylidene fluoride (PVDF) in a 60:30:10 (w/w/w) ratio and suspending the mixture in N-methyl pyrrolidone (NMP) at a concentration of 150 mg mL-1. The slurry was sonicated for 1 hour, stirring every 15 minutes to homogenize. The slurry was cast onto an aluminum foil current collector and dried according to a previously published procedure.[21] The films were approximately 75 μm thick with approximately 3.0 mg/cm² (1.8 mg/cm², or 240 mg/cm³, of the frameworks). CR2023-type coin cells were purchased from MTI Corporation and a schematic of the assembled cells is shown in FIG. 1, wherein 1 is a cell cathode casing, 2 is a spring spacer that compresses device, 3 is a spacer/current collector, 4 is a substrate that the cathode is cast on, 5 is the cathode, 6 is the separator and electrolyte, 7 is the anode, 8 is the anode spacer/current collector, 9 is a cell anode casing, and 10 is a gasket/O-ring to hermetically seal the device. A copper foil with a diameter of 16 mm (McMaster-Carr) was used as the anodic current collector, a lithium foil with a diameter of 16 mm was used as the anode, and a Celgard polypropylene separator with a diameter of 19 mm was used to prevent short circuiting. An electrode punch (DPM Solution Inc.) was used to cut the electrodes to a 16 mm diameter and a hydraulic press (BT Innovations) was used to hermetically seal the cells. Approximately 80 μL of electrolyte (1:1 (v/v) ethylene carbonate:dimethoxyethane or 1:1 (v/v) ethylene carbonate: diethylcarbonate, 1 M LiPF6) was used to fill the cells prior to sealing.

Test Example 1

For a test example, we describe the synthesis, characterization, and performance of a lithium ion battery with an electrode material structure described by Formula 1:

[FORMULA 1]

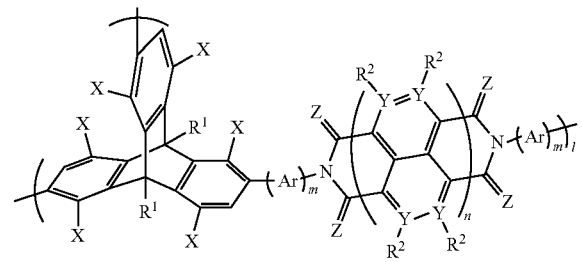

In this test example of Formula 1, $R^1$, $R^2$ and X are hydrogens, n is equal to 2, m is equal to 0, Y is a carbon atom, Z is an oxygen atom, and I is equal to an integer between 1 and 5000. Hereafter, this specific example is referred to as compound A.

Following the scheme described in Method 1, a condensation reaction between a nucleophilic triptycene derivate and a bifunctional arylene electrophile was achieved using a base to remove acid protons as the solvent and a Lewis acid catalyst to synthesize compound A.

[METHOD 1]

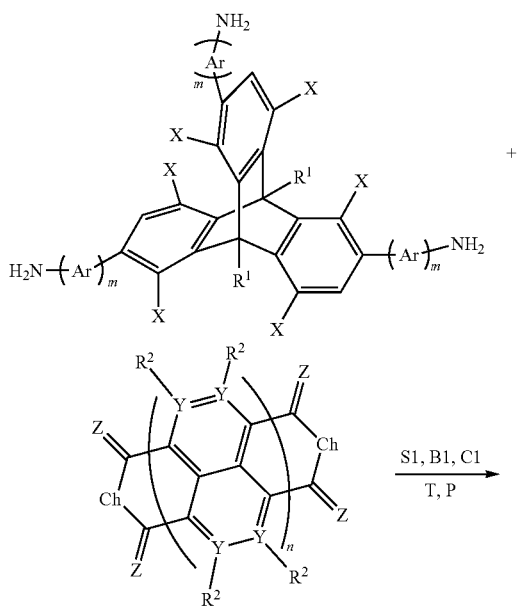

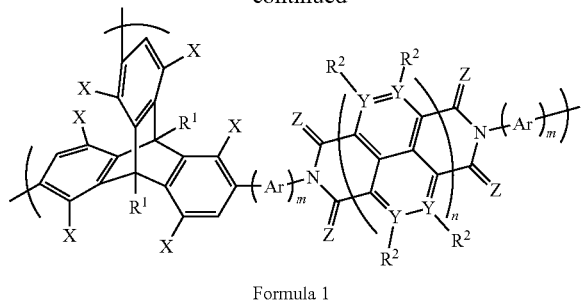

Formula 1

Here, described in this example of Method 1, Ch is an oxygen atom, S1 and B1 are imidazole, C1 is zinc (II) acetate, T is 160 degrees Celsius, and P is atmospheric pressure. 1 equivalent of (9r,10s)-9,10-dihydro-9,10-[1,2]benzenoanthracene-2,6,14-triamine, 1.5 equivalents of perylene-3,4,9,10-tetracarboxylic dianhydride, 0.8 equivalents of zinc (II) acetate, and 260 equivalents of imidazole were mixed together to homogenize and then added to a flame-dried 3-necked flask fit with a reflux condenser. The mixture was backfilled with argon three times to remove any oxygen. The reaction mixture was stirred at 160° C. for 24 hours. Upon completion, the reaction was cooled to room temperature and methanol was added to dissolve the solid imidazole. The reaction was then poured into methanol and filtered through a Soxhlet thimble. The crude material was purified by Soxhlet extraction with methanol for one day and then chloroform for 5 hours to remove imidazole, impurities, and any low molecular weight species. Quantitative yield (2.87 g). $^{13}$C CP/MAS NMR δ: 163.38, 146.55, 133.08, 124.06, 53.86 ppm. The synthesis of (9r,10s)-9,10-dihydro-9,10-[1,2]benzenoanthracene-2,6,14-triamine was performed according to Zhang, C.; Chen, C.-F. Synthesis and Structure of 2,6,14- and 2,7,14-Trisubstituted Triptycene Derivatives. *J. Org. Chem.* 2006, 71, 6626-6629.

Characterization of Formula 1

Figure 2:
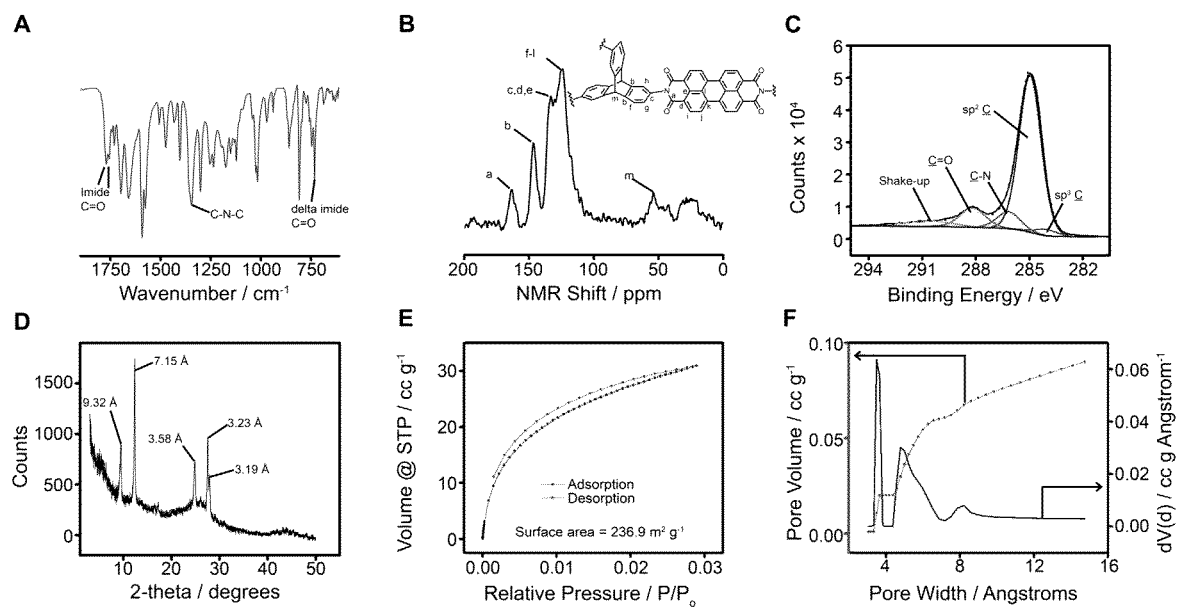
FIG. 2. Characterization of a specific example of Formula 1 wherein $R^1$, $R^2$ and X are hydrogens, n is equal to 2, m is equal to 0, Y is a carbon atom, Z is an oxygen atom, and I is equal to an integer between 0 and 5000. (a) FTIR spectra. (b) $^{13}$C CP/MAS NMR spectrum with the assigned carbon atoms. (c) Deconvoluted C1s XPS spectrum with the corresponding assignments. (d) PXRD pattern with the labels corresponding to the spacing at the observed diffraction angle. (e) $CO_2$ adsorption isotherm performed at room temperature. (f) Pore size distribution and pore volume curve calculated by density functional theory from the $CO_2$ adsorption data in (e).

For compound A, symmetric and asymmetric imide carbonyl stretches appear at 1771 and 1756 cm$^{-1}$, respectively, carbon-nitrogen bond stretches appear at 1346 cm$^{-1}$, and an imide ring deformation stretch appears at 732 cm$^{-1}$ (FIG. 2). CP/MAS NMR provides further evidence for the formation of the frameworks. The successful formation of compound A is confirmed by the presence of a carbonyl carbon peak at 163.3 ppm, various peaks corresponding the aromatic carbons from 146.6 to 124.1 ppm, and the aliphatic carbons in the triptycene linker at 53.9 ppm.

Figure 3:
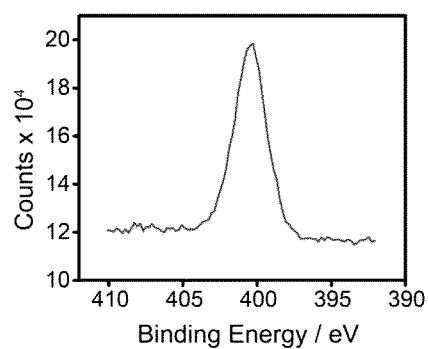
FIG. 3. N1s XPS spectra of a specific example of Formula 1 wherein $R^1$, $R^2$ and X are hydrogens, n is equal to 2, m is equal to 0, Y is a carbon atom, Z is an oxygen atom, and I is equal to an integer between 1 and 5000.

High resolution XPS shows the successful formation of the appropriate elemental functionalities in compound A. The C1s region may be deconvoluted into 5 peaks corresponding to the sp$^3$ carbon at 284.08 eV, the aromatic sp2 carbons at 284.96 eV, the sp$^2$ carbons bonded to the diimide nitrogens at 286.17 eV, the carbonyl carbon at 288.18 eV, and a broad shake-up feature at 290.17 eV. The high resolution N1s XPS spectra of compound A shows a single symmetric peak located at 400.28 eV and (FIG. 3).

The XRD pattern of compound A shows sharp diffraction peaks, confirming the crystalline nature of the framework. The peaks correspond to diffractions at 9.32 Å, 7.15 Å, 3.58 Å, 3.23 Å, and 3.19 Å. $CO_2$ adsorption measurements of compound A show a typical type I isotherm with very little hysteresis, which indicates that it is microporous. From the gas adsorption data, the compound A is found to have a surface area of 236.9 m$^2$ g$^-$. The pore size distribution, calculated from the adsorption isotherms by density functional theory, reveals that the pore sizes are approximately 3.5 Å, 4.6 Å, and 8.2 Å.

Lithium Ion Cell Characterization

Compound A may be cast into an electrode with a conductive carbon additive (Super P) and a polymeric binder that has an ideal morphology for battery applications. In the electrode, compound A provides faradaic redox activity that is used to store charge in the battery electrode, the conductive carbon provides an electrical conduction path throughout the electrode, and the binder prevents delamination from the current collector and acts as a 'glue' to hold the electrode together. To ensure the best performance in a lithium-ion battery, the materials were first dissolved in methanesulfonic acid and precipitated into methanol to decrease the particle size and remove any zinc impurities that may impact the electrochemical performance.

Figure 4:
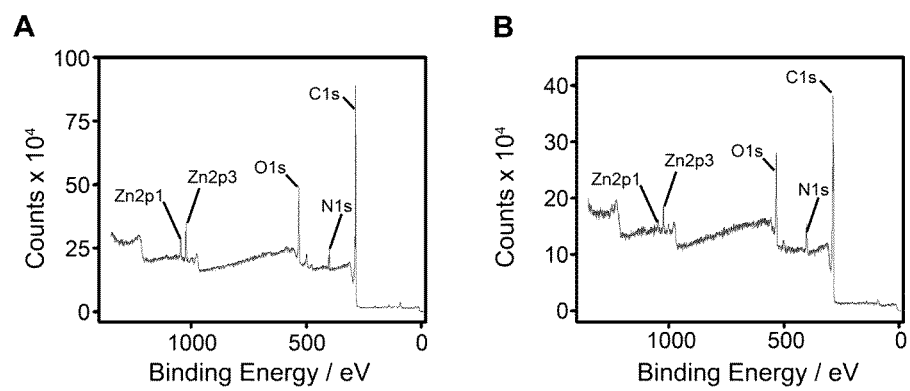
FIG. 4. XPS survey of (A) as synthesized and (B) precipitated specific example of Formula 1 wherein $R^1$, $R^2$ and X are hydrogens, n is equal to 2, m is equal to 0, Y is a carbon atom, Z is an oxygen atom, and I is equal to an integer between 1 and 5000.
Figure 5:
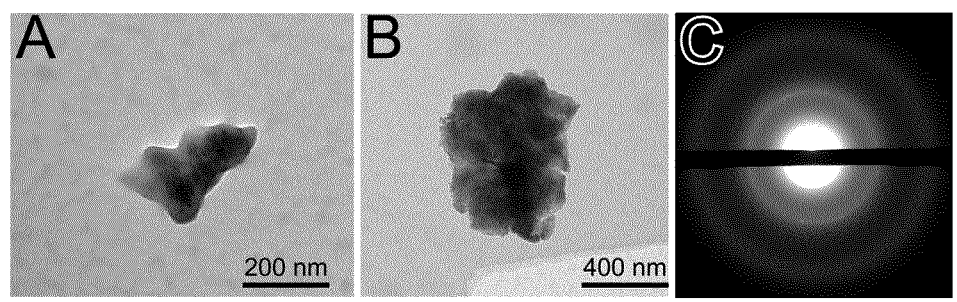
FIG. 5. (A,B) TEM images of precipitated specific example of Formula 1 wherein $R^1$, $R^2$ and X are hydrogens, n is equal to 2, m is equal to 0, Y is a carbon atom, Z is an oxygen atom, and I is equal to an integer between 1 and 5000 and (C) the corresponding electron diffraction pattern for (B).
Figure 6:
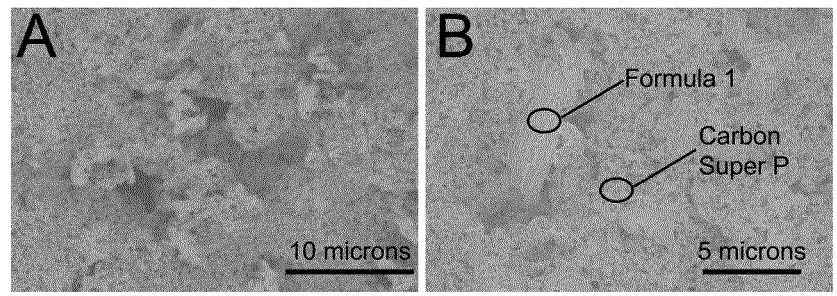
FIG. 6. (a, b) SEM image of a specific example of Formula 1 wherein $R^1$, $R^2$ and X are hydrogens, n is equal to 2, m is equal to 0, Y is a carbon atom, Z is an oxygen atom, and I is equal to an integer between 1 and 5000 electrode showing the Formula 1 aggregates and the carbon Super P.

Complete removal of the zinc impurities was confirmed by XPS (FIG. 4). The precipitated frameworks were then mixed with Super P and PVDF at a ratio of 60:30:10 (w/w/w), mixed in NMP, and cast onto an aluminium foil current collector. By TEM, compound A appears as irregular aggregates that are approximately 200 nm in diameter (FIG. 5). When examining the compound A electrode by SEM, rod-like aggregates of compound A, approximately 1 to 7 μm in length and 500 nm wide, are observed that are dispersed evenly in the Super P matrix (FIG. 6). This morphology is ideal because it provides an electronic conduction path to the active material, via the carbon Super P, and a relatively short diffusion length for lithium ions within the compound A aggregate.

Figure 7:
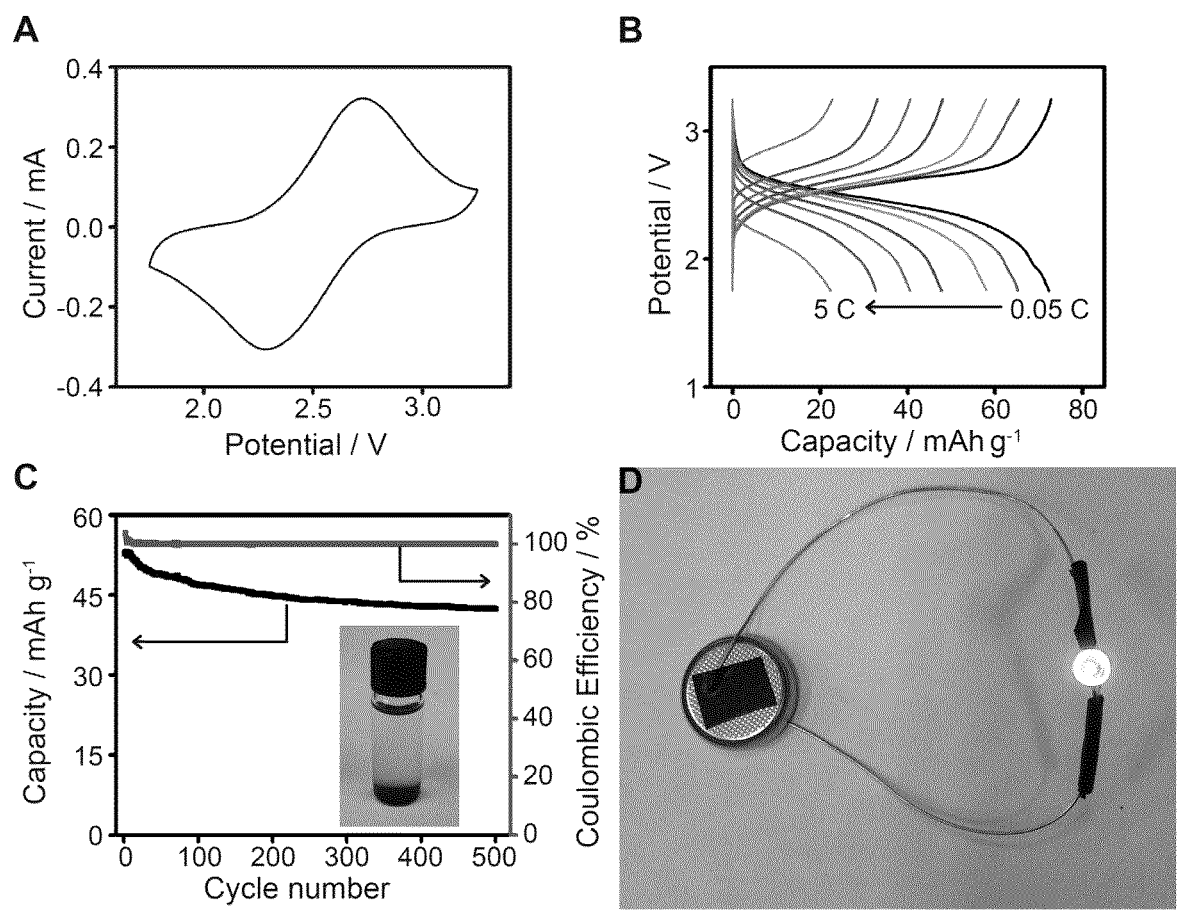
FIG. 7. Electrochemical properties of a specific example of Formula 1 wherein $R^1$, $R^2$ and X are hydrogens, n is equal to 2, m is equal to 0, Y is a carbon atom, Z is an oxygen atom, and I is equal to an integer between 1 and 5000 lithium ion battery. (a) Cyclic voltammogram at a scan rate of 1 mV s$^{-1}$. (b) Galvanostatic charge/discharge curves at currents between 0.05 C to 5 C. (c) Capacity decay and coulombic efficiency over 500 cycles at a current rate of 2 C. Inset: Photograph of Formula 1 in a 1 M LiPF$_6$ ethylene carbonate dimethoxyethane (1:1 w/w) electrolyte. (d) A photograph of a red LED powered using a battery composed of a Formula 1 cathode.

Performance was tested by assembling coin cells (FIG. 1) using the compound A electrode as a cathode and lithium metal as the anode. The compound A electrode has one reversible redox wave, observed by cyclic voltammetry, centred at 2.5 V vs Li/Li$^+$ (FIG. 7). The redox wave is due to the reversible reductions of two carbonyl groups of the perylene diimide units. The capacity of the lithium ion battery was tested with galvanostatic charge/discharge measurements. When cycled at 0.05 C (nC is the current it would take to charge/discharge the cell fully in 1/n hours), the capacity is 75.9 mAh g$^{-1}$ corresponding to 78.7% of the theoretical capacity (96.4 mAh g$^{-1}$). When the current is increased by 2 orders of magnitude, the capacity is 22.4 mAh g$^{-1}$, 29.5% of that obtained at 0.05 C. Importantly, after cycling the cell 500 times at 2 C it retains 80.2% of its original capacity, showcasing the framework's excellent cycling stability. The light red colour near the bottom is due to a suspension of solid compound A near the sedimentation.

Figure 8:
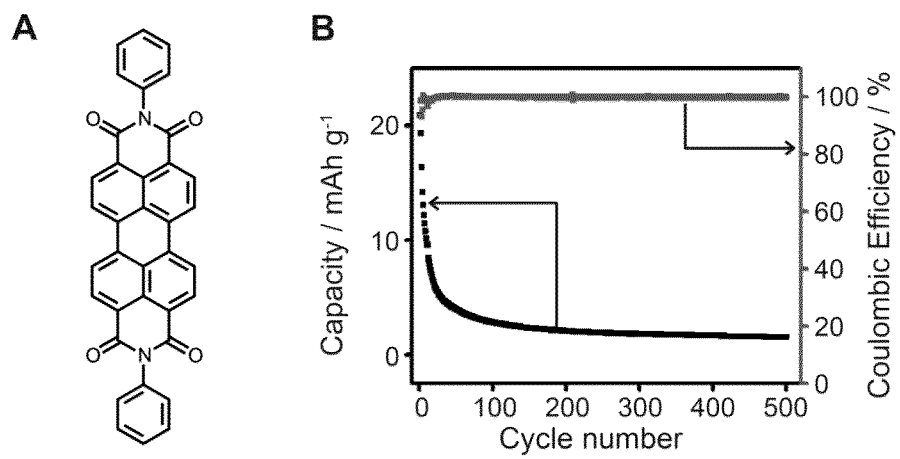
FIG. 8. (A) Structure of the small molecule perylene diimide and (B) capacity decay and coulombic efficiency of the small molecule perylene diimide over 500 cycles at a current rate of 2 C.
Figure 9:
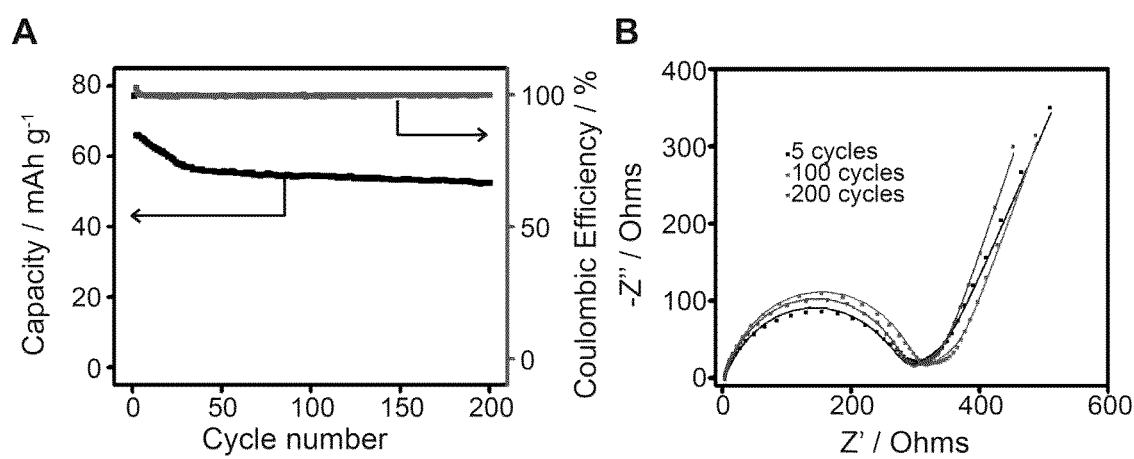
FIG. 9. (A) Capacity decay and coulombic efficiency of a specific example of Formula 1 wherein $R^1$, $R^2$ and X are hydrogens, n is equal to 2, m is equal to 0, Y is a carbon atom, Z is an oxygen atom, and I is equal to an integer between 1 and 5000 battery over 200 cycles at a current rate of 0.5 C. (B) Electrochemical impedance results for the cycling stability test displayed in a Nyquist plot. The dots are the data points and the solid lines represent the fits obtained using a circuit model.

The stability of compound A is much better than a perylene diimide small molecule, which rapidly decays to 13.6% of the original capacity after 100 cycles, and 7.48% of the original capacity after 500 cycles (FIG. 8). The excellent stability of the compound A electrode is the result of the highly insoluble nature of the framework as well as the highly reversible electrochemistry of the perylene diimide units. The coulombic efficiency over the entire cycling stability test for the PDI-Tc battery is ~100% demonstrating that no irreversible processes take place during charging and discharging. Additionally, the framework is also very stable at low charging and discharging rates, where material dissolution is more problematic, retaining 82% of its capacity after 200 cycles at 0.5 C (FIG. 9). The charge transfer and equivalent series resistance, measured by electrochemical impedance spectroscopy, remain almost constant throughout the cycling experiment. The utility of the compound A battery was demonstrated by using it to light up a red LED.

According to an embodiment, triptycene frameworks may be used as cathode materials for lithium ion batteries.

According to an embodiment, using a perylene diimide-based redox couple, a high reversibility and stability may be achieved. The capacity reached 78.7% of the theoretical value of compound A at a rate of 0.05 C and retains 29.5% of this value when the current is increased by 2 orders of magnitude. The coulombic efficiency is ~100% throughout the experiment, demonstrating the almost perfect reversibility. Importantly, an excellent stability was demonstrated by cycling the battery 500 times at 2 C. The battery retained 80.2% of its capacity which is the best reported value for perylene diimide-based polymers or frameworks. The data indicates that triptycene COFs may form the basis of highly stable lithium-ion batteries. The replacement of the inorganic cathode materials with inexpensive, abundant organic materials such as the ones reported here should yield devices with a lower cost, greater sustainability, and a lower impact on the environment.

According to an embodiment, increasing in voltage, capacity, power, and stability may be attained by adding redox functionality to the triptycene core, adding heteroatoms to the molecular structure, modifying the substitution of the compound and by increasing or decreasing the aromatic core of the arylene unit as identified in ST1.

According to an embodiment, the use of ST1 as the sole active materials in electrodes or as additives to existing technologies may improve the performance of energy storage devices.

According to an embodiment, ST1 may be used as electrode materials for energy storage device such as, but not limited to, a lithium ion battery, sodium ion battery, magnesium ion battery, aluminium ion battery, potassium ion battery, supercapacitor, a capacitor, a solid-state battery, an aqueous battery, or a hybrid device combining electrode materials of any of the above devices.

According to an embodiment, due to their similar operation and configuration where a potential difference between two electrodes drives an electrical current that flows, through an external circuit, from one electrode into the other accompanied by a balance of charge on each electrode by ions in the electrolyte, ST1 may also be used as an anode or cathode materials where there is a high enough potential difference between the two electrodes for the above described events to occur. Due to the nature of organic materials and their ability to undergo redox chemistry with a wide variety of ions in respect to their charge balancing, they are much more versatile than their inorganic counterparts such as metals oxides that require ions of a specific size and/or charge in order for them to function as electrode materials. This may allow organic materials to be used in a number of different battery configurations and chemistries. The energy storage devices may be constructed to have one or both of flexible mechanical properties and a customizable form factor. Here, flexible mechanical properties refer to the entire energy storage device possessing mechanical flexibility with a bending radius of at least 5 mm and twisting angle of at least 15° while still maintaining greater than 90% of the device performance in an unbent or twisted state.

Electroactive Materials of ST2A/B Molecular Structure Formula:

The present disclosure also relates to an electroactive material in an energy storage device having the molecular structure described in ST2A/B given here below:

[ST2A/B]

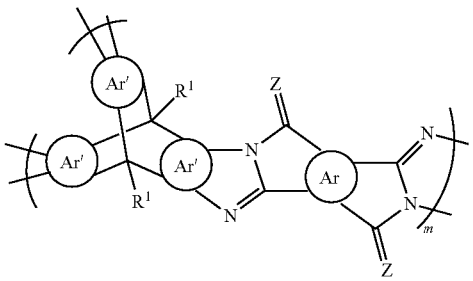

ST2A

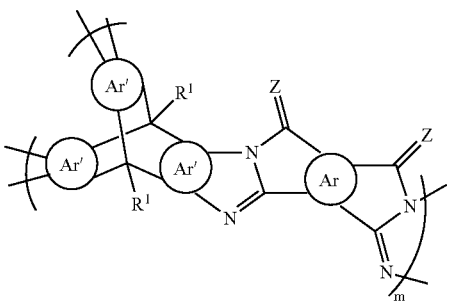

ST2B

Wherein, m is a number of repeat units for the extension of the crosslinking network that may range independently from each of the vertex triptycene units from 1 to 5000;

$R^1$ is, independently, a hydrogen atom, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, or an ionically conductive chain such as (poly)ethylene glycol;

Z is, independently, an oxygen atom, a sulfur atom, a selenium atom, an imine group substituted with a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent;

Ar is, independently, an aromatic group with an arrangement of aromatic rings numbering between 1 and 6, a substituted aromatic group with substitutions including, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, an ionically conductive chain such as (poly)ethylene glycol, an amino group, a cyano group, a nitro group, a hydroxyl group, a perfluoro alkyl group, or a halogen, or a heteroaromatic group containing hydrogen atoms, carbon atoms, nitrogen atoms, silicon atoms, germanium atoms, or phosphorus atoms in any substitution pattern or in any number ranging, independently, between 0 and 26, or a substituted heteroaromatic group with substitutions including, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, an ionically conductive chain such as (poly)ethylene glycol, an amino group, a cyano group, a nitro group, a hydroxyl group, a perfluoro alkyl group, or a halogen;

Ar' is, independently, a phenyl group, a quinone, a hydroxyquinone, a heteroaromatic group such as, but not limited to, pyridine, thiophene, pyrrole, or a substituted aromatic group with cyano groups, carboxyl groups, nitro groups, or amine groups attached.

ST2A/B may be synthesized through a condensation reaction in basic media between a functionalized nucleophilic triptycene and a bifunctional electrophilic arylene derivative as described in Method 6:

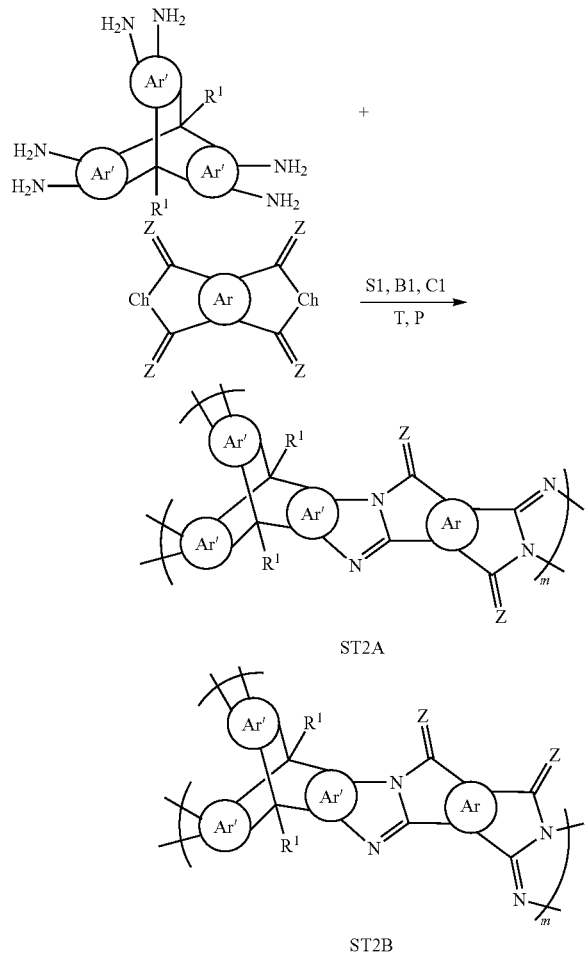

Wherein, m is a number of repeat units for the extension of the crosslinking network that may range independently from each of the vertex triptycene units from 1 to 5000;

$R^1$ is, independently, a hydrogen atom, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, or an ionically conductive chain such as (poly)ethylene glycol;

Z is, independently, an oxygen atom, a sulfur atom, a selenium atom, an imine group substituted with a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent;

Ar is, independently, an aromatic group with an arrangement of aromatic rings numbering between 1 and 6, a substituted aromatic group with substitutions including, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, an ionically conductive chain such as (poly)ethylene glycol, an amino group, a cyano group, a nitro group, a hydroxyl group, a perfluoro alkyl group, or a halogen, or a heteroaromatic group containing hydrogen atoms, carbon atoms, nitrogen atoms, silicon atoms, germanium atoms, or phosphorus atoms in any substitution pattern or in any number ranging, independently, between 0 and 26, or a substituted heteroaromatic group with substitutions including, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, an ionically conductive chain such as (poly)ethylene glycol, an amino group, a cyano group, a nitro group, a hydroxyl group, a perfluoro alkyl group, or a halogen;

Ar' is, independently, a phenyl group, a quinone, a hydroxyquinone, a heteroaromatic group such as, but not limited to, pyridine, thiophene, pyrrole, or a substituted aromatic group with cyano groups, carboxyl groups, nitro groups, or amine groups attached.

Ch is an atom such as sulfur or oxygen that is removed from the product via a condensation reaction to form $ChH_2$;

S1 is a solvent;

B1 is a base;

C1 is a catalyst;

The temperature, T, is between −20 and 220 degrees Celsius and the pressure, P, is between 0.01 and 10 atmospheres.

S1 may be any one or a combination of B1, water, dimethylacetimide, toluene, xylene, benzene, glyme, dimethyl formamide, acetonitrile, and dimethylsulfoxide.

B1 may be any one or a combination of quinoline, triethylamine, imidazole, pyridine, piperidine, pyrimidine, and pyrrolidine.

C1 may be a Lewis acid such as zinc (II) acetate, aluminium (III) chloride, trimethyl aluminium, tributyl aluminium, and titanium chloride.

ST2A/B may also be synthesized through a condensation reaction in acidic media between a functionalized nucleophilic triptycene and a bifunctional electrophilic arylene derivative as described in Method 7:

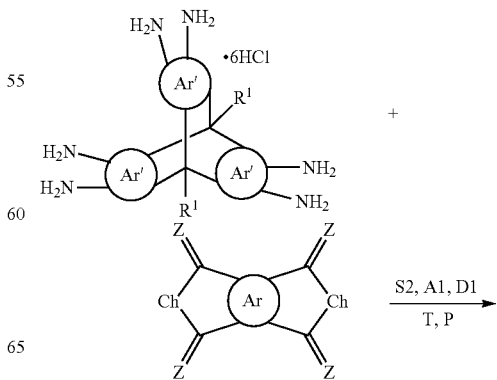

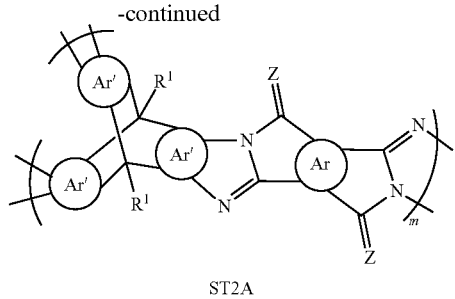

ST2A

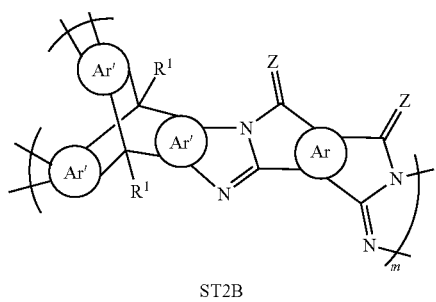

ST2B

Wherein, m is a number of repeat units for the extension of the crosslinking network that may range independently from each of the vertex triptycene units from 1 to 5000;

$R^1$ is, independently, a hydrogen atom, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, or an ionically conductive chain such as (poly)ethylene glycol;

Z is, independently, an oxygen atom, a sulfur atom, a selenium atom, an imine group substituted with a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent;

Ar is, independently, an aromatic group with an arrangement of aromatic rings numbering between 1 and 6, a substituted aromatic group with substitutions including, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, an ionically conductive chain such as (poly)ethylene glycol, an amino group, a cyano group, a nitro group, a hydroxyl group, a perfluoro alkyl group, or a halogen, or a heteroaromatic group containing hydrogen atoms, carbon atoms, nitrogen atoms, silicon atoms, germanium atoms, or phosphorus atoms in any substitution pattern or in any number ranging, independently, between 0 and 26, or a substituted heteroaromatic group with substitutions including, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, an ionically conductive chain such as (poly)ethylene glycol, an amino group, a cyano group, a nitro group, a hydroxyl group, a perfluoro alkyl group, or a halogen;

Ar' is, independently, a phenyl group, a quinone, a hydroxyquinone, a heteroaromatic group such as, but not limited to, pyridine, thiophene, pyrrole, or a substituted aromatic group with cyano groups, carboxyl groups, nitro groups, or amine groups attached.

Ch is an atom such as sulfur or oxygen that is removed from the product via a condensation reaction to form $ChH_2$;

S2 is a solvent;

A1 is an acid;

D1 is a dehydrating reagent;

The temperature, T, is between −20 and 220 degrees Celsius and the pressure, P, is between 0.01 and 10 atmospheres.

S2 may be any one or a combination of A1, D1, water, dimethylacetimide, toluene, xylene, benzene, glyme, dimethyl formamide, acetonitrile, and dimethylsulfoxide.

A1 is an acid catalyst that drives the reaction to completion and may be any one or a combination of phosphoric acid, acetic acid, polyphosphoric acid, sulfuric acid, acetic acid, hydrochloric acid, methanesulfonic acid, and para-toluene sulfonic acid.

D1 is a dehydrating reagent that is used to remove water from the reaction to drive it to completion and may be one of polyphosphoric acid, phosphorus pentoxide, molecular sieves, calcium chloride, and concentrated sulfuric acid.

The present disclosure relates to a subset of ST2A/B as an electroactive material in an energy storage device having the molecular structure described in Formula 9A/B given here below:

[FORMULA 9A/B]:

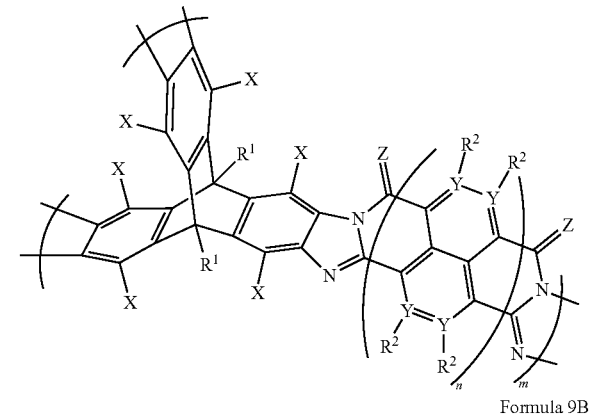

Formula 9A

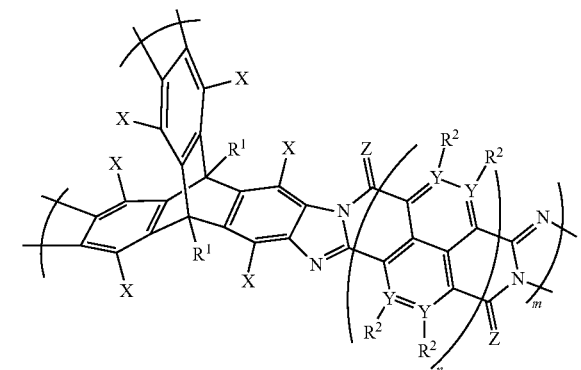

Formula 9B

Wherein, n is a number of repeat units ranging from 1 to 3;

m is a number of repeat units for the extension of the crosslinking network that may range independently from each of the vertex triptycene units from 1 to 5000;

$R^1$ is, independently, a hydrogen atom, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, or an ionically conductive chain such as (poly)ethylene glycol;

$R^2$ is, independently, a hydrogen atom, a lone pair of electrons, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, an ionically conductive chain such as (poly)ethylene glycol, an amino group, a cyano group, a nitro group, a hydroxyl group, a perfluoro alkyl group, or a halogen;

Y is, independently, a carbon atom, a nitrogen atom, a silicon atom, a germanium atom or a phosphorus atom;

Z is, independently, an oxygen atom, a sulfur atom, a selenium atom, a nitrogen atom substituted with any of the combinations of a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent.

X is, independently, a hydroxyl group, a thiol group, an amine substituted with any of the combinations of a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent.

The present disclosure relates to a subset of ST2A/B as an electroactive material in an energy storage device having the molecular structure described in Formula 10A/B given here below:

[FORMULA 10A/B]

Formula 10A

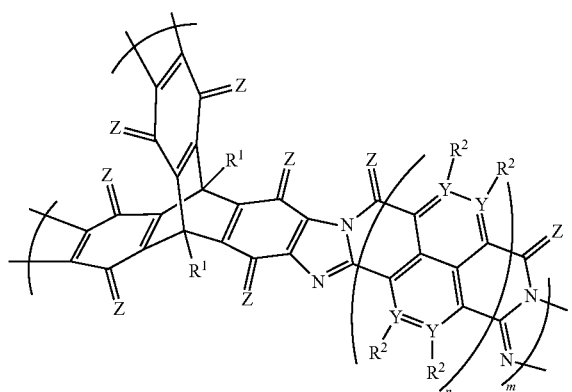

-continued

Formula 10B

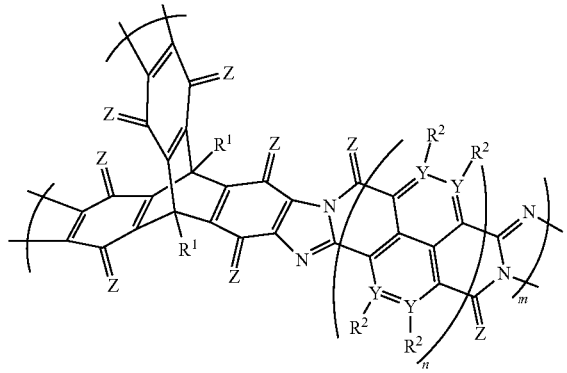

Wherein, n is a number of repeat units ranging from 1 to 3;

m is a number of repeat units for the extension of the crosslinking network that may range independently from each of the vertex triptycene units from 1 to 5000;

$R^1$ is, independently, a hydrogen atom, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, or an ionically conductive chain such as (poly)ethylene glycol;

$R^2$ is, independently, a hydrogen atom, a lone pair of electrons, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, an ionically conductive chain such as (poly)ethylene glycol, an amino group, a cyano group, a nitro group, a hydroxyl group, a perfluoro alkyl group, or a halogen;

Y is, independently, a carbon atom, a nitrogen atom, a silicon atom, a germanium atom or a phosphorus atom;

Z is, independently, an oxygen atom, a sulfur atom, a selenium atom, a nitrogen atom substituted with any of the combinations of a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent.

Formula 9A/B and Formula 10A/B may also be synthesized from each other by an oxidation or reduction reaction described by Method 8:

[METHOD 8]

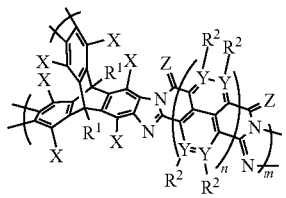
Formula 9A

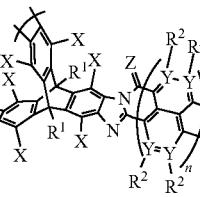
Formula 9B

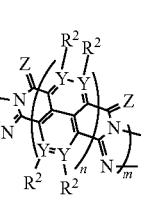
Formula 10A

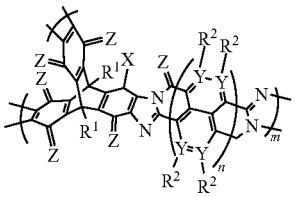
Formula 10B

Wherein, n is a number of repeat units ranging from 1 to 3;

m is a number of repeat units ranging from 0 to 5, alternatively m may be a number of repeat units ranging from 1 to 5;

l is a number of repeat units for the extension of the crosslinking network that may range independently from each of the vertex triptycene units from 1 to 5000;

$R^1$ is, independently, a hydrogen atom, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, or an ionically conductive chain such as (poly)ethylene glycol;

$R^2$ is, independently, a hydrogen atom, a lone pair of electrons, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, an ionically conductive chain such as (poly)ethylene glycol, an amino group, a cyano group, a nitro group, a hydroxyl group, a perfluoro alkyl group, or a halogen;

Y is, independently, a carbon atom, a nitrogen atom, a silicon atom, a germanium atom or a phosphorus atom;

Z is, independently, an oxygen atom, a sulfur atom, a selenium atom, an imine group substituted with a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent;

X is, independently, a hydroxyl group, a thiol group, an amine substituted with any of the combinations of a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent;

S3 and S4 are a solvent;

Ox1 is an oxidant;

Red1 is a reductant;

S3 and S4 may be any one or a combination, water, dimethylacetimide, toluene, xylene, benzene, glyme, dimethyl formamide, acetonitrile, diethyl carbonate, dimethyl carbonate, ethylene carbonate, propylene carbonate, ethylmethyl carbonate, vinylene carbonate and dimethylsulfoxide. S3 and S4 may also contain an ionically conductive salt such as, but not limited to, lithium hexafluorophosphate, lithium perchlorate, lithium trifluoromethanesulfonimide, sodium hexafluorophosphate, magnesium perchlorate, tetrabutylammonium hexafluorophosphate, and tetrabutylammonium bromide.

Ox1 may be any one of oxygen, an electrochemical oxidation, sodium hypochlorite, hydrogen peroxide, sulfuric acid, nitric acid, iron (III) chloride, and potassium nitrate.

Red1 may be any one of hydrogen, sodium borohydride, an electrochemical reduction, sodium dithionate, and hydrazine.

The present disclosure relates to a subset of ST2A/B as an electroactive material in an energy storage device having the molecular structure described in Formula 11A/B given here below:

[FORMULA 11A/B]:

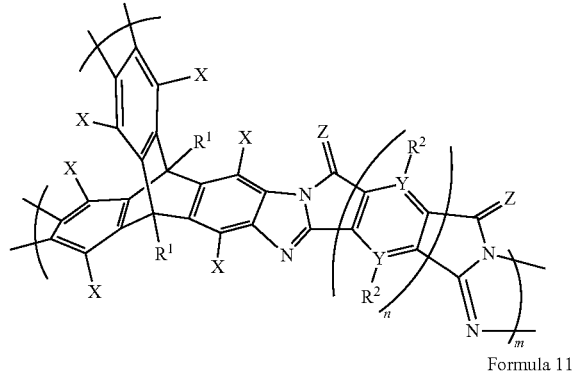
Formula 11A

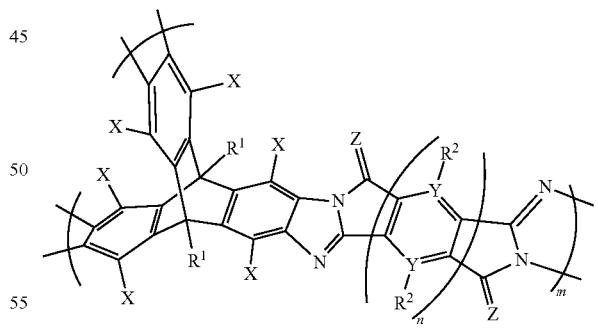
Formula 11B

Wherein, n is a number of repeat units ranging from 1 to 3;

m is a number of repeat units for the extension of the crosslinking network that may range independently from each of the vertex triptycene units from 1 to 5000;

$R^1$ is, independently, a hydrogen atom, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, or an ionically conductive chain such as (poly)ethylene glycol;

$R^2$ is, independently, a hydrogen atom, a lone pair of electrons, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, an ionically conductive chain such as (poly)ethylene glycol, an amino group, a cyano group, a nitro group, a hydroxyl group, a perfluoro alkyl group, or a halogen;

Y is, independently, a carbon atom, a nitrogen atom, a silicon atom, a germanium atom or a phosphorus atom;

Z is, independently, an oxygen atom, a sulfur atom, a selenium atom, a nitrogen atom substituted with any of the combinations of a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent.

X is, independently, a hydroxyl group, a thiol group, an amine substituted with any of the combinations of a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent.

The present disclosure relates to a subset of ST2A/B as an electroactive material in an energy storage device having the molecular structure described in Formula 12A/B given here below:

[FORMULA 12A/B]:

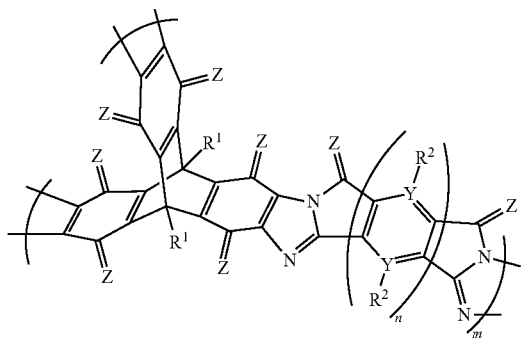

Formula 12A

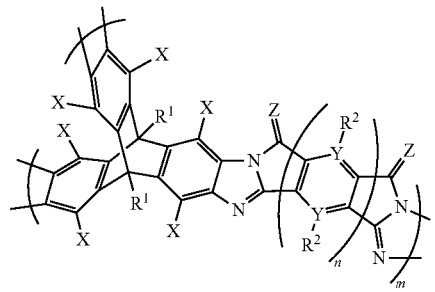

Formula 11A

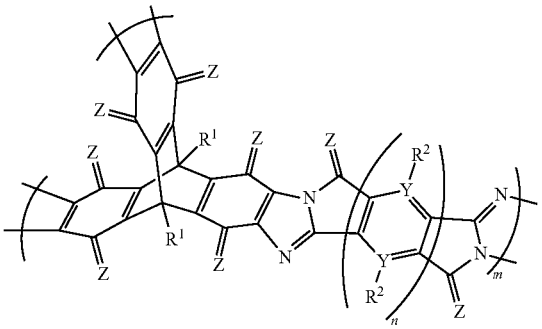

Formula 12B

Wherein, n is a number of repeat units ranging from 1 to 3;

m is a number of repeat units for the extension of the crosslinking network that may range independently from each of the vertex triptycene units from 1 to 5000;

$R^1$ is, independently, a hydrogen atom, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, or an ionically conductive chain such as (poly)ethylene glycol;

$R^2$ is, independently, a hydrogen atom, a lone pair of electrons, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, an ionically conductive chain such as (poly)ethylene glycol, an amino group, a cyano group, a nitro group, a hydroxyl group, a perfluoro alkyl group, or a halogen;

Y is, independently, a carbon atom, a nitrogen atom, a silicon atom, a germanium atom or a phosphorus atom;

Z is, independently, an oxygen atom, a sulfur atom, a selenium atom, a nitrogen atom substituted with any of the combinations of a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent.

Formula 11A/B and Formula 12A/B may also be synthesized from each other by an oxidation or reduction reaction described by Method 9:

[METHOD 9]

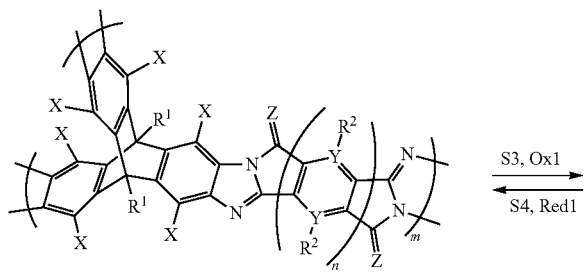

Formula 11B

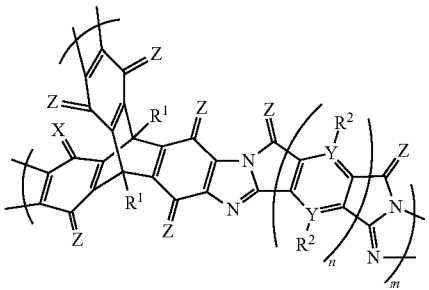

Formula 12A

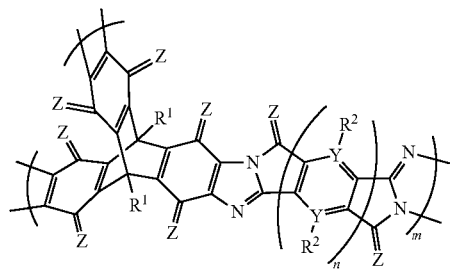

Formula 12B

Wherein, n is a number of repeat units ranging from 1 to 3;

m is a number of repeat units ranging from 0 to 5, alternatively m may be a number of repeat units ranging from 1 to 5;

l is a number of repeat units for the extension of the crosslinking network that may range independently from each of the vertex triptycene units from 1 to 5000;

$R^1$ is, independently, a hydrogen atom, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, or an ionically conductive chain such as (poly)ethylene glycol;

$R^2$ is, independently, a hydrogen atom, a lone pair of electrons, an alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, a crosslinking agent, an ionically conductive chain such as (poly)ethylene glycol, an amino group, a cyano group, a nitro group, a hydroxyl group, a perfluoro alkyl group, or a halogen;

Y is, independently, a carbon atom, a nitrogen atom, a silicon atom, a germanium atom or a phosphorus atom;

Z is, independently, an oxygen atom, a sulfur atom, a selenium atom, an imine group substituted with a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent;

X is, independently, a hydroxyl group, a thiol group, an amine substituted with any of the combinations of a hydrogen, alkyl chain such as, but not limited to, methyl, ethyl, propyl, isopropyl, butyl, isobutyl, tert-butyl or pentyl, an aromatic group such as, but not limited to, phenyl, thiophene, ethylene-dioxythiophene, pyrrole, or pyridinic, or a crosslinking agent;

S3 and S4 are a solvent;

Ox1 is an oxidant;

Red1 is a reductant;

S3 and S4 may be any one or a combination, water, dimethylacetimide, toluene, xylene, benzene, glyme, dimethyl formamide, acetonitrile, diethyl carbonate, dimethyl carbonate, ethylene carbonate, propylene carbonate, ethylmethyl carbonate, vinylene carbonate and dimethylsulfoxide. S3 and S4 may also contain an ionically conductive salt such as, but not limited to, lithium hexafluorophosphate, lithium perchorate, lithium trifluoromethanesulfonimide, sodium hexafluorophosphate, magnesium perchlorate, tetrabutylammonium hexafluorophosphate, and tetrabutylammonium bromide.

Ox1 may be any one of oxygen, an electrochemical oxidation, sodium hypochlorite, hydrogen peroxide, sulfuric acid, nitric acid, iron (III) chloride, and potassium nitrate.

Red1 may be any one of hydrogen, sodium borohydride, an electrochemical reduction, sodium dithionate, and hydrazine.

Example 4

Confirmation of Chemical Structure

The chemical structure of specific examples of ST2A/B were characterized by the following methods. Fourier transform infrared spectroscopy (FTIR) was carried out using a Perkin Elmer Spectrum 100 FT-IR spectrometer equipped with a 10-bounce diamond/ZnSe ATR accessory. $^{13}$C cross-polarization/magic angle spinning (CP/MAS) nuclear magnetic resonance (NMR) spectra were recorded using an Agilent DD2-700 spectrometer with a recycling delay of 30 seconds and an 18 kHz spinning rate. Electron spin resonance (ESR) measurements were obtained on a refurbished Bruker EMX X-Band spectrometer equipped with a high sensitivity cylindrical cavity (0101) at a microwave frequency of 9357.967 MHz, a modulation frequency of 100 kHz, and a modulation amplitude of 1 Gauss.

X-ray photoelectron spectroscopy (XPS) was carried out using a Thermo Scientific k-Alpha spectrometer with a monochromated Al $K_\alpha$ source. X-ray diffraction (XRD) was measured using a Rigaku MiniFlex 600 X-ray Diffractometer. Carbon dioxide adsorption isotherms were performed by Quantachrome's Material Characterization Laboratory with an Autosorb iQ Station 2. Prior to analysis, the frameworks were activated at 180° C. for 24 hours. Geometry optimizations and NMR calculations were performed using the Gaussian 09 software suite at the B3LYP level of theory and the 6-31G basis set. The NMR output from Gaussian 09 was converted into chemical shifts in ppm by a previously reported method. See [Chong, J. H.; MacLachlan, M. *J. Inorg. Chem.* 2006, 45 (4), 1442-1444.] for details on computational modelling of NMR chemical shifts.

Example 5

Electrode Characterization

The morphology of the electrode films of specific examples of ST2A/B were characterized by the following methods. The morphology of the films was examined using scanning electron microscopy (SEM) (Hitachi S-5200 SEM) and atomic force microscopy (AFM) was carried out using a Bruker Dimension Icon Atomic Force Microscope in tapping mode. Profilometry was performed using a KLA-Tencore P16+ profilometer with a 0.5 mg force setting and a scanning length of 2.5 microns. Transmission electron microscopy (TEM) was performed on a Hitachi HT-7700 C-TEM at an accelerating voltage of 80 kV. Selected area diffraction patterns and the corresponding TEM images were imaged using a Zeiss Leo 912 CTEM-EFTEM at an accelerating voltage of 120 kV.

Example 6

Electrochemical Measurements

Electrochemical measurements were performed on specific examples of ST2A/B to determine the applicability towards lithium ion batteries. All electrochemical measurements were recorded in an argon filled glovebox (mBraun) and performed using a Biologic SP-200 Potentiostat/Galvanostat/frequency response analyzer (FRA). Electrodes containing the frameworks was prepared by mixing the purified framework, carbon Super P, and polyvinylidene fluoride (PVDF) in a 60:30:10 (w/w/w) ratio and suspending the mixture in N-methyl pyrrolidone (NMP) at a concentration of 150 mg mL-1. The slurry was sonicated for 1 hour, stirring every 15 minutes to homogenize. The slurry was cast onto an aluminum foil current collector and dried according to a previously published procedure.[21] The films were approximately 75 μm thick with approximately 3.0 mg/cm² (1.8 mg/cm², or 240 mg/cm³, of the frameworks). CR2023-type coin cells were purchased from MTI Corporation. A copper foil with a diameter of 16 mm (McMaster-Carr) was used as the anodic current collector, a lithium foil with a diameter of 16 mm was used as the anode, and a Celgard polypropylene separator with a diameter of 19 mm was used to prevent short circuiting. An electrode punch (DPM Solution Inc.) was used to cut the electrodes to a 16 mm diameter and a hydraulic press (BT Innovations) was used to hermetically seal the cells. Approximately 80 μL of electrolyte (1:1 (v/v) ethylene carbonate:dimethoxyethane or 1:1 (v/v) ethylene carbonate:diethylcarbonate, 1 M LiPF6) was used to fill the cells prior to sealing.

Test Example 2

For a test example, we describe the synthesis, characterization, and performance of a lithium ion battery with an electrode material structure described by Formula 9A/B:

[FORMULA 9A/B]:

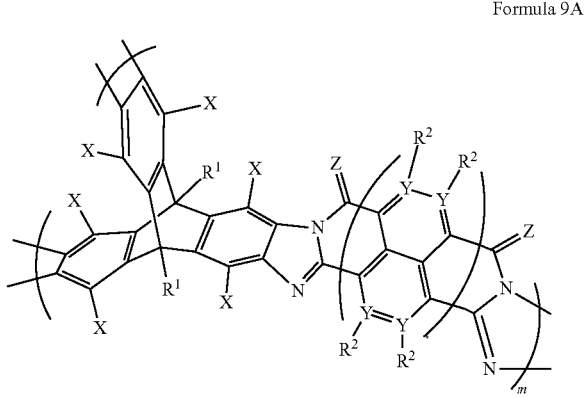

Formula 9A

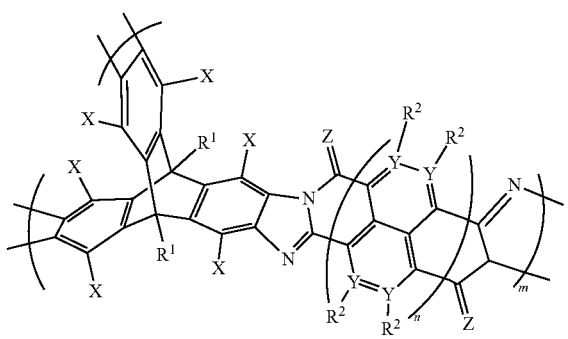

Formula 9B

In this test example of Formula 9, $R^1$, $R^2$ and X are hydrogens, n is equal to 2, Y is a carbon atom, Z is an oxygen atom, and m is equal to an integer between 1 and 5000. Hereafter, this specific example is referred to as compound B.

Following the scheme described in Method 6, a condensation reaction between a nucleophilic triptycene derivate and a bifunctional arylene electrophile was achieved using a base to remove acid protons as the solvent and a Lewis acid catalyst to synthesize compound B.

[METHOD 6]

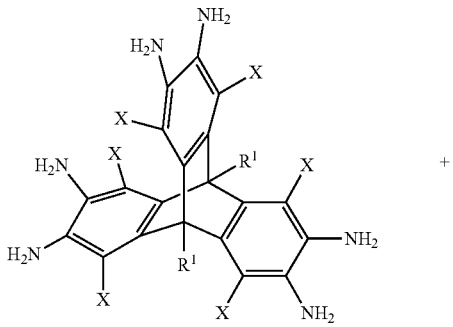

+

Also, in a test example we describe the synthesis, characterization, and performance of a lithium ion battery with an electrode material structure described by Formula 11A/B:

[FORMULA 11A/B]:

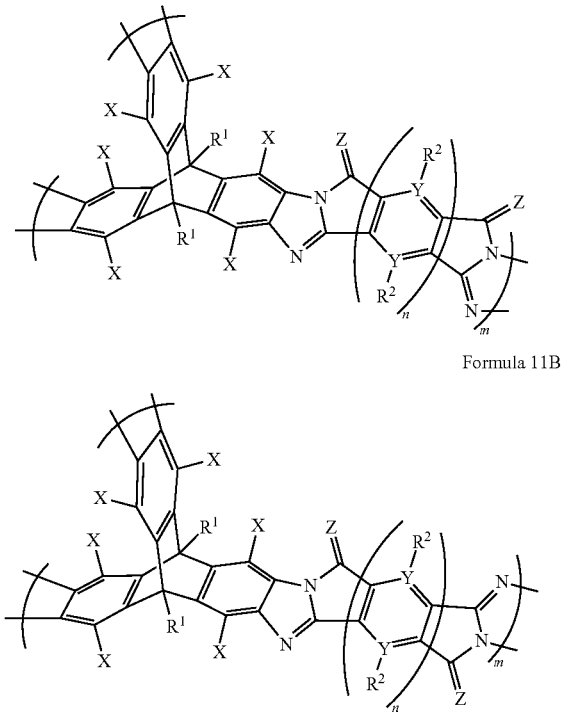

Formula 11A

Formula 11B

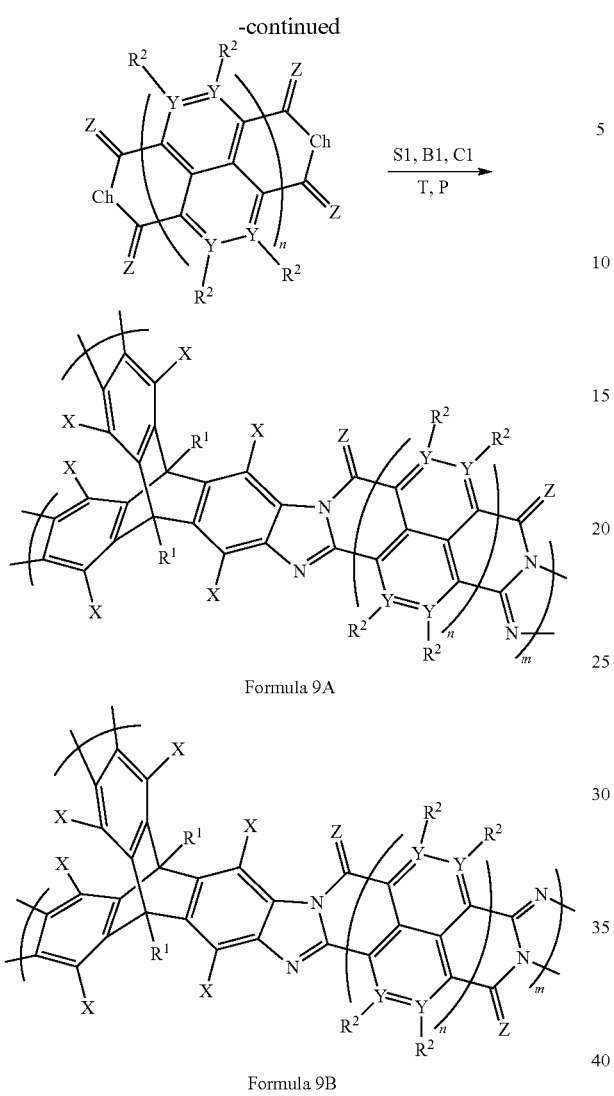

Formula 9A

Formula 9B

Here, described in this example of Method 6, Ch is an oxygen atom, S1 and B1 are imidazole, C1 is zinc (II) acetate, T is 160 degrees Celsius, and P is atmospheric pressure. 1 equivalent of 9,10-dihydro-9,10-[1,2]benzenoanthracene-2,3,6,7,14,15-hexaamine, 1.5 equivalents of perylene-3,4,9,10-tetracarboxylic dianhydride, 0.8 equivalents of zinc (II) acetate, and 260 equivalents of imidazole were mixed together to homogenize and then added to a flame-dried 3-necked flask fit with a reflux condenser. The mixture was backfilled with argon three times to remove any oxygen. The reaction mixture was stirred at 160° C. for 24 hours. Upon completion, the reaction was cooled to room temperature and methanol was added to dissolve the solid imidazole. The reaction was then poured into methanol and filtered through a Soxhlet thimble. The solid was filtered through a soxhlet thimble and was extracted with methanol for 1 day, acetone for 3 hours, hexanes for 2.5 hours, and chloroform for 18 hours to yield a dark purple solid (78.5% yield). $^{13}$C CP/MAS NMR δ: 160.13, 142.12, 135.00, 126.46, 117.62, 48.66 ppm. The synthesis of 9,10-dihydro-9,10-[1,2]benzenoanthracene-2,3,6,7,14,15-hexaamine was performed according to Chong, J. H.; MacLachlan, M. J. Inorg. Chem. 2006, 45 (4), 1442-1444.

In this test example of Formula 11, $R^1$, $R^2$ and X are hydrogens, n is equal to 1, Y is a carbon atom, Z is an oxygen atom, and m is equal to an integer between 1 and 5000. Hereafter, this specific example is referred to as compound C Following the scheme described in Method 7, a condensation reaction between a nucleophilic triptycene derivate and a bifunctional arylene electrophile was achieved using an acid catalyst as the solvent and a dehydrating reagent to remove water and drive the reaction to completion to synthesize compound C.

[METHOD 7]

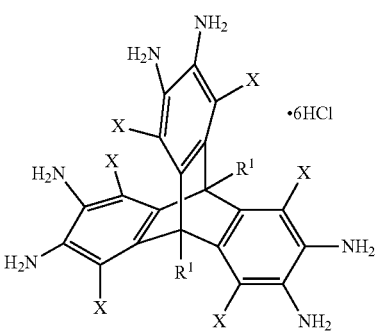

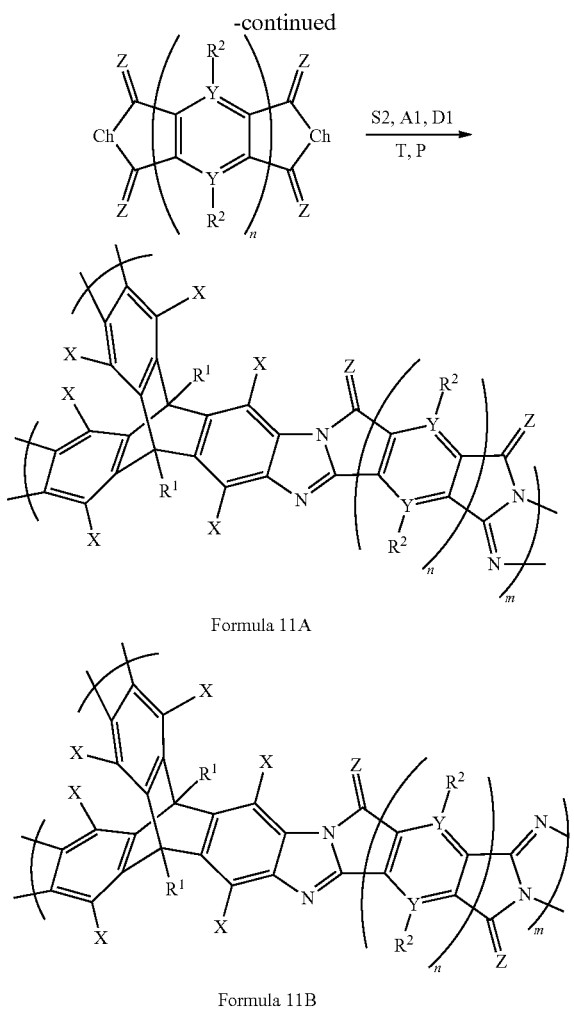

Formula 11A

Formula 11B

Here, described in this example of Method 7, Ch is an oxygen atom, S2, A1, and D1 are polyphosphoric acid, T is 50 to 180 degrees Celsius, and P is atmospheric pressure. Polyphosphoric acid was added to an oven-dried 3-necked flask fitted with an argon inlet. The viscous liquid was degassed by bubbling argon through it while heating at 110° C. for 24 hours with stirring. The liquid was cooled to 50° C. and 2,3,6,7,14,15-hexaammoniumtriptycene hexachloride (1 equivalent) was added and the solution was then stirred at 120° C. overnight. The solution was then cooled to 70° C., and pyromellitic dianhydride (1.5 equivalents) was added. The reaction was slowly heated to 180° C. at a heating rate of 4° C. min$^{-1}$. Upon completion, the reaction was cooled and poured into 500 mL of rapidly stirring methanol. The residual solid in the reaction flask was dissolved in water and poured into the stirring methanol. After stirring for 20 minutes, the solid was filtered, dried, and ground with a mortar and pestle. The solid was then placed in a soxhlet thimble and extracted with methanol for 24 hours, followed by chloroform for 3 hours (61.9% yield). $^{13}$C CP/MAS NMR δ: 165.95, 142.33, 132.48, 111.06, 53.30 ppm. The synthesis of 2,3,6,7,14,15-hexaammoniumtriptycene hexachloride was performed according to Mastalerz, M.; Sieste, S.; Cenić, M.; Oppel, I. M. *J. Org. Chem.* 2011, 76 (15), 6389-6393.

Characterization of Compound B and Compound C

Figure 10:
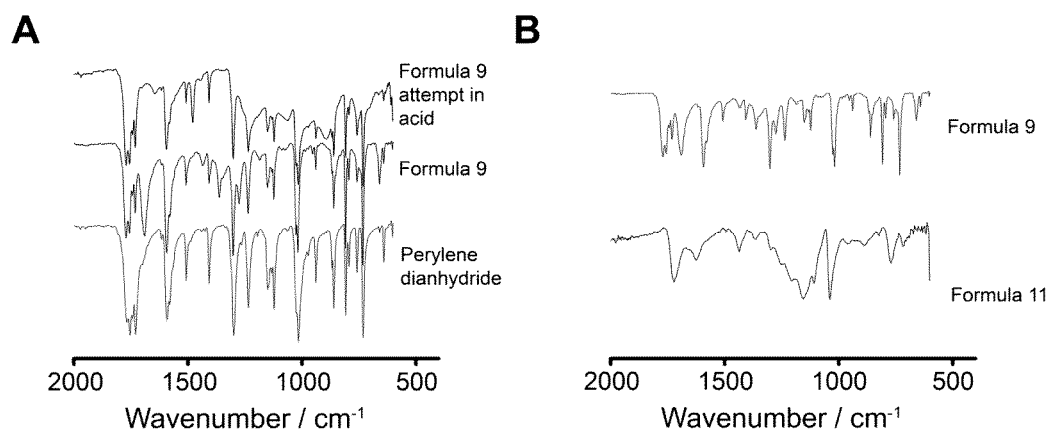
FIG. 10. (a) FTIR spectra of a specific example of Formula 9 where $R^1$, $R^2$ and X are hydrogens, n is equal to 2, Y is a carbon atom, Z is an oxygen atom, and m is equal to an integer between 1 and 5000 synthesized in acidic conditions, Formula 9 synthesized in basic conditions and the perylene dianhydride starting material. (b) FTIR spectra of Formula 9 and a specific example of Formula 11 where $R^1$, $R^2$ and X are hydrogens, n is equal to 1, Y is a carbon atom, Z is an oxygen atom, and m is equal to an integer between 1 and 5000.

Attempts to synthesize this specific example of compound B using acidic conditions only led to the recovery of starting material as indicated by the FTIR spectra (FIG. 10). When compound C was synthesized in basic conditions, a new peak at 1690 cm$^{-1}$ was observed that corresponds to the C=O stretch and the C=N stretch in the new 5-membered ring, which is consistent with similar small molecule organic compounds. When compound C was synthesized in acidic conditions, new peaks in the FTIR spectra emerged. Notably, the broad peaks at 1721 cm$^{-1}$, 1625 cm$^{-1}$, and 1436 cm$^{-1}$ in compound C are due to the C=O and C=N stretches.

Figure 11:
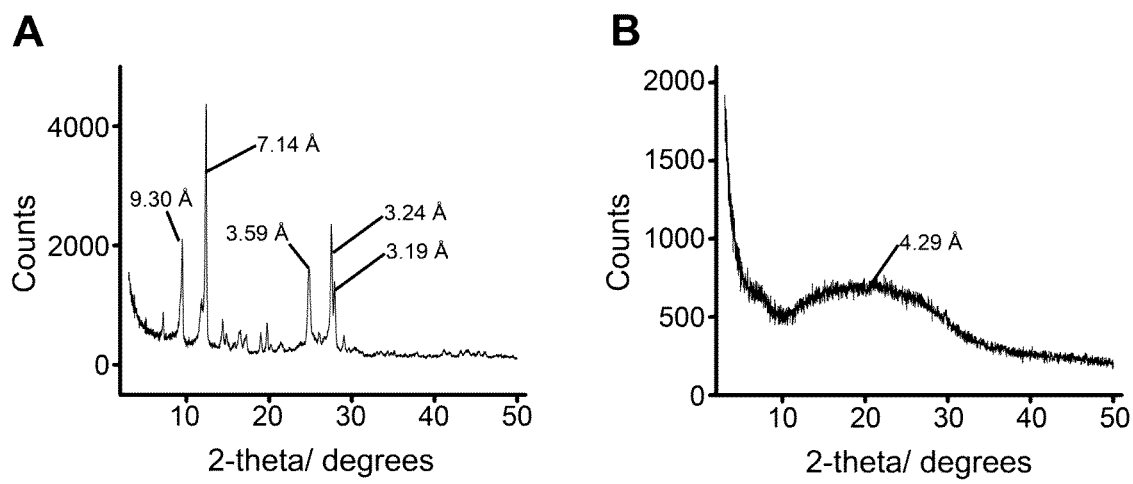
FIG. 11. XRD patterns of (a) a specific example of Formula 9 where $R^1$, $R^2$ and X are hydrogens, n is equal to 2, Y is a carbon atom, Z is an oxygen atom, and m is equal to an integer between 1 and 5000, (b) a specific example of Formula 11 where $R^1$, $R^2$ and X are hydrogens, n is equal to 1, Y is a carbon atom, Z is an oxygen atom, and m is equal to an integer between 1 and 5000.

The XRD pattern of compound B shows diffraction peaks that are similar to other perylene diimide-based polymers linked through the diimide nitrogen, and also that of the perylene-3,4,9,10-tetracarboxylic dianhydride starting material (FIG. 11). This suggests that the diffraction peaks are coming from the stacking of the perylene units. The XRD pattern of compound C shows a broad amorphous halo corresponding to a spacing of 4.29 Å. Since the arylene dianhydride starting materials are crystalline, this shows that compound C is functionalized to a relatively high degree which breaks up the crystal packing between the arylene units. The differences between the resulting crystallinity of the frameworks are likely the result of the stronger interactions of the perylene cores leading to low solubility. The low solubility leads to the compound B compound precipitating out of solution after a low degree of functionalization.

Figure 12:
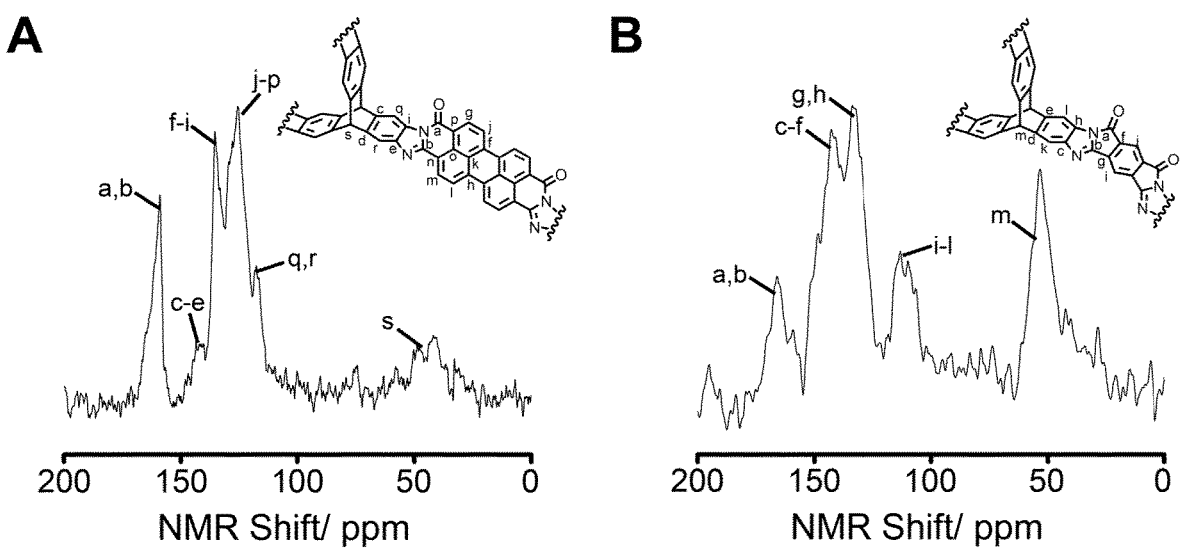
FIG. 12. CP/MAS $^{13}$C NMR spectra of (a) a specific example of Formula 9 where $R^1$, $R^2$ and X are hydrogens, n is equal to 2, Y is a carbon atom, Z is an oxygen atom, and m is equal to an integer between 1 and 5000, (b) a specific example of Formula 11 where $R^1$, $R^2$ and X are hydrogens, n is equal to 1, Y is a carbon atom, Z is an oxygen atom, and m is equal to an integer between 1 and 5000 with the corresponding assignments calculated by DFT.

Solid-state $^{13}$C NMR was performed to further characterize the frameworks (FIG. 12). The spectra of the frameworks are consistent with reports of similar compounds and the assignments correlate with those calculated by DFT. The chemical shift of the carbonyl and benzimidazole ring are at 159 ppm and 166 ppm, for compound B and compound C respectively. Additionally, the spa carbon peak in the triptycene unit is observed at 49 ppm and 53 ppm for compound B and compound C respectively indicating that the incorporation of the triptycene unit into the material is successful. Other peaks in the spectra correspond to the various aromatic carbons in the phenyl groups of the triptycene and the aromatic carbons in the arylene units. As the linker in the frameworks decreases in size from perylene to pyromellitic, the signal in the spectra decreases dramatically.

Figure 13:
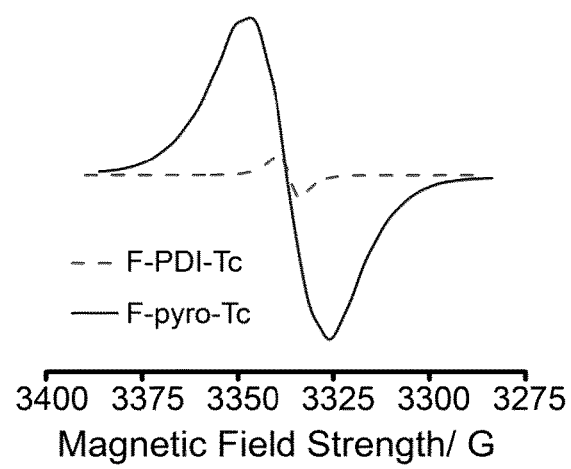
FIG. 13. ESR spectra of a specific example of Formula 9 where $R^1$, $R^2$ and X are hydrogens, n is equal to 2, Y is a carbon atom, Z is an oxygen atom, and m is equal to an integer between 1 and 5000 and a specific example of Formula 11 where $R^1$, $R^2$ and X are hydrogens, n is equal to 1, Y is a carbon atom, Z is an oxygen atom, and m is equal to an integer between 1 and 5000.

Increasing the number of scans in the measurement did not provide greater resolution which suggests that the frameworks exhibit some paramagnetic character. Indeed, ESR measurements show that all frameworks possess radical character with a small degree of anisotropy and hyperfine coupling for compound C and no hyperfine coupling for compound B (FIG. 13). The g-factor is 2.0034 for compound B and 2.0030 for compound C. The g-factors for the frameworks are similar to that observed for a similar ladder-type polymer, polybenzimidazobenzoisoquinoline (BBL), which has a g-factor of 2.0034. ESR studies of BBL show similar spectra to that obtained with compound C, having a small degree of anisotropy and hyperfine coupling. The origin of the unpaired electrons in BBL was attributed to the formation of bond alternation charged defects that result in polarons, which was supported by an optical absorption below 2000 nm. This suggests that polarons are present in all of the synthesized frameworks, with the concentration of the polarons increasing from compound B to compound C.

Figure 14:
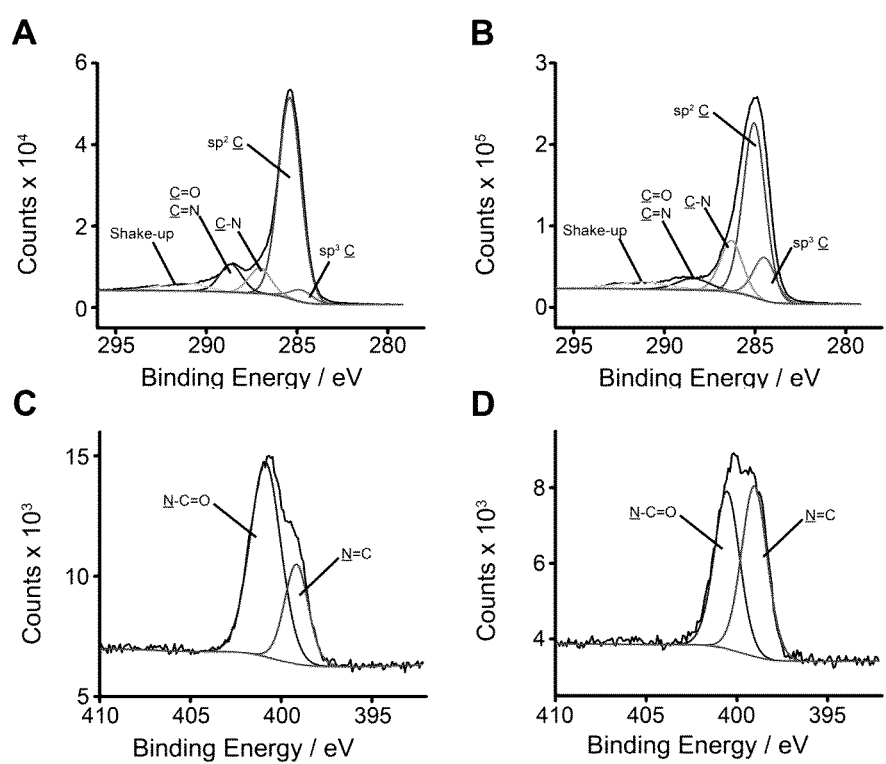
FIG. 14. C1s XPS spectra of (a) a specific example of Formula 9 where $R^1$, $R^2$ and X are hydrogens, n is equal to 2, Y is a carbon atom, Z is an oxygen atom, and m is equal to an integer between 1 and 5000 and (b) a specific example of Formula 11 where $R^1$, $R^2$ and X are hydrogens, n is equal to 1, Y is a carbon atom, Z is an oxygen atom, and m is equal to an integer between 1 and 5000. N1s XPS spectra of (a) Formula 9 and (b) Formula 11.

The C1s XPS spectra shows that compound B and compound C possess the correct carbon environments expected for the frameworks (FIG. 14). Each possesses an sp$^3$ carbon signal corresponding to the aliphatic carbon in the triptycene unit, an sp$^2$ carbon signal attributed to the carbon atoms in the aromatic rings, a signal corresponding to the carbons in the triptycene rings bonded to nitrogen atoms, a signal corresponding to the benzimidazole carbons double bonded to oxygen and nitrogen, and a broad shake-up feature corresponding to the π-π* transition. Additionally, the N1s XPS spectra shows two nitrogen bonding environments. The peak at 399.18 eV and 399.08 eV in compound B and compound C corresponds to the $sp^2$ nitrogen while the peak at 400.88 eV for compound B and the peak at 400.58 eV for compound C corresponds to the spa nitrogen. The results of the N1s spectra show that the benzimidazole ring is formed between the dianhydride and the triptycene unit.

Figure 15:
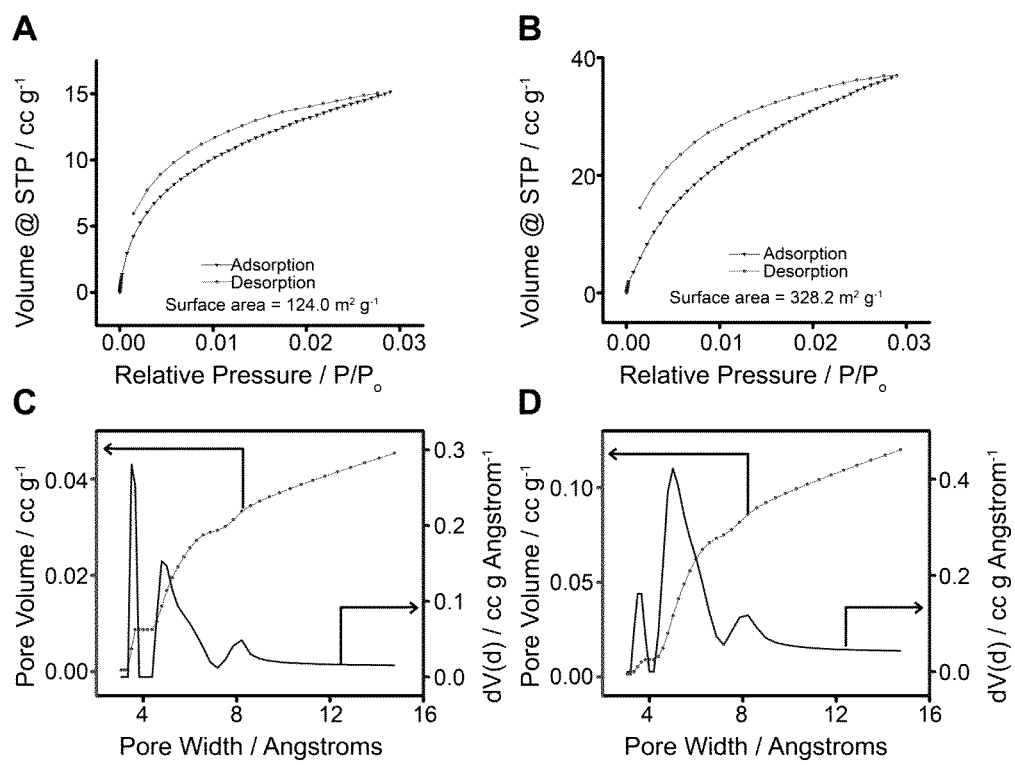
FIG. 15. $CO_2$ gas adsorption and pore size distribution of (a,c) a specific example of Formula 9 where $R^1$, $R^2$ and X are hydrogens, n is equal to 2, Y is a carbon atom, Z is an oxygen atom, and m is equal to an integer between 1 and 5000 and (b,d) a specific example of Formula 11 where $R^1$, $R^2$ and X are hydrogens, n is equal to 1, Y is a carbon atom, Z is an oxygen atom, and m is equal to an integer between 1 and 5000.

The porosity and surface of the materials were examined by $CO_2$ gas adsorption at room temperature (FIG. 15). All frameworks show a typical type I isotherm that is consistent with microporous materials. The surface area of the materials increases with decreasing aromatic linker size with compound B and compound C having surfaces areas of 124.0 $m^2$ $g^{-1}$, and 328.2 $m^2$ $g^{-1}$ respectively. The pore size distribution calculated by DFT shows that all frameworks have similar pore sizes of 3.5 Å, 4.8 Å, and 8.2 Å for compound B, and 3.5 Å, 5.0 Å, and 8.2 Å for compound C.

Electrode Characterization

Figure 16:
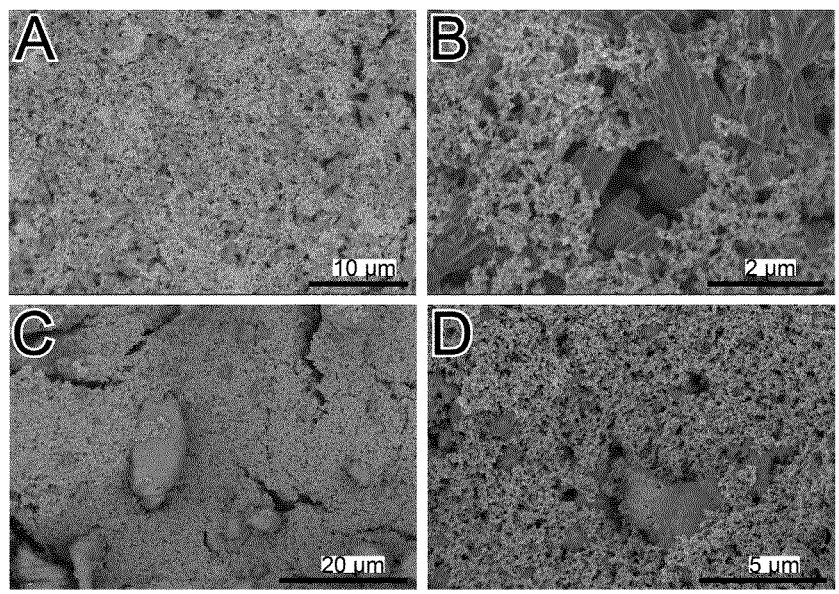
FIG. 16. SEM images of (a,b) a specific example of Formula 9 where $R^1$, $R^2$ and X are hydrogens, n is equal to 2, Y is a carbon atom, Z is an oxygen atom, and m is equal to an integer between 1 and 5000 electrodes and (c,d) a specific example of Formula 11 where $R^1$, $R^2$ and X are hydrogens, n is equal to 1, Y is a carbon atom, Z is an oxygen atom, and m is equal to an integer between 1 and 5000.

To test the applicability of compound B and compound C for lithium-ion battery anodes, electrode films were cast as a composite of the active framework materials, carbon Super P, and a PVDF binder in a weight ratio of 60:30:10. The electrodes were first examined by SEM to characterize the morphology, which is important for the performance of the resultant lithium-ion batteries (FIG. 16). The SEM images of the compound B electrode show a homogenous distribution of the materials. The compound B material appears as small aggregates with an average length of less than 2 μm and a diameter of ~300 nm which are distributed within the carbon Super P matrix. The compound C electrode also has large aggregates in the electrode, with lengths around 20 μm. The compound C electrode has some regions where there is a homogenous distribution of material.

Lithium Ion Battery Testing and Characterization

Figure 17:
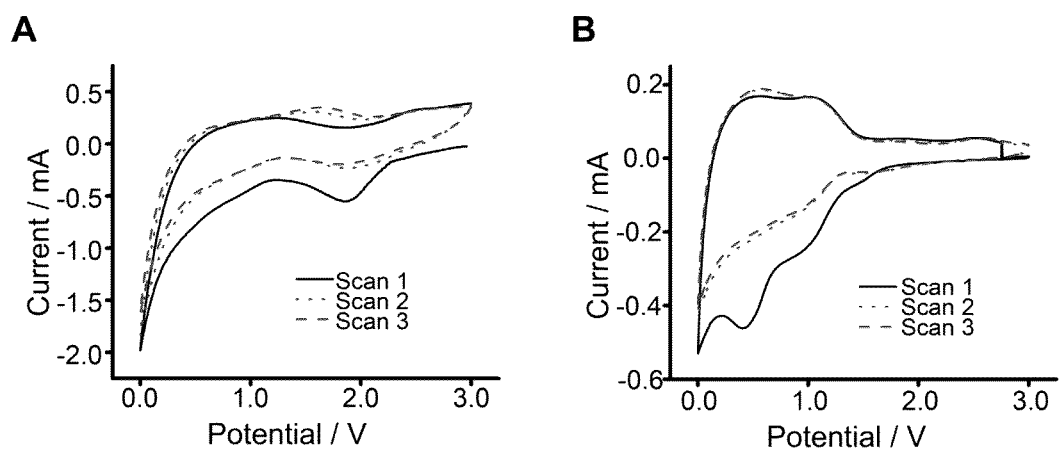
FIG. 17. Cyclic voltammetry (CV) (a) a specific example of Formula 9 where $R^1$, $R^2$ and X are hydrogens, n is equal to 2, Y is a carbon atom, Z is an oxygen atom, and m is equal to an integer between 1 and 5000 and (b) a specific example of Formula 11 where $R^1$, $R^2$ and X are hydrogens, n is equal to 1, Y is a carbon atom, Z is an oxygen atom, and m is equal to an integer between 1 and 5000 batteries performed at 1 mV s$^{-1}$.

To test the electrodes, lithium ion battery coin cells were assembled using lithium as the reference and auxiliary electrode. From the cyclic voltammogram, the frameworks exhibit an electrochemical profile that is consistent with that observed for superlithiation compounds (FIG. 17). For the compound B electrode, the first scan reveals a sharp cathodic peak at 1.90 V which almost disappears in the consecutive scans. This peak is ascribed to the reduction of the carbonyl oxygen and the reduction of the $sp^2$ imine nitrogen. From 1 V to 0 V vs Li/Li$^+$, a reduction occurs that is attributed to the formation of the solid electrolyte interface and the insertion of lithium-ions into the aromatic carbons around the framework. When reversing the scan, there is a small, broad oxidation peak centred at 1.23 V that is ascribed to the de-insertion of lithium-ions in the framework. Beyond the first scan, the CV curves nearly overlap and there is a new anodic peak that emerges at 1.60 V. The CV of the compound C contains cathodic peaks at 1.46 V, 0.92 V, and 0.42 V that correspond to the reduction of the carbonyl groups, the reduction of the imine groups, and the formation of the solid electrolyte interface respectively. Additionally, from 1.0 V to 0.0 V, there is a broad reduction peak overlapping with the peaks at 0.92 V and 0.42 V that correspond to the insertion of lithium ions into the aromatic carbons, much like that of compound B. However, unlike compound C, there is a much more pronounced oxidation. Two distinct peaks at 0.53 V and 1.01 V relate to the de-insertion of lithium ions. After the first scan, the peaks at 1.46 V and 0.92 V are greatly diminished and the peak at 0.42 V completely disappears. The broad reduction and oxidation peaks from 0.0 V to 1.0 V corresponding to the insertion and de-insertion of lithium ions into and out of the framework become consistent after the first scan.

To determine the capacity of the frameworks, galvanostatic charge-discharge experiments were performed. It is important to note that since compound B and compound C are being tested as anode materials, the capacities are calculated from the galvanostatic profile going from low to high potential with positive current, designated as the discharge profile. This is because when assembled into a lithium-ion battery, the profile going from low to high potential will determine the discharge capacity of the anode, while the profile from high potential to low potential will determine the charging capacity.

Figure 18:
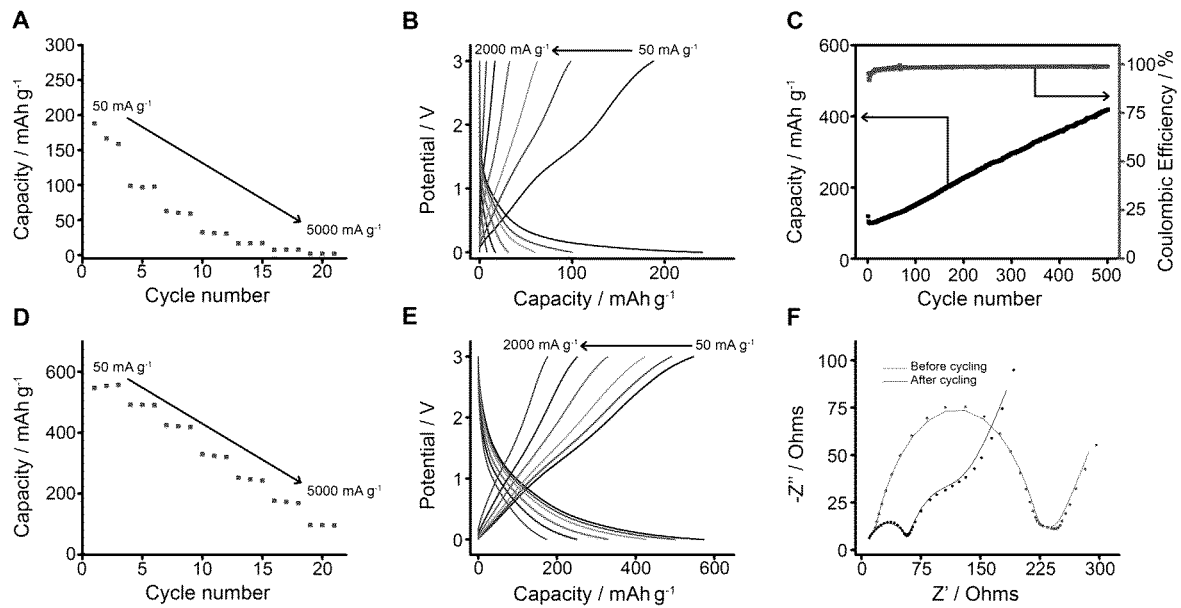
FIG. 18. Performance of a specific example of Formula 9 where $R^1$, $R^2$ and X are hydrogens, n is equal to 2, Y is a carbon atom, Z is an oxygen atom, and m is equal to an integer between 1 and 5000 in a lithium ion battery. (a) Capacity at different currents and (b) charge discharge behaviour before cycling. (c) Cycling stability at 200 mA (d) Capacity at different currents and (e) charge discharge behaviour after cycling. (f) Impedance of Formula 9 lithium ion battery performed at 0.1 V before and after cycling. The solid lines represent the fits.

The compound B battery has an initial capacity of 188 mAh $g^{-1}$ at a current density of 50 mA $g^{-1}$ (FIG. 18). Increasing the current leads to a dramatic decrease in performance, with a capacity of only 32 mAh $g^{-1}$ at a current density of 500 mA $g^{-1}$. The charge profile of the compound B electrode has a plateau between 0.5 V and 0.0 V and a long sloping discharge from 0 V to 3 V. When the cycling stability of the compound B electrode is tested at 200 mA $g^{-1}$, an almost linear increase in capacity starting from 100 mAh $g^{-1}$ at the 3rd cycle and increasing to 419 mAh $g^{-1}$ on the 500th cycle with an almost perfect coulombic efficiency is observed. This shows that there is a long activation period required for this material. After testing the cycling stability, the rate capabilities were re-examined and they show a marked improvement in performance. At a current density of 50 mA $g^{-1}$, the capacity of the cycled compound B electrode reaches a maximum of 557 mAh $g^{-1}$ and even at an extremely high current density of 5000 mA $g^{-1}$, the electrode still maintains a capacity of 96 mAh $g^{-1}$. The reason for this drastic rise in performance is likely due to an activation of the electrode by an increased penetration of the electrolyte within the crystal structure of compound B, leading to a decreased resistance. This resistance may be quantified by the impedance data, where the charge transfer resistance decreases from 214.7Ω to 57.97Ω from the pristine electrode to the cycled electrode.

Figure 19:
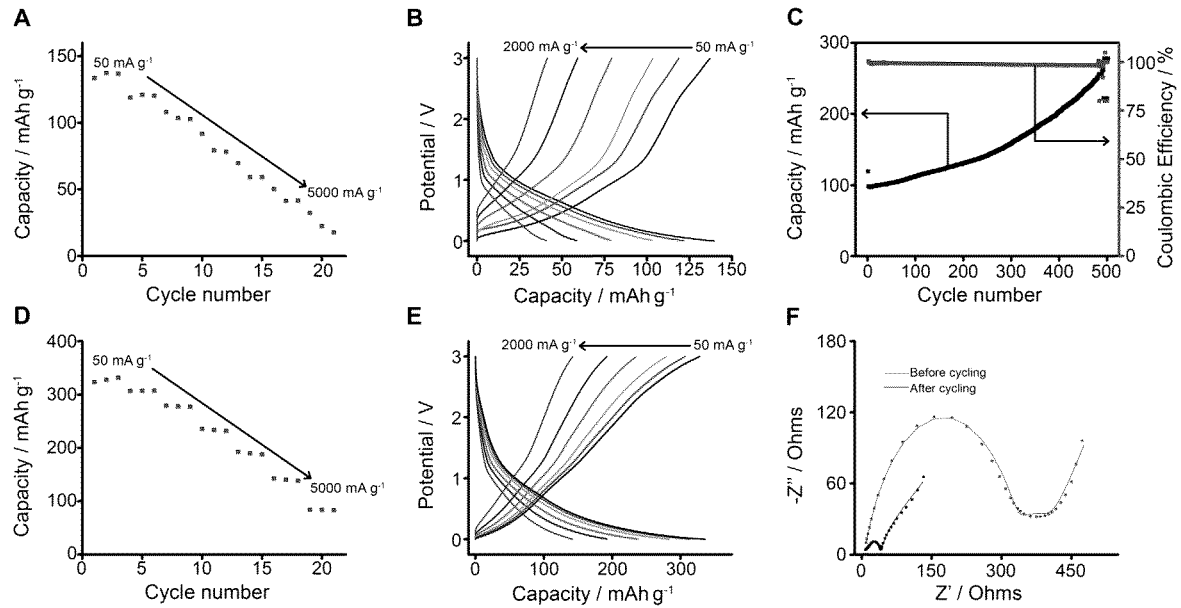
FIG. 19. Performance of a specific example of Formula 11 where $R^1$, $R^2$ and X are hydrogens, n is equal to 1, Y is a carbon atom, Z is an oxygen atom, and m is equal to an integer between 1 and 5000 in a lithium ion battery. (a) Capacity at different currents and (b) charge discharge behaviour before cycling. (c) Cycling stability at 200 mA g$^{-1}$. (d) Capacity at different currents and (e) charge discharge behaviour after cycling. (f) Impedance of Formula 11 lithium ion battery at 0.1 V before and after cycling. The solid lines represent the fits.

The compound C electrode has an initial performance similar to that of the compound B electrode. At a current density of 50 mA $g^{-1}$, compound C has a capacity of 137 mAh $g^{-1}$ and at a current density of 500 mA $g^{-1}$ it has a capacity of 79.3 mAh $g^{-1}$ indicating that it initially has a rate capability greater than that of compound B before cycling (FIG. 19). Cycling the battery leads to an increase in capacity from 98.7 mAh $g^{-1}$ in the second cycle to 278 mAh $g^{-1}$ in the 500th cycle. Testing the rate capabilities after cycling results in a dramatic improvement in performance. The capacity at 50 mA $g^{-1}$ is 328 mAh $g^{-1}$ and at 5000 mA $g^{-1}$ the capacity is 83.8 mAh $g^{-1}$. The increase in capacity is also attributed to an activation of the electrode, similar to the compound B battery. The decrease in charge transfer resistance from 339.6Ω before cycling to 30.05Ω after cycling shows that the activation results in an increase in the charge transfer kinetics.

The trend in performance of the frameworks may be explained by the crystallinity, the morphology of the electrode, and the amount of charge carriers in the frameworks. With compound B, the favourable morphology and the high crystallinity provide short ionic and electronic conduction paths, as well as a short electron hopping distance between the perylene units due to their close π-π stacking distances. This allows compound B to have a high capacity. Compound C has a relatively unfavourable morphology and a low crystallinity compared to that of compound B. However, its high performance may be attributed to the high number of charge carriers within the framework, indicated by the large ESR signal, providing a higher conductivity compared to compound B. Additionally, the larger surface area may allow for a better electrolyte penetration within the active material and a higher ionic conductivity within the framework.

According to an embodiment, triptycene-based frameworks with benzimidazole linkers may be synthesized for lithium ion battery anode applications.

According to an embodiment, when an electrode is prepared with compound B, the initial capacity was 188 mAh g$^{-1}$ but increased to 557 mAh g$^{-1}$ after charging and discharging 500 times. This increase is attributed to an activation of the electrode that reduces the charge-transfer resistance, enhancing the kinetics of the redox reactions. The high performance of the compound B electrode is attributed to the high crystallinity and small aggregate size in the electrode that allows for short lithium ion diffusion pathways and a short electron hopping distance between perylene units.

The compound C electrode showed similar performance, with an initial capacity of 98.7 mAh g$^{-1}$ that increases to 278 mAh g$^{-1}$ after 500 cycles. The high performance of compound C is attributed to a high concentration of polarons in the framework which provides a relatively high conductivity and a large pore volume that facilitates electrolyte penetration in the active material. Taking these results into account, the use of ladder-type triptycene-based frameworks for lithium-ion battery anodes may result in highly stable, high capacity materials that may be used to replace or supplement the graphite-based anodes used in commercial devices.

According to an embodiment, the use of ST2 Å/B as the sole active materials in electrodes or as additives to existing technologies may greatly improve the performance of energy storage devices.

According to an embodiment, ST2 Å/B may also be useful as electrode materials for energy storage device such as, but not limited to, a lithium ion battery, sodium ion battery, magnesium ion battery, aluminium ion battery, potassium ion battery, supercapacitor, a capacitor, a solid-state battery, an aqueous battery, or a hybrid device combining electrode materials of any of the above devices.

According to an embodiment, due to the nature of organic materials and their ability to undergo redox chemistry with a wide variety of ions in respect to their charge balancing, ST2 Å/B may be much more versatile than their inorganic counterparts such as metals oxides that require ions of a specific size and/or charge in order for them to function as electrode materials. This may allow organic materials to be used in a number of different battery configurations and chemistries. The energy storage devices may be constructed to have one or both of flexible mechanical properties and a customizable form factor. Here, flexible mechanical properties refer to the entire energy storage device possessing mechanical flexibility with a bending radius of at least 5 mm and twisting angle of at least 15° while still maintaining greater than 90% of the device performance in an unbent or twisted state.

A customizable form factor here refers to the ability to manufacture the entire device into a variety of shapes, sizes, and architectures such as patterned batteries, printed batteries, and batteries with unconventional architectures while still maintaining greater than 90% of the device performance when manufactured in a conventional battery architecture, size, and shape such as a coin cell or a pouch-type cell. In addition to the above-mentioned energy storage devices that the present compounds may be used for, by taking advantage of the electroactive properties of these materials, it will be understood that these compounds may also be used as catalysts for, including but not limited to, hydrogenation, sulfoxidation, hydrogen peroxide addition, and oxidation and reduction of organic/inorganic molecules.

These materials may also be used for electrocatalysis, one example being for use in fuel cells, and other examples including electrocatalytic oxidation of biologically relevant molecules including but not limited to nicotinamide adenine dinucleotide, oxygen, dopamine, and ascorbic acid.

These materials may also be used for water splitting, taking advantage of the electrocatalytic properties of the materials. This would occur through electrocatalytic oxidation of water in an appropriate electrolytic solution to produce molecular oxygen and/or hydrogen peroxide. This may also occur through the electrocatalytic reduction of water in an appropriate electrolytic solution to produce molecular hydrogen.

They may also be used as fluorescent labels where a specific binding to the material by a biologically or commercially relevant substance including but not limited to cells, proteins, tissue, and/or organic molecules leads to the substance being fluorescently labelled by the material. Upon examination of the substance, detection of the fluorescence afforded to the substance by the herein reported materials would lead to a quantitative and/or qualitative result indicating whether binding has occurred, the degree of binding, and whether binding substances are present in the sample. The inventors contemplate that these materials may be useful as therapeutic agents, for example a drug delivery vessel, a drug, and/or a prodrug.

The present disclosure provides an energy storage device comprising electrodes made of at least one electroactive material of any one of formulas 1 to 8, formulas 1' to 8', and formulas 1" to 8". This energy storage device may be used as a lithium ion battery, sodium ion battery, magnesium ion battery, aluminium ion battery, potassium ion battery, a supercapacitor, a capacitor, a solid-state battery, an aqueous battery, or a hybrid device.

Wherever the present disclosure provides m is a number of repeat units ranging from 0 to 5, according to an embodiment m may be a number of repeat units ranging from 1 to 5.

The foregoing description of the preferred embodiments of the present disclosure have been presented to illustrate the principles of the invention and not to limit the invention to the particular embodiment illustrated. It is intended that the scope of the invention be defined by all of the embodiments encompassed within the following claims and their equivalents.

Therefore what is claimed is:

1. An electroactive material comprising the molecular structure according to formula ST1:

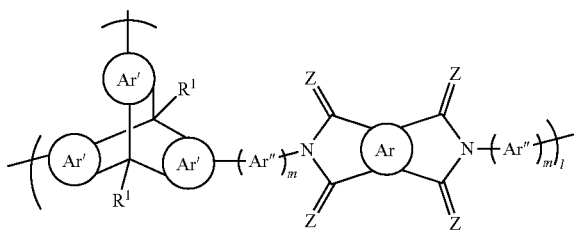

ST1 wherein, m is a number of repeat units ranging from 0 to 5;
I is a number of repeat units for the extension of the crosslinking network that range independently from each of the vertex triptycene units from 1 to 5000;
R¹ is, independently, a hydrogen atom, an alkyl chain, an aromatic group, a crosslinking agent, or an ionically conductive chain;
Z is, independently, an oxygen atom, a sulfur atom, a selenium atom, an imine group substituted with a hydrogen, alkyl chain, an aromatic group, or a crosslinking agent;
Ar is, independently, an aromatic group with an arrangement of aromatic rings numbering between 1 and 6, a substituted aromatic group, a crosslinking agent, an ionically conductive chain, an amino group, a cyano group, a nitro group, a hydroxyl group, a perfluoro alkyl group, or a halogen, or a heteroaromatic group containing hydrogen atoms, carbon atoms, nitrogen atoms, silicon atoms, germanium atoms, or phosphorus atoms in any substitution pattern or in any number ranging, independently, between 0 and 26, or a substituted heteroaromatic group, a crosslinking agent, an ionically conductive chain, an amino group, a cyano group, a nitro group, a hydroxyl group, a perfluoro alkyl group, or a halogen;
Ar' is, independently, a phenyl group, a quinone, a hydroxyquinone, or a heteroaromatic group, or a substituted aromatic group with cyano groups, carboxyl groups, nitro groups, or amine groups attached;
Ar" is a linking group that be, independently, a phenyl group, a quinone, a hydroxyquinone, a heteroaromatic group, or a substituted aromatic group with cyano groups, carboxyl groups, nitro groups, or amine groups attached, and contain an oxygen atom, a sulfur atom, a selenium atom, a nitrogen atom substituted with any of the combinations of a hydrogen, alkyl chain, an aromatic group, or a crosslinking agent, bonded adjacent to the groups mentioned above.

2. An electroactive material of claim 1 comprising the molecular structure selected from the group consisting of Formula (1), Formula (2), Formula (3), Formula (4), Formula (5), Formula (6), Formula (7) and Formula (8):

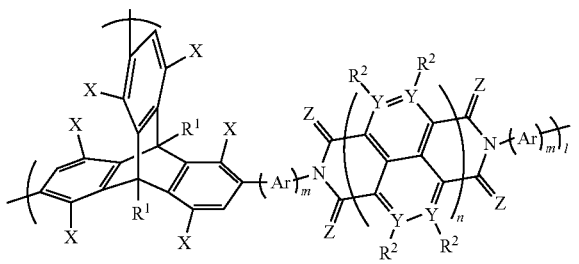

Formula (1)

wherein, n is a number of repeat units ranging from 1 to 3;
m is a number of repeat units ranging from 0 to 5;
I is a number of repeat units for the extension of the crosslinking network that ranges independently from each of the vertex triptycene units from 1 to 5000;
R¹ is, independently, a hydrogen atom, an alkyl chain, an aromatic group, a crosslinking agent, or an ionically conductive chain;
R² is, independently, a hydrogen atom, a lone pair of electrons, an alkyl chain, an aromatic group, a crosslinking agent, an ionically conductive chain, an amino group, a cyano group, a nitro group, a hydroxyl group, a perfluoro alkyl group, or a halogen;
Y is, independently, a carbon atom, a nitrogen atom, a silicon atom, a germanium atom or a phosphorus atom;
Z is, independently, an oxygen atom, a sulfur atom, a selenium atom, an imine group substituted with a hydrogen, alkyl chain, an aromatic group, or a crosslinking agent;
X is, independently, a hydroxyl group, a thiol group, an amine substituted with any of the combinations of a hydrogen, alkyl chain, an aromatic group, or a crosslinking agent;
Ar is, independently, a phenyl group, a quinone, a hydroxyquinone, a heteroaromatic group, or a substituted aromatic group with cyano groups, carboxyl groups, nitro groups, or amine groups attached;

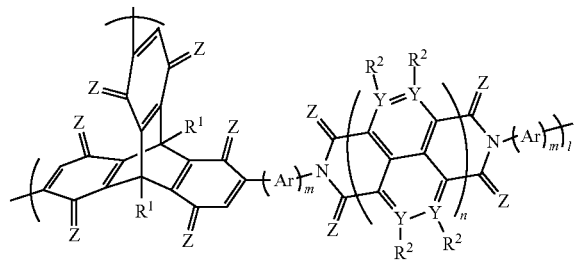

Formula (2)

wherein, n is a number of repeat units ranging from 1 to 3;
m is a number of repeat units ranging from 0 to 5;
I is a number of repeat units for the extension of the crosslinking network that range independently from each of the vertex triptycene units from 1 to 5000;
R¹ is, independently, a hydrogen atom, an alkyl chain, an aromatic group, a crosslinking agent, or an ionically conductive chain;
R² is, independently, a hydrogen atom, a lone pair of electrons, an alkyl chain, an aromatic group, a crosslinking agent, an ionically conductive chain, an amino group, a cyano group, a nitro group, a hydroxyl group, a perfluoro alkyl group, or a halogen;
Y is, independently, a carbon atom, a nitrogen atom, a silicon atom, a germanium atom or a phosphorus atom;
Z is, independently, an oxygen atom, a sulfur atom, a selenium atom, an imine group substituted with a hydrogen, alkyl chain, an aromatic group, or a crosslinking agent;
Ar is, independently, a phenyl group, a quinone, a hydroxyquinone, a heteroaromatic group, or a substituted aromatic group with cyano groups, carboxyl groups, nitro groups, or amine groups attached;

Formula (3)

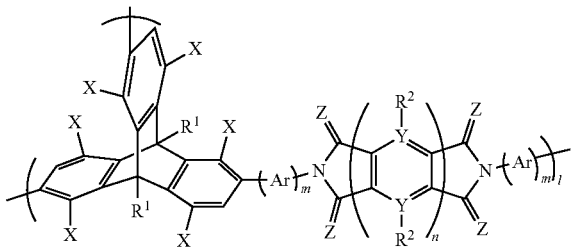

wherein, n is a number of repeat units ranging from 1 to 3;
m is a number of repeat units ranging from 0 to 5;
l is a number of repeat units for the extension of the crosslinking network that range independently from each of the vertex triptycene units from 1 to 5000;
$R^1$ is, independently, a hydrogen atom, an alkyl chain, an aromatic group, a crosslinking agent, or an ionically conductive chain;
$R^2$ is, independently, a hydrogen atom, a lone pair of electrons, an alkyl chain, an aromatic group, a crosslinking agent, an ionically conductive chain, an amino group, a cyano group, a nitro group, a hydroxyl group, a perfluoro alkyl group, or a halogen;
Y is, independently, a carbon atom, a nitrogen atom, a silicon atom, a germanium atom or a phosphorus atom;
Z is, independently, an oxygen atom, a sulfur atom, a selenium atom, an imine group substituted with a hydrogen, alkyl chain, an aromatic group, or a crosslinking agent;
Ar is, independently, a phenyl group, a quinone, a hydroxyquinone, a heteroaromatic group, or a substituted aromatic group with cyano groups, carboxyl groups, nitro groups, or amine groups attached, Formula (4)

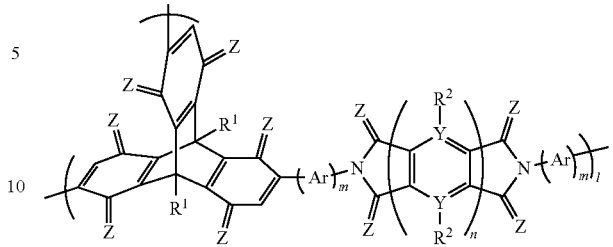

wherein, n is a number of repeat units ranging from 1 to 3;
m is a number of repeat units ranging from 0 to 5;
l is a number of repeat units for the extension of the crosslinking network that range independently from each of the vertex triptycene units from 1 to 5000;
$R^1$ is, independently, a hydrogen atom, an alkyl chain, an aromatic group, a crosslinking agent, or an ionically conductive chain;
$R^2$ is, independently, a hydrogen atom, a lone pair of electrons, an alkyl chain, an aromatic group, a crosslinking agent, an ionically conductive chain, an amino group, a cyano group, a nitro group, a hydroxyl group, a perfluoro alkyl group, or a halogen;
Y is, independently, a carbon atom, a nitrogen atom, a silicon atom, a germanium atom or a phosphorus atom;
Z is, independently, an oxygen atom, a sulfur atom, a selenium atom, an imine group substituted with a hydrogen, alkyl chain, an aromatic group, or a crosslinking agent;
Ar is, independently, a phenyl group, a quinone, a hydroxyquinone, a heteroaromatic group, or a substituted aromatic group with cyano groups, carboxyl groups, nitro groups, or amine groups attached;

Formula (5)

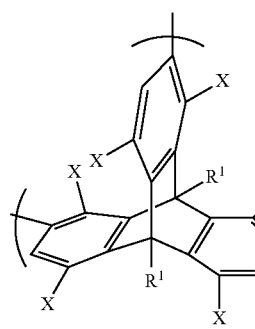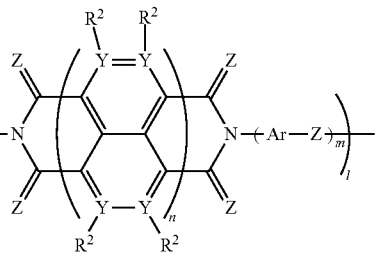

X is, independently, a hydroxyl group, a thiol group, an amine substituted with any of the combinations of a hydrogen, alkyl chain, an aromatic group, or a crosslinking agent;

wherein, n is a number of repeat units ranging from 1 to 3;
m is a number of repeat units ranging from 0 to 5;
l is a number of repeat units for the extension of the crosslinking network that range independently from each of the vertex triptycene units from 1 to 5000;

R¹ is, independently, a hydrogen atom, an alkyl chain, an aromatic group, a crosslinking agent, or an ionically conductive chain;

R² is, independently, a hydrogen atom, a lone pair of electrons, an alkyl chain, an aromatic group, a crosslinking agent, an ionically conductive chain, an amino group, a cyano group, a nitro group, a hydroxyl group, a perfluoro alkyl group, or a halogen;

Y is, independently, a carbon atom, a nitrogen atom, a silicon atom, a germanium atom or a phosphorus atom;

Z is, independently, an oxygen atom, a sulfur atom, a selenium atom, a nitrogen atom substituted with any of the combinations of a hydrogen, alkyl chain, an aromatic group, or a crosslinking agent;

Ar is, independently, a phenyl group, a quinone, a hydroxyquinone, a heteroaromatic group, or a substituted aromatic group with cyano groups, carboxyl groups, nitro groups, or amine groups attached;

X is, independently, a hydroxyl group, a thiol group, an amine substituted with any of the combinations of a hydrogen, alkyl chain, an aromatic group, or a crosslinking agent;

Formula (6)

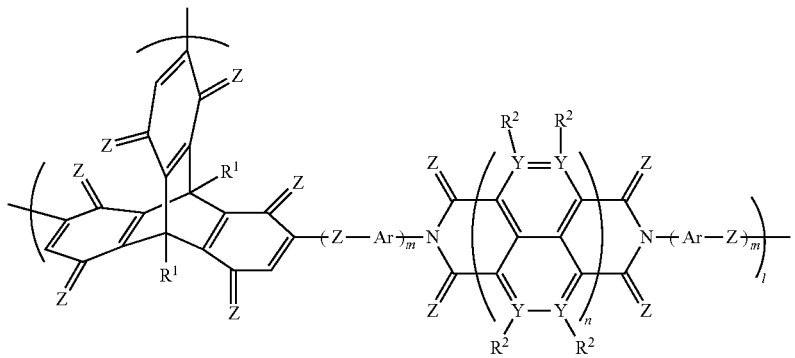

wherein, n is a number of repeat units ranging from 1 to 3;
m is a number of repeat units ranging from 0 to 5;
l is a number of repeat units for the extension of the crosslinking network that range independently from each of the vertex triptycene units from 1 to 5000;

R¹ is, independently, a hydrogen atom, an alkyl chain, an aromatic group, a crosslinking agent, or an ionically conductive chain;

R² is, independently, a hydrogen atom, a lone pair of electrons, an alkyl chain, an aromatic group, a crosslinking agent, an ionically conductive chain, an amino group, a cyano group, a nitro group, a hydroxyl group, a perfluoro alkyl group, or a halogen;

Y is, independently, a carbon atom, a nitrogen atom, a silicon atom, a germanium atom or a phosphorus atom;

Z is, independently, an oxygen atom, a sulfur atom, a selenium atom, a nitrogen atom substituted with any of the combinations of a hydrogen, alkyl chain, an aromatic group, or a crosslinking agent;

Ar is, independently, a phenyl group, a quinone, a hydroxyquinone, a heteroaromatic group, or a substituted aromatic group with cyano groups, carboxyl groups, nitro groups, or amine groups attached;

Formula (7)

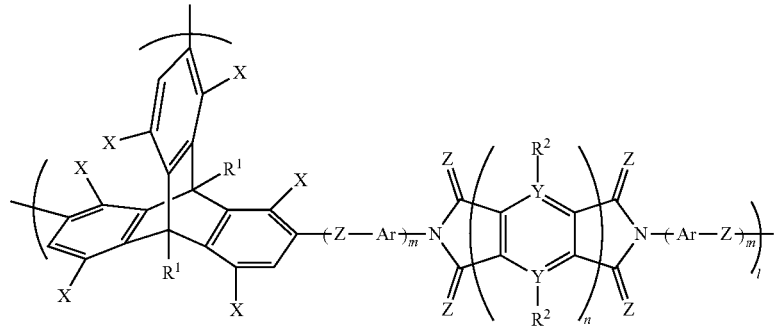

wherein, n is a number of repeat units ranging from 1 to 3;
m is a number of repeat units ranging from 0 to 5;
I is a number of repeat units for the extension of the crosslinking network that range independently from each of the vertex triptycene units from 1 to 5000;
$R^1$ is, independently, a hydrogen atom, an alkyl chain, an aromatic group, a crosslinking agent, or an ionically conductive chain;
$R^2$ is, independently, a hydrogen atom, a lone pair of electrons, an alkyl chain, an aromatic group, a crosslinking agent, an ionically conductive chain, an amino group, a cyano group, a nitro group, a hydroxyl group, a perfluoro alkyl group, or a halogen;
Y is, independently, a carbon atom, a nitrogen atom, a silicon atom, a germanium atom or a phosphorus atom;
Z is, independently, an oxygen atom, a sulfur atom, a selenium atom, a nitrogen atom substituted with any of the combinations of a hydrogen, alkyl chain, an aromatic group, or a crosslinking agent;
Ar is, independently, a phenyl group, a quinone, a hydroxyquinone, a heteroaromatic group, or a substituted aromatic group with cyano groups, carboxyl groups, nitro groups, or amine groups attached;
X is, independently, a hydroxyl group, a thiol group, an amine substituted with any of the combinations of a hydrogen, alkyl chain, an aromatic group, or a crosslinking agent; and Ar is, independently, a phenyl group, a quinone, a hydroxyquinone, a heteroaromatic group, or a substituted aromatic group with cyano groups, carboxyl groups, nitro groups, or amine groups attached.

3. The electroactive material according to claim 2 comprising the molecular structure of Formula (1) wherein $R^1$, $R^2$ and X are hydrogens, n is equal to 2, m is equal to 0, Y is a carbon atom, Z is an oxygen atom, and I is equal to an integer between 1 and 5000.

4. The electroactive material according to claim 3 having a capacity retention of over 80% after 500 cycles.

5. An energy storage device comprising electrodes made of at least one electroactive material of claim 1.

6. The energy storage device of claim 5 in the form a lithium ion battery, sodium ion battery, magnesium ion battery, aluminium ion battery, potassium ion battery, a supercapacitor, a capacitor, a solid-state battery, an aqueous battery, or a hybrid device.

7. A process for producing an electroactive material of claim 1 comprising the molecular structure according to formula ST1, comprising the steps:

Formula (8)

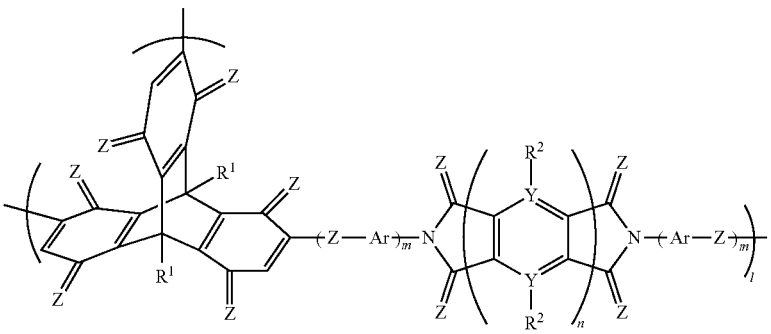

wherein, n is a number of repeat units ranging from 1 to 3;
m is a number of repeat units ranging from 0 to 5;
I is a number of repeat units for the extension of the crosslinking network that range independently from each of the vertex triptycene units from 1 to 5000;
$R^1$ is, independently, a hydrogen atom, an alkyl chain an aromatic group, a crosslinking agent, or an ionically conductive chain;
$R^2$ is, independently, a hydrogen atom, a lone pair of electrons, an alkyl chain, an aromatic group, a crosslinking agent, an ionically conductive chain, an amino group, a cyano group, a nitro group, a hydroxyl group, a perfluoro alkyl group, or a halogen;
Y is, independently, a carbon atom, a nitrogen atom, a silicon atom, a germanium atom or a phosphorus atom;
Z is, independently, an oxygen atom, a sulfur atom, a selenium atom, a nitrogen atom substituted with any of the combinations of a hydrogen, alkyl chain, an aromatic group, or a crosslinking agent;

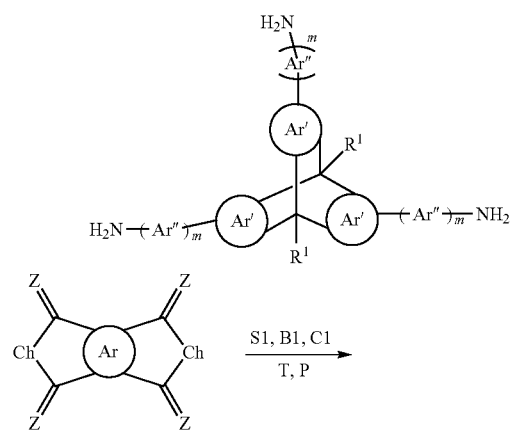

-continued

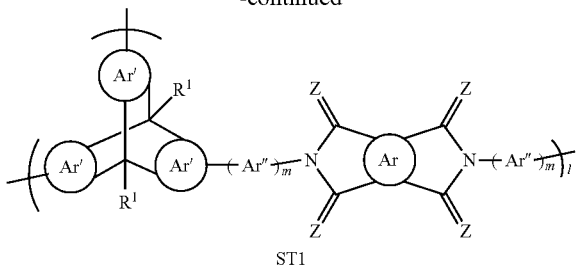

ST1

Wherein, m is a number of repeat units ranging from 0 to 5;
I is a number of repeat units for the extension of the crosslinking network that range independently from each of the vertex triptycene units from 1 to 5000;
$R^1$ is, independently, a hydrogen atom, an alkyl chain, an aromatic group, a crosslinking agent, or an ionically conductive chain;
Z is, independently, an oxygen atom, a sulfur atom, a selenium atom, an imine group substituted with a hydrogen, alkyl chain, an aromatic group, or a crosslinking agent;
Ar is, independently, an aromatic group with an arrangement of aromatic rings numbering between 1 and 6, a substituted aromatic group, a crosslinking agent, an ionically conductive chain, an amino group, a cyano group, a nitro group, a hydroxyl group, a perfluoro alkyl group, or a halogen, or a heteroaromatic group containing hydrogen atoms, carbon atoms, nitrogen atoms, silicon atoms, germanium atoms, or phosphorus atoms in any substitution pattern or in any number ranging, independently, between 0 and 26, or a substituted heteroaromatic group, a crosslinking agent, an ionically conductive chain, an amino group, a cyano group, a nitro group, a hydroxyl group, a perfluoro alkyl group, or a halogen;
Ar' is, independently, a phenyl group, a quinone, a hydroxyquinone, a heteroaromatic group, or a substituted aromatic group with cyano groups, carboxyl groups, nitro groups, or amine groups attached;
Ar" is a linking group that be, independently, a phenyl group, a quinone, a hydroxyquinone, a heteroaromatic group, or a substituted aromatic group with cyano groups, carboxyl groups, nitro groups, or amine groups attached, and contain an oxygen atom, a sulfur atom, a selenium atom, a nitrogen atom substituted with any of the combinations of a hydrogen, alkyl chain, an aromatic group, or a crosslinking agent, bonded adjacent to the groups mentioned above,
Ch is an atom that is removed from the product via a condensation reaction to form $ChH_2$;
S1 is a solvent;
B1 is a base;
C1 is a catalyst;
the temperature, T, is between −20 and 220 degrees Celsius and the pressure, P, is between 0.01 and 10 atmospheres;
S1 is any one or a combination of quinoline, triethylamine, imidazole, pyridine, piperidine, pyrimidine, pyrrolidine, water, dimethylacetimide, toluene, xylene, benzene, glyme, dimethyl formamide, acetonitrile, and dimethylsulfoxide;
B1 is any one or a combination of quinoline, triethylamine, imidazole, pyridine, piperidine, pyrimidine, and pyrrolidine; and
C1 is a Lewis acid.

8. The process according to claim 7 wherein B1 is selected from a group of quinoline, triethylamine, imidazole, pyridine, piperidine, pyrimidine, and pyrrolidine.

9. The process according to claim 7 wherein S1 is selected from a group of quinoline, triethylamine, imidazole, pyridine, piperidine, pyrimidine, pyrrolidine, water, dimethylacetimide, toluene, xylene, benzene, glyme, dimethyl formamide, acetonitrile, and dimethylsulfoxide.

10. The process according to claim 7, wherein C1 is selected from a group of zinc (II) acetate, aluminium (Ill) chloride, trimethyl aluminium, tributyl aluminium, and titanium chloride.

11. The process according to claim 7 wherein m is equal to 0, I is in a range between 1 and 5000, $R^1$, is a hydrogen atom, Ar is a perylene group, Ar' is a phenyl group, Z and Ch are an oxygen atom, S1 and B1 are imidazole, and C1 is zinc (II) acetate.

12. An electroactive material comprising the molecular structure according to formula ST2A/B:

ST2A/B

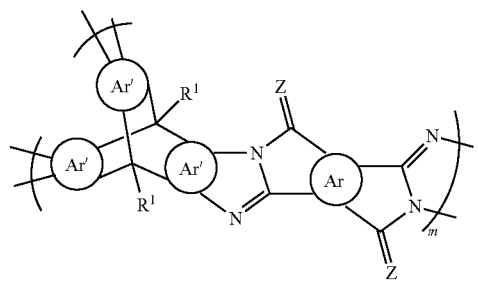

ST2A

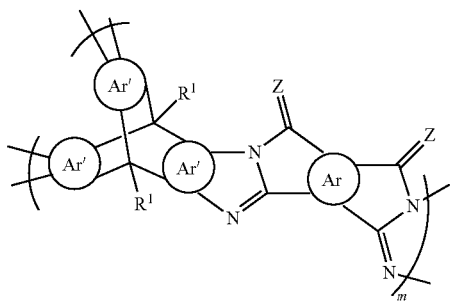

ST2B wherein, m is a number of repeat units for the extension of the crosslinking network that range independently from each of the vertex triptycene units from 1 to 5000;
$R^1$ is, independently, a hydrogen atom, an alkyl chain an aromatic group, a crosslinking agent, or an ionically conductive chain;
Z is, independently, an oxygen atom, a sulfur atom, a selenium atom, an imine group substituted with a hydrogen, alkyl chain, an aromatic group, or a crosslinking agent;
Ar is, independently, an aromatic group with an arrangement of aromatic rings numbering between 1 and 6, a substituted aromatic group, a crosslinking agent, an ionically conductive chain, an amino group, a cyano group, a nitro group, a hydroxyl group, a perfluoro alkyl group, or a halogen, or a heteroaromatic group containing hydrogen atoms, carbon atoms, nitrogen atoms, silicon atoms, germanium atoms, or phosphorus atoms in any substitution pattern or in any number ranging, independently, between 0 and 26, or a substituted heteroaromatic group, a crosslinking agent, an ionically conductive chain, an amino group, a cyano group, a nitro group, a hydroxyl group, a perfluoro alkyl group, or a halogen;

Ar' is, independently, a phenyl group, a quinone, a hydroxyquinone, a heteroaromatic group, or a substituted aromatic group with cyano groups, carboxyl groups, nitro groups, or amine groups attached.

13. An electroactive material of claim 12 comprising the molecular structure selected from the group consisting of Formula (9A/B), Formula (10A/B), Formula (11A/B) and Formula (12A/B):

Formula (9A/B)

Formula 9A

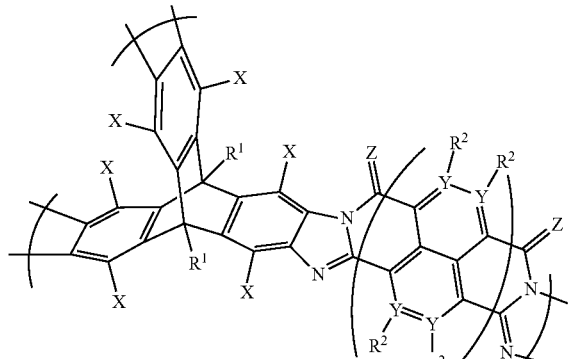

Formula 9B

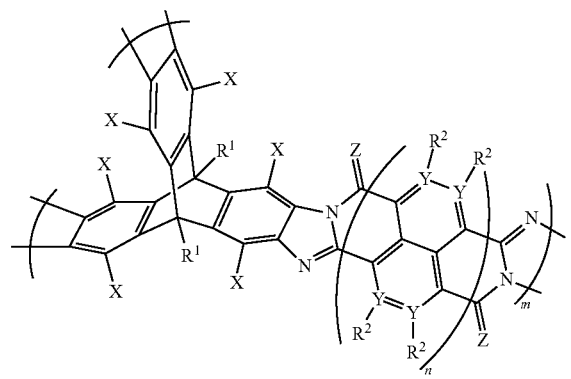

wherein, n is a number of repeat units ranging from 1 to 3;
m is a number of repeat units for the extension of the crosslinking network that range independently from each of the vertex triptycene units from 1 to 5000;
$R^1$ is, independently, a hydrogen atom, an alkyl chain, an aromatic group, a crosslinking agent, or an ionically conductive chain;
$R^2$ is, independently, a hydrogen atom, a lone pair of electrons, an alkyl chain, an aromatic group, a crosslinking agent, an ionically conductive chain, an amino group, a cyano group, a nitro group, a hydroxyl group, a perfluoro alkyl group, or a halogen;
Y is, independently, a carbon atom, a nitrogen atom, a silicon atom, a germanium atom or a phosphorus atom;
Z is, independently, an oxygen atom, a sulfur atom, a selenium atom, a nitrogen atom substituted with any of the combinations of a hydrogen, alkyl chain, an aromatic group, or a crosslinking agent;

X is, independently, a hydroxyl group, a thiol group, an amine substituted with any of the combinations of a hydrogen, alkyl chain, an aromatic group or a crosslinking agent;

Formula (10A/B)

Formula 10A

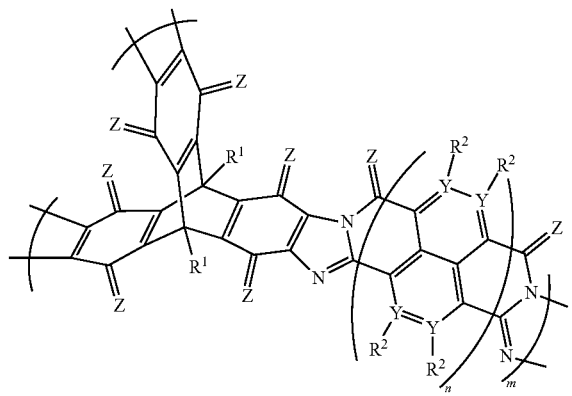

Formula 10B

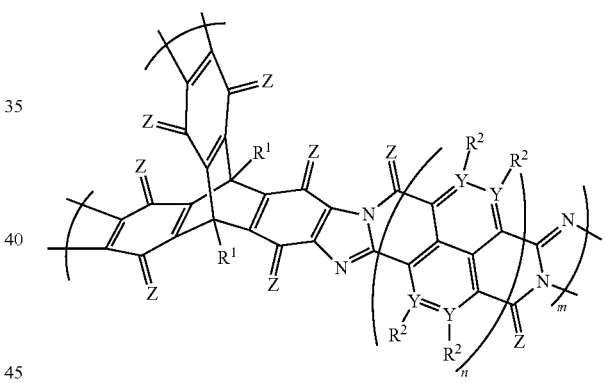

wherein, n is a number of repeat units ranging from 1 to 3;
m is a number of repeat units for the extension of the crosslinking network that range independently from each of the vertex triptycene units from 1 to 5000;
$R^1$ is, independently, a hydrogen atom, an alkyl chain, an aromatic group, a crosslinking agent, or an ionically conductive chain;
$R^2$ is, independently, a hydrogen atom, a lone pair of electrons, an alkyl chain, an aromatic group, a crosslinking agent, an ionically conductive chain, an amino group, a cyano group, a nitro group, a hydroxyl group, a perfluoro alkyl group, or a halogen;
Y is, independently, a carbon atom, a nitrogen atom, a silicon atom, a germanium atom or a phosphorus atom;
Z is, independently, an oxygen atom, a sulfur atom, a selenium atom, a nitrogen atom substituted with any of the combinations of a hydrogen, alkyl chain, an aromatic group, or a crosslinking agent;

Formula (11A/B)

Formula 11A

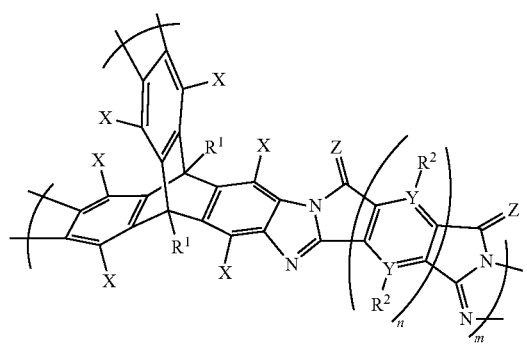

Formula 11B

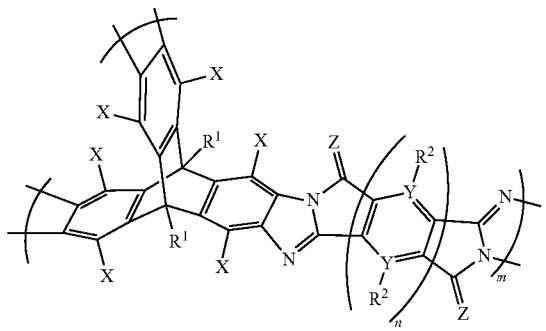

wherein, n is a number of repeat units ranging from 1 to 3;

m is a number of repeat units for the extension of the crosslinking network that range independently from each of the vertex triptycene units from 1 to 5000;

$R^1$ is, independently, a hydrogen atom, an alkyl chain an aromatic group, a crosslinking agent, or an ionically conductive chain;

$R^2$ is, independently, a hydrogen atom, a lone pair of electrons, an alkyl chain an aromatic group, a cross-linking agent, an ionically conductive chain, an amino group, a cyano group, a nitro group, a hydroxyl group, a perfluoro alkyl group, or a halogen;

Y is, independently, a carbon atom, a nitrogen atom, a silicon atom, a germanium atom or a phosphorus atom;

Z is, independently, an oxygen atom, a sulfur atom, a selenium atom, a nitrogen atom substituted with any of the combinations of a hydrogen, alkyl chain an aromatic group, or a crosslinking agent;

X is, independently, a hydroxyl group, a thiol group, an amine substituted with any of the combinations of a hydrogen, alkyl chain an aromatic group, or a cross-linking agent; and Formula (12A/B)

Formula 12A

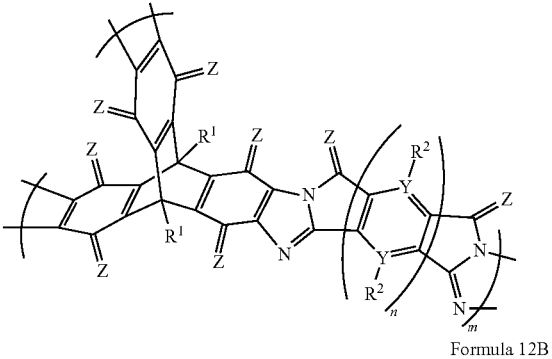

Formula 12B

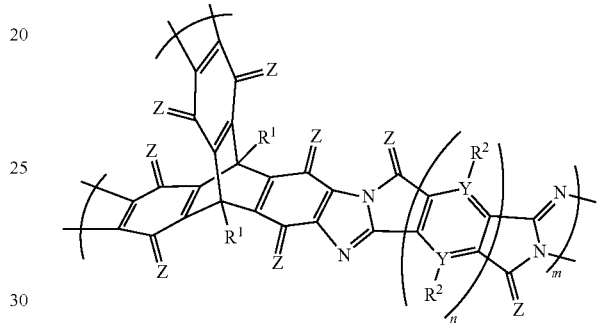

wherein, n is a number of repeat units ranging from 1 to 3;

m is a number of repeat units for the extension of the crosslinking network that range independently from each of the vertex triptycene units from 1 to 5000;

$R^1$ is, independently, a hydrogen atom, an alkyl chain an aromatic group, a crosslinking agent, or an ionically conductive chain;

$R^2$ is, independently, a hydrogen atom, a lone pair of electrons, an alkyl chain, an aromatic group, a cross-linking agent, an ionically conductive chain, an amino group, a cyano group, a nitro group, a hydroxyl group, a perfluoro alkyl group, or a halogen;

Y is, independently, a carbon atom, a nitrogen atom, a silicon atom, a germanium atom or a phosphorus atom;

Z is, independently, an oxygen atom, a sulfur atom, a selenium atom, a nitrogen atom substituted with any of the combinations of a hydrogen, alkyl chain, an aromatic group, or a crosslinking agent.

14. The compound according to claim 13 comprising the molecular structure according to Formula (9A/B) wherein $R^1$, $R^2$ and X are hydrogens, n is equal to 2, Y is a carbon atom, Z is an oxygen atom, and m is equal to an integer between 1 and 5000.

15. The compound according to claim 14 having a capacity of 557 mAh $g^{-1}$.

16. The compound according to claim 13 having the structure of Formula (11 A/B) wherein $R^1$, $R^2$ and X are hydrogens, n is equal to 1, Y is a carbon atom, Z is an oxygen atom, and m is equal to an integer between 1 and 5000.

17. A process for producing an electroactive material of claim 12 comprising the molecular structure according to formula ST2A/B, comprising the steps:

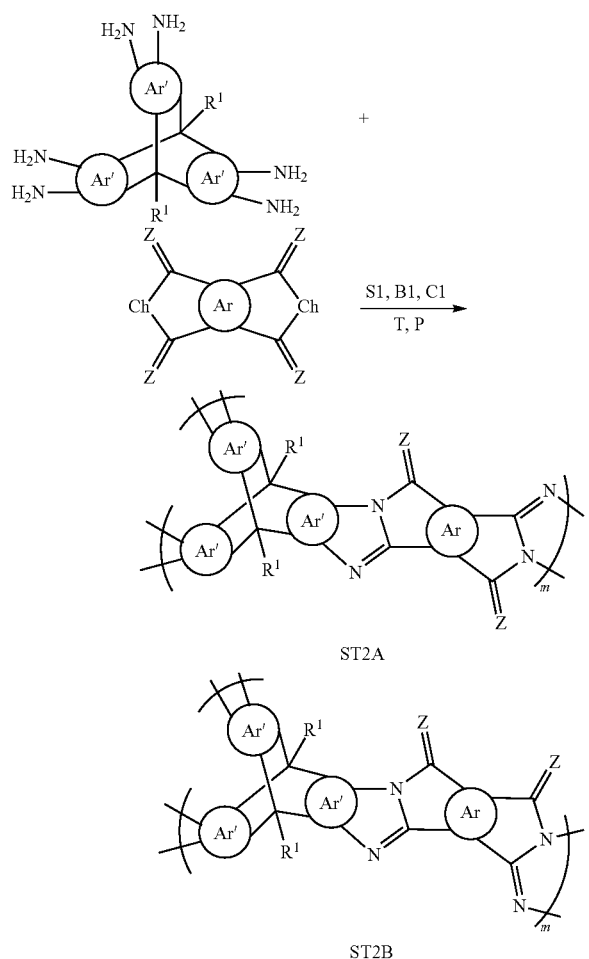

ST2A

ST2B wherein, m is a number of repeat units for the extension of the crosslinking network that range independently from each of the vertex triptycene units from 1 to 5000;

$R^1$ is, independently, a hydrogen atom, an alkyl chain an aromatic group, a crosslinking agent, or an ionically conductive chain;

Z is, independently, an oxygen atom, a sulfur atom, a selenium atom, an imine group substituted with a hydrogen, alkyl chain, an aromatic group, or a crosslinking agent;

Ar is, independently, an aromatic group with an arrangement of aromatic rings numbering between 1 and 6, a substituted aromatic group, a crosslinking agent, an ionically conductive chain, an amino group, a cyano group, a nitro group, a hydroxyl group, a perfluoro alkyl group, or a halogen, or a heteroaromatic group containing hydrogen atoms, carbon atoms, nitrogen atoms, silicon atoms, germanium atoms, or phosphorus atoms in any substitution pattern or in any number ranging, independently, between 0 and 26, or a substituted heteroaromatic group, a crosslinking agent, an ionically conductive chain, an amino group, a cyano group, a nitro group, a hydroxyl group, a perfluoro alkyl group, or a halogen;

Ar' is, independently, a phenyl group, a quinone, a hydroxyquinone, a heteroaromatic group, or a substituted aromatic group with cyano groups, carboxyl groups, nitro groups, or amine groups attached, Ch is an atom that is removed from the product via a condensation reaction to form $ChH_2$;

S1 is a solvent;

B1 is a base;

C1 is a catalyst;

the temperature, T, is between −20 and 220 degrees Celsius and the pressure, P, is between 0.01 and 10 atmospheres;

S1 is any one or a combination of quinoline, triethylamine, imidazole, pyridine, piperidine, pyrimidine, pyrrolidine, water, dimethylacetimide, toluene, xylene, benzene, glyme, dimethyl formamide, acetonitrile, and dimethylsulfoxide;

B1 is any one or a combination of quinoline, triethylamine, imidazole, pyridine, piperidine, pyrimidine, and pyrrolidine; and C1 is a Lewis acid.

18. The process according to claim 17 wherein B1 is selected from a group of quinoline, triethylamine, imidazole, pyridine, piperidine, pyrimidine, and pyrrolidine.

19. The process according to claim 17 wherein S1 is selected from a group of quinoline, triethylamine, imidazole, pyridine, piperidine, pyrimidine, pyrrolidine, water, dimethylacetimide, toluene, xylene, benzene, glyme, dimethyl formamide, acetonitrile, and dimethylsulfoxide.

20. The process according to claim 17, wherein C1 is selected from a group of zinc (II) acetate, aluminium (III) chloride, trimethyl aluminium, tributyl aluminium, and titanium chloride.

21. The process according to claim 17 wherein m is in a range between 1 and 5000, $R^1$ is a hydrogen atom, Ar is a perylene group, Ar' is a phenyl group, Z and Ch are an oxygen atom, S1 and B1 are imidazole, and C1 is zinc (II) acetate.

22. A process for producing an electroactive material of claim 12 comprising the molecular structure according to formula ST2A/B, comprising the step

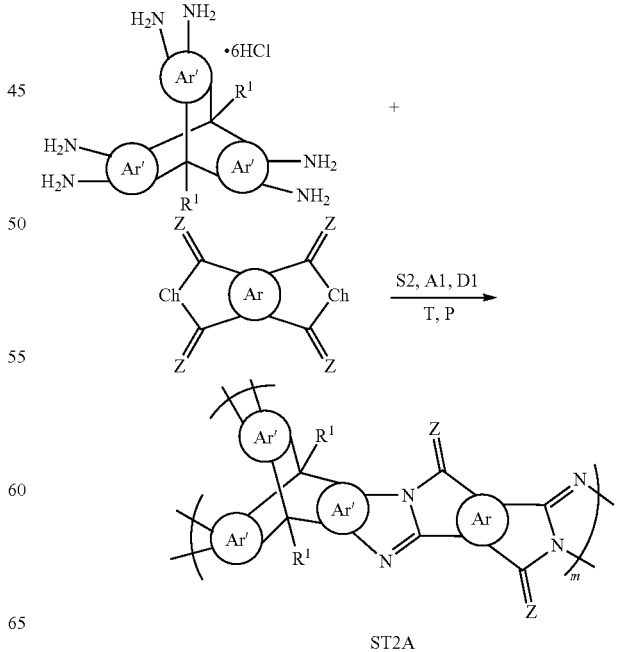

ST2A

-continued

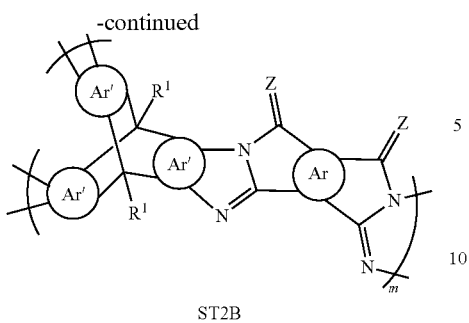

ST2B wherein, m is a number of repeat units for the extension of the crosslinking network that range independently from each of the vertex triptycene units from 1 to 5000;

$R^1$ is, independently, a hydrogen atom, an alkyl chain, an aromatic group, a crosslinking agent, or an ionically conductive chain;

Z is, independently, an oxygen atom, a sulfur atom, a selenium atom, an imine group substituted with a hydrogen, alkyl chain, an aromatic group, or a crosslinking agent;

Ar is, independently, an aromatic group with an arrangement of aromatic rings numbering between 1 and 6, a substituted aromatic group a crosslinking agent, an ionically conductive chain, an amino group, a cyano group, a nitro group, a hydroxyl group, a perfluoro alkyl group, or a halogen, or a heteroaromatic group containing hydrogen atoms, carbon atoms, nitrogen atoms, silicon atoms, germanium atoms, or phosphorus atoms in any substitution pattern or in any number ranging, independently, between 0 and 26, or a substituted heteroaromatic group, a crosslinking agent, an ionically conductive chain, an amino group, a cyano group, a nitro group, a hydroxyl group, a perfluoro alkyl group, or a halogen;

Ar' is, independently, a phenyl group, a quinone, a hydroxyquinone, a heteroaromatic group, or a substituted aromatic group with cyano groups, carboxyl groups, nitro groups, or amine groups attached, Ch is an atom that is removed from the product via a condensation reaction to form $ChH_2$;

S2 is a solvent;
A1 is an acid;
D1 is a dehydrating reagent;
the temperature, T, is between −20 and 220 degrees Celsius and the pressure, P, is between 0.01 and 10 atmospheres;
S2 is any one or a combination of phosphoric acid, acetic acid, polyphosphoric acid, sulfuric acid, acetic acid, hydrochloric acid, methanesulfonic acid, and para-toluene sulfonic acid, polyphosphoric acid, phosphorus pentoxide, molecular sieves, calcium chloride, concentrated sulfuric acid, water, dimethylacetimide, toluene, xylene, benzene, glyme, dimethyl formamide, acetonitrile, and dimethylsulfoxide;
A1 is an acid catalyst that drives the reaction to completion and is any one or a combination of phosphoric acid, acetic acid, polyphosphoric acid, sulfuric acid, acetic acid, hydrochloric acid, methanesulfonic acid, and para-toluene sulfonic acid; and
D1 is a dehydrating reagent that is used to remove water from the reaction to drive it to completion and is one of polyphosphoric acid, phosphorus pentoxide, molecular sieves, calcium chloride, and concentrated sulfuric acid.

23. The process according to claim 22 wherein A1 is any one, or combination of, phosphoric acid, acetic acid, polyphosphoric acid, sulfuric acid, acetic acid, hydrochloric acid, methanesulfonic acid, and para-toluene sulfonic acid.

24. The process according to claim 22 wherein D1 is any one of polyphosphoric acid, phosphorus pentoxide, molecular sieves, calcium chloride, and concentrated sulfuric acid.

25. The process according to claim 22 wherein S2 is any one, or combination of phosphoric acid, acetic acid, polyphosphoric acid, sulfuric acid, acetic acid, hydrochloric acid, methanesulfonic acid, and para-toluene sulfonic acid, polyphosphoric acid, phosphorus pentoxide, molecular sieves, calcium chloride, concentrated sulfuric acid, water, dimethylacetimide, toluene, xylene, benzene, glyme, dimethyl formamide, acetonitrile, and dimethylsulfoxide.

26. The process according to claim 22 wherein m is in a range between 1 and 5000, $R^1$ is a hydrogen atom, Ar and Ar' are a phenyl group, Z and Ch are an oxygen atom, and S2, A1, and D1 are polyphosphoric acid.

* * * * *